US012211092B2

(12) United States Patent
Hauk

(10) Patent No.: US 12,211,092 B2
(45) Date of Patent: *Jan. 28, 2025

(54) VEHICLE IMAGING AND INSPECTION SYSTEM

(71) Applicant: BWI Acquisition, Inc., Chesterfield, MO (US)

(72) Inventor: Jason Hauk, O'Fallon, MO (US)

(73) Assignee: BWI Acquisition, Inc., Chesterfield, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/407,898

(22) Filed: Jan. 9, 2024

(65) Prior Publication Data
US 2024/0144358 A1 May 2, 2024

Related U.S. Application Data

(60) Continuation of application No. 18/533,995, filed on Dec. 8, 2023, now Pat. No. 11,954,727, which is a
(Continued)

(51) Int. Cl.
G06Q 30/0601 (2023.01)
G06F 16/58 (2019.01)
(Continued)

(52) U.S. Cl.
CPC ......... *G06Q 30/0643* (2013.01); *G06F 16/58* (2019.01); *G06Q 30/0265* (2013.01);
(Continued)

(58) Field of Classification Search
CPC ....... G06F 16/58; G06F 16/583; G06Q 10/10; G06Q 30/0206; G06Q 30/0265;
(Continued)

(56) References Cited

U.S. PATENT DOCUMENTS 4,110,792 A 8/1978 Long
5,323,203 A 6/1994 Maruyama
(Continued)

FOREIGN PATENT DOCUMENTS

AU 2014200204 A 7/2015
WO WO 2005084400 A2 9/2005
(Continued)

OTHER PUBLICATIONS

Lavrinc, Damon, Giant New CT Scanner Creates a 3-D Image of Your Car's Guts, http://www.wired.com/autopia/2013/10/ct-scan-car-crash/, Oct. 8, 2013 (1 page).
(Continued)

Primary Examiner — Maria E Vazquez Colon
(74) Attorney, Agent, or Firm — Nixon Peabody LLP

(57) ABSTRACT

A front-end image acquisition component acquires photographs and/or videos of the exterior of a vehicle traveling on a path between a first predefined location and a second predefined location. In one aspect, an image acquisition system comprises a first camera support structure, a second camera support structure, an image processor, and a memory. Cameras are affixed to each of the camera support structures for acquiring image data of a subject vehicle. Image data is controlled by the image processor and the memory. In another aspect, an image acquisition system comprises a first camera tower, a second camera tower, a camera boom. Cameras are affixed to each of the camera towers. In another aspect, a method of identifying features of the exterior of a vehicle includes acquiring a series of images from a front-end component, accessing previously acquired images and associated metadata stored in a database, executing machine learning algorithms using the previously acquired information to identify at least one exterior vehicle feature, and executing machine learning algorithms using
(Continued)

the presently acquired series of images to identify at least one exterior feature of the vehicle.

21 Claims, 40 Drawing Sheets

Related U.S. Application Data continuation of application No. 18/341,504, filed on Jun. 26, 2023, now Pat. No. 12,026,769, which is a continuation of application No. 17/574,025, filed on Jan. 12, 2022, now Pat. No. 11,756,110, which is a continuation-in-part of application No. 16/385,329, filed on Apr. 16, 2019, now abandoned, and a continuation-in-part of application No. 15/945,828, filed on Apr. 5, 2018, now Pat. No. 11,270,350, which is a continuation-in-part of application No. 15/012,033, filed on Feb. 1, 2016, now Pat. No. 10,681,261, said application No. 16/385,329 is a continuation-in-part of application No. 15/012,033, filed on Feb. 1, 2016, now Pat. No. 10,681,261, said application No. 15/945,828 is a continuation-in-part of application No. 14/575,260, filed on Dec. 18, 2014, now Pat. No. 10,269,059, said application No. 15/012,033 is a continuation-in-part of application No. 14/574,638, filed on Dec. 18, 2014, now abandoned, said application No. 16/385,329 is a division of application No. 14/475,260, filed on Sep. 2, 2014, now abandoned, said application No. 14/574,638 is a continuation-in-part of application No. 14/088,939, filed on Nov. 25, 2013, now abandoned.

(60) Provisional application No. 62/484,197, filed on Apr. 11, 2017, provisional application No. 61/792,258, filed on Mar. 15, 2013, provisional application No. 61/732,078, filed on Nov. 30, 2012.

(51) Int. Cl.
| | |
|---|---|
| *G06Q 30/0251* | (2023.01) |
| *H04N 1/32* | (2006.01) |
| *H04N 5/222* | (2006.01) |
| *H04N 23/90* | (2023.01) |
| *G03B 15/06* | (2021.01) |
| *G03B 37/02* | (2021.01) |

(52) U.S. Cl.
CPC ..... *G06Q 30/0623* (2013.01); *H04N 1/32133* (2013.01); *H04N 5/222* (2013.01); *H04N 23/90* (2023.01); *G03B 15/06* (2013.01); *G03B 37/02* (2013.01); *H04N 2201/3269* (2013.01); *H04N 2201/3271* (2013.01)

(58) Field of Classification Search
CPC ........... G06Q 30/0276; G06Q 30/0283; G06Q 30/0623; G06Q 30/0643; H04N 1/32133; H04N 23/66; H04N 23/90; H04N 5/222; H04N 2201/3269; H04N 2201/3271; G03B 15/06; G03B 37/02
See application file for complete search history.

(56) References Cited

U.S. PATENT DOCUMENTS

| | | | |
|---|---|---|---|
| 6,809,887 B1 | 10/2004 | Gao | |
| 6,817,300 B2 | 11/2004 | Schwenker | |
| 7,465,108 B2 | 12/2008 | Brown | |
| 7,596,512 B1 | 9/2009 | Raines | |
| 7,631,602 B2 | 12/2009 | Schwenker | |
| 7,889,931 B2* | 2/2011 | Webb | G01N 21/8851 |
| | | | 382/209 |
| 8,112,325 B2 | 2/2012 | Foy | |
| 8,830,320 B2 | 9/2014 | Swinford | |
| 8,830,321 B2 | 9/2014 | Swinford | |
| 8,836,785 B2 | 9/2014 | Swinford | |
| 9,412,203 B1 | 8/2016 | Garcia, III | |
| 9,526,254 B2 | 12/2016 | Sadler-Bridge | |
| 9,582,810 B2 | 2/2017 | Wingle | |
| 11,244,334 B2 | 2/2022 | Taira | |
| 2001/0053284 A1 | 12/2001 | Shin | |
| 2002/0010655 A1 | 1/2002 | Kjallstrom | |
| 2002/0026390 A1 | 2/2002 | Ulenas | |
| 2002/0063714 A1 | 5/2002 | Haas | |
| 2002/0135677 A1 | 9/2002 | Noro | |
| 2003/0016288 A1 | 1/2003 | Kaylor | |
| 2004/0183803 A1 | 9/2004 | Longo | |
| 2006/0074790 A1 | 4/2006 | Anspach | |
| 2007/0088625 A1 | 4/2007 | Fish | |
| 2007/0274519 A1 | 11/2007 | Cohen | |
| 2009/0160930 A1 | 6/2009 | Ruppert | |
| 2010/0070382 A1 | 3/2010 | Inghelbrecht | |
| 2012/0194357 A1 | 8/2012 | Ciolli | |
| 2012/0293659 A1 | 11/2012 | Bandou | |
| 2013/0208084 A1 | 8/2013 | Brunner | |
| 2013/0241926 A1 | 9/2013 | Asaria | |
| 2013/0258045 A1 | 10/2013 | Wojciech | |
| 2013/0260727 A1 | 10/2013 | Knudson | |
| 2014/0010412 A1 | 1/2014 | Price | |
| 2014/0129386 A1 | 5/2014 | Ghouri | |
| 2014/0129388 A1 | 5/2014 | Frederick | |
| 2014/0279868 A1 | 9/2014 | Astorg | |
| 2014/0304156 A1 | 10/2014 | Geller | |
| 2015/0032580 A1 | 1/2015 | Alternatt | |
| 2015/0106195 A1 | 4/2015 | Holman | |
| 2016/0100087 A1 | 4/2016 | Scheich | |
| 2016/0140734 A1 | 5/2016 | Kato | |
| 2016/0173740 A1 | 6/2016 | Corby | |
| 2016/0346892 A1 | 12/2016 | Bhapkar | |
| 2017/0070653 A1 | 3/2017 | Irschick | |
| 2017/0076482 A1 | 3/2017 | Liu | |
| 2018/0012110 A1* | 1/2018 | Souche | G06V 10/454 |
| 2018/0330395 A1 | 11/2018 | Lee | |
| 2020/0355632 A1* | 11/2020 | Morton | G01V 5/26 |

FOREIGN PATENT DOCUMENTS

| | | | |
|---|---|---|---|
| WO | WO 2011090163 A1 | 7/2011 | |
| WO | WO 2013130664 A1 | 9/2013 | |

OTHER PUBLICATIONS

"DaimlerChrysler Services Adds Internet Simulcast Technology to the Auction Block"; PR Newswire; New York [New York] Jun. 30, 2004:1; Year 2004; retrieved via ProQuest (3 pages).

"FordDirect's New Dealer Connection Video Showroom Makes Vehicle Inventory Search Social: New web 2.0 platform allows consumers to search up-to-date vehicle inventory directly from dealership's digital platforms including Facebook, YouTube, and blogs"; PR Newswire New York: PR Newswire Association, LLC; Feb. 5, 2012; retrieved from https://dialog.proquest.com/professional/printviewfile?accountid=131444 on Feb. 12, 2022 (2 pages).

Tara Siegel Bernard; "Car dealers Wince at a site to end sales haggling"; New York Times, Feb. 10, 2012; retrieved from https://www.nytimes.com/2012/02/11/your-money/car-dealers-wince-at-a-site-to-end-sales-haggling.html (15 pages).

* cited by examiner

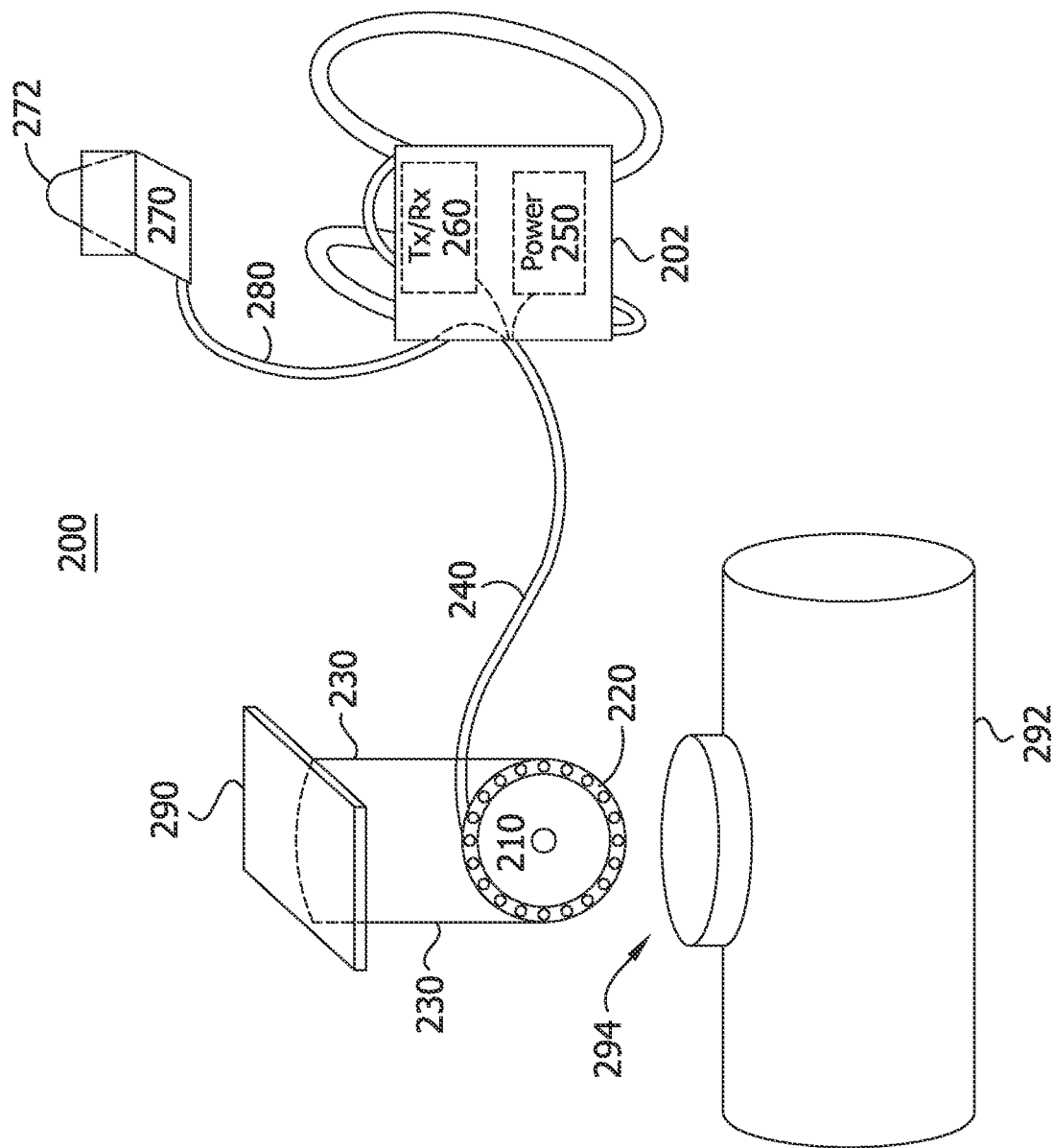

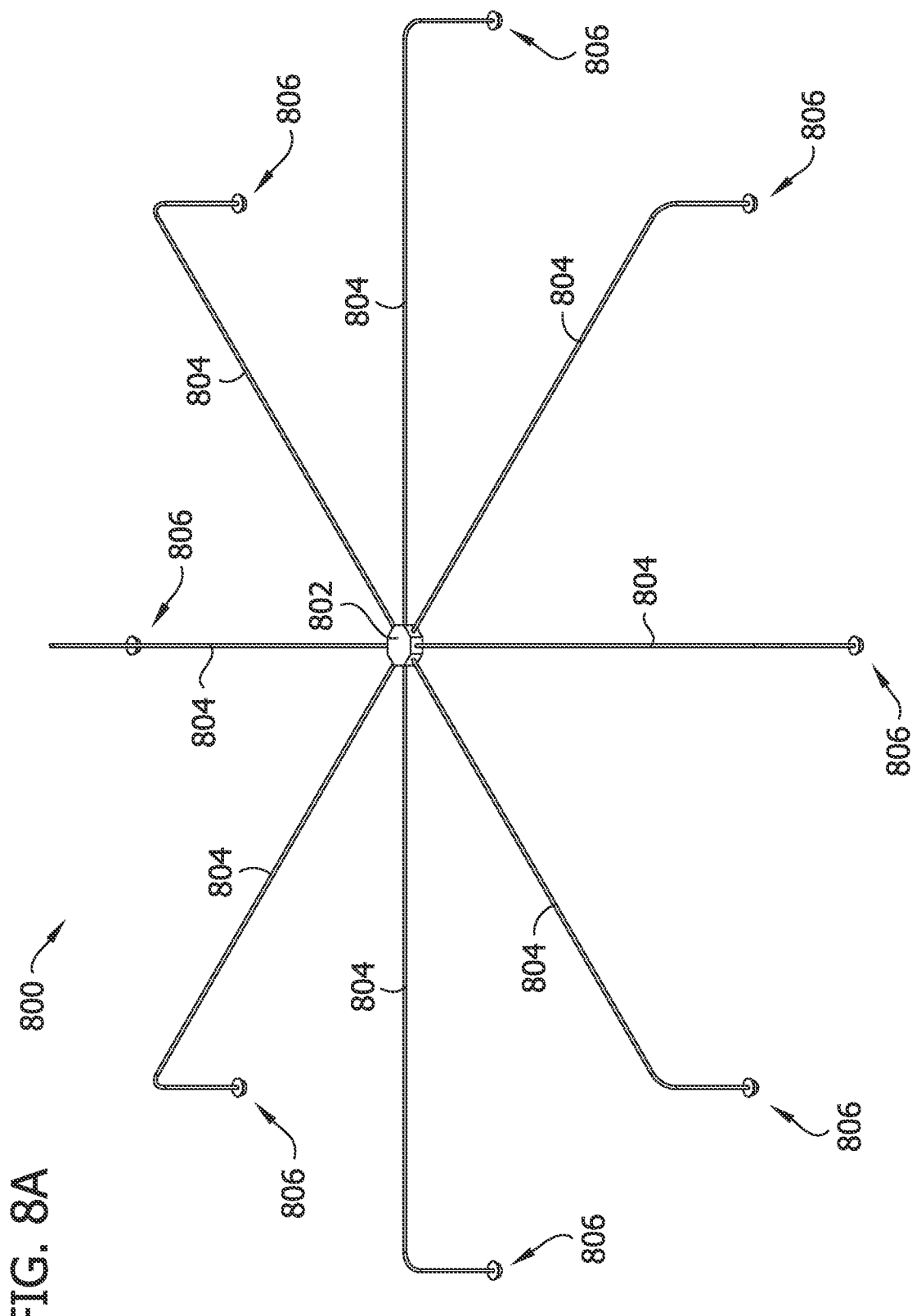

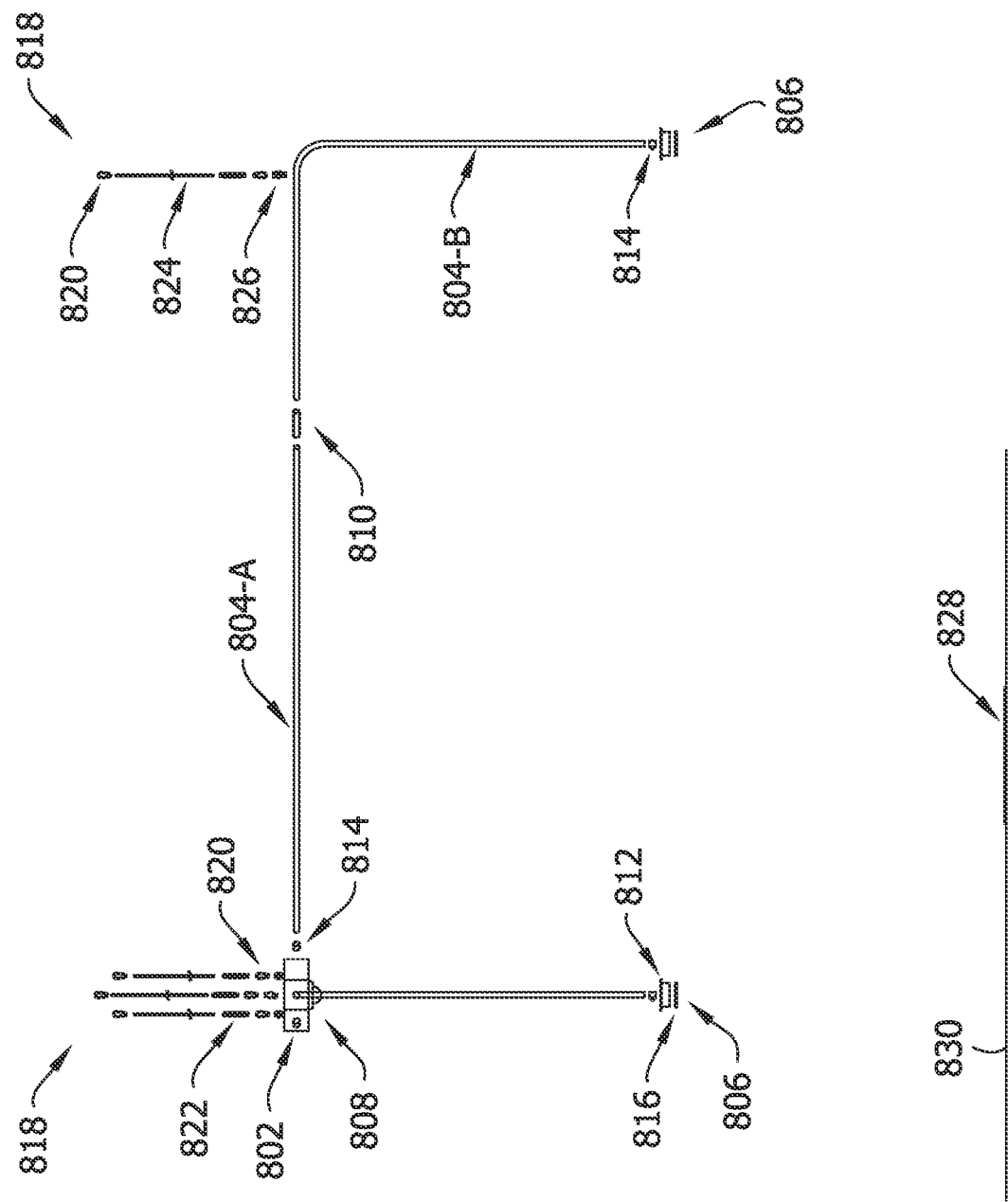

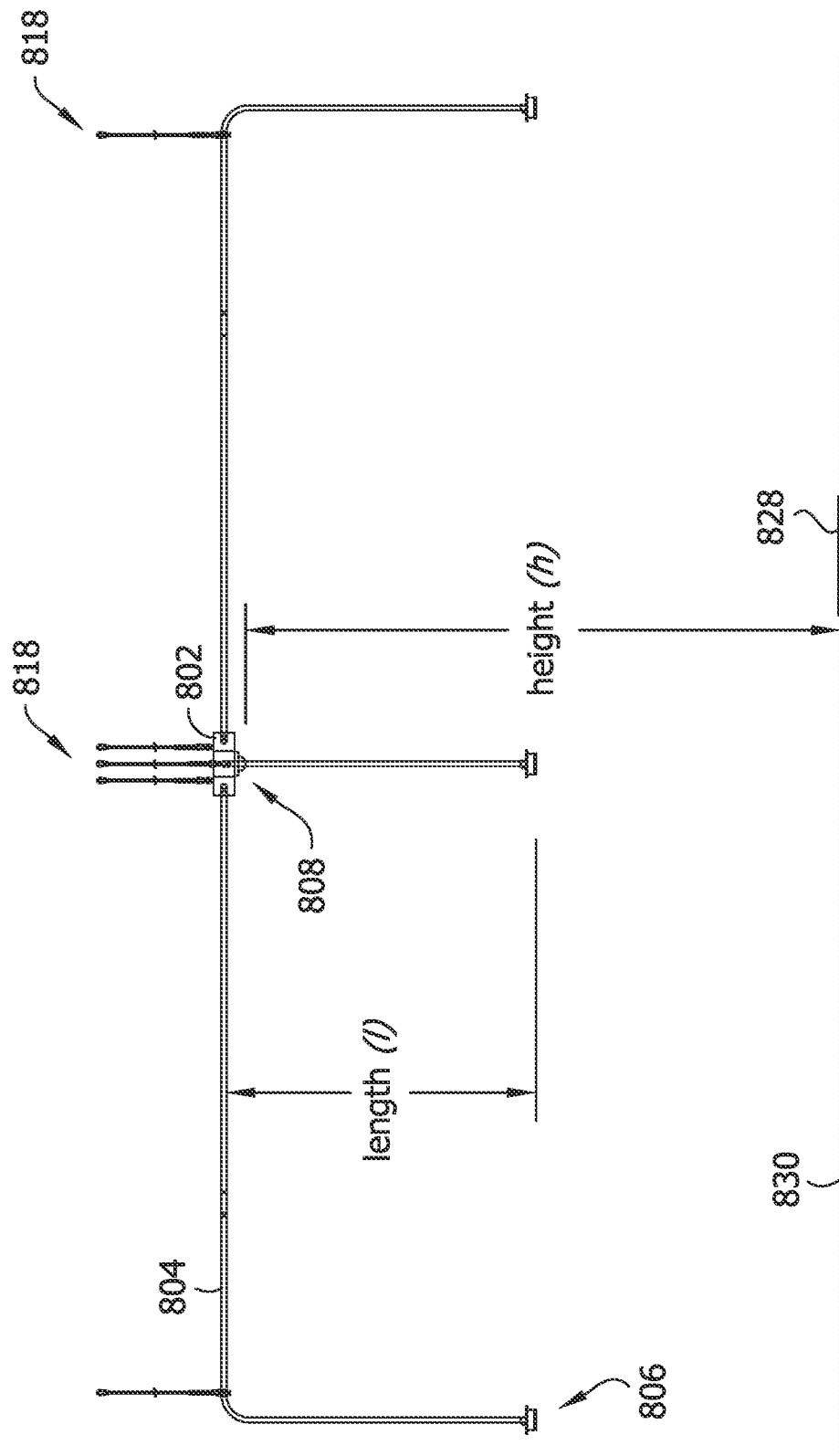

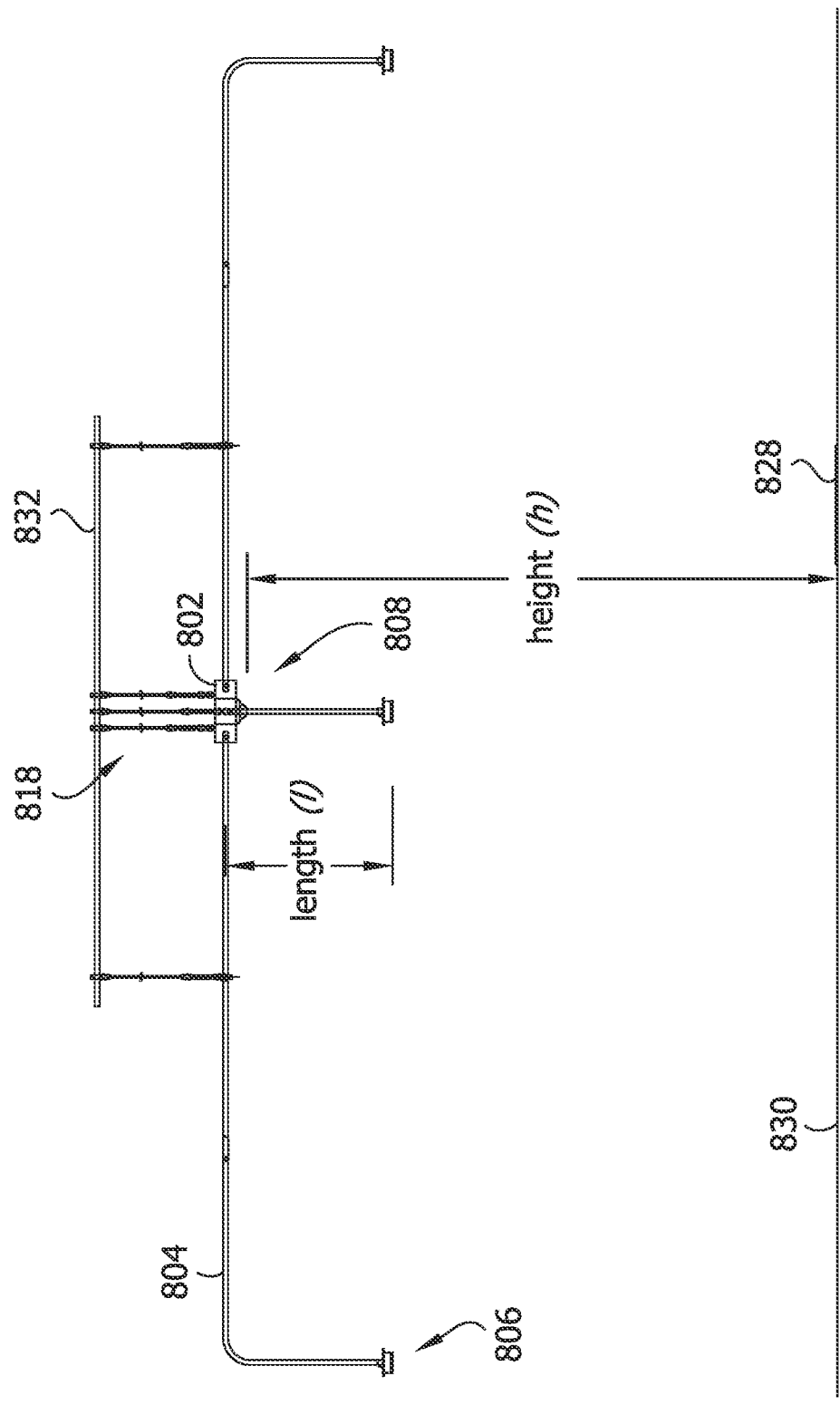

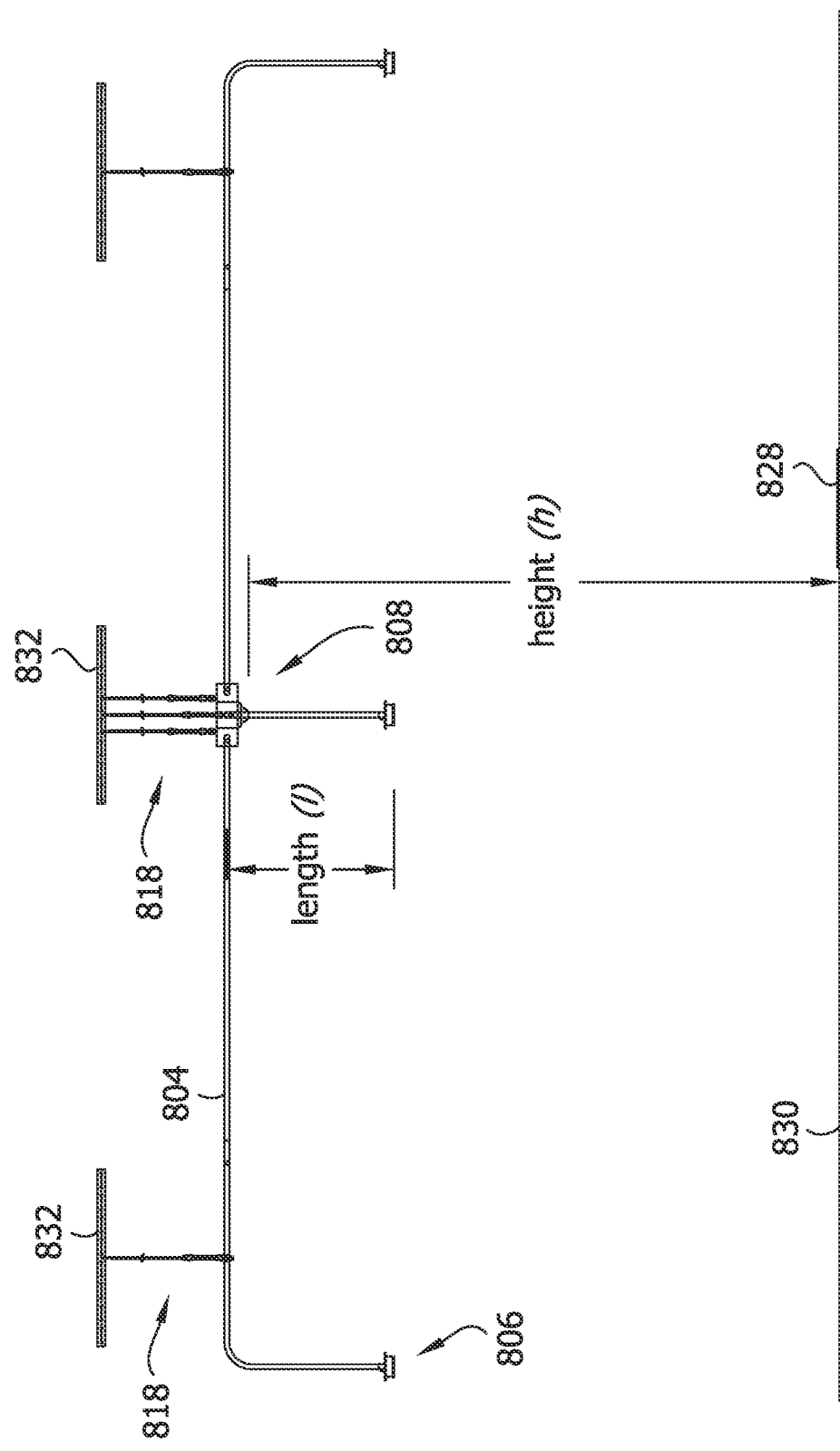

FIG. 12A

| Criterion Identifier | Criterion Value |
|---|---|
| 1202-A — Make | Subaru — 1204-A |
| 1202-B — Model | BRZ — 1204-B |
| 1202-C — Color | Red — 1204-C |
| 1202-D — Year | 2013 — 1204-D |
| 1202-E — Scratch Percentage | 2 — 1204-E |
| 1202-F — Largest Scratch Length (Inches) | 6 — 1204-F |
| 1202-G — Largest Scratch Width (Inches) | 0.5 — 1204-G |
| 1202-H — Hail Damage Percentage (Maximum) | 10 — 1204-H |
| Undercarriage Oxidization Percentage | 25 |
| Interior Stain Percentage | 5 |
| ... | ... |
| 1202-N — Criterion N | X — 1204-N |

| Criterion Identifier | Criterion Value |
|---|---|
| 1302-A — Make | Any — 1304-A |
| 1302-B — Model | Any — 1304-B |
| 1302-C — Color | Red — 1304-C |
| 1302-D — Year | 2013 — 1304-D |
| 1302-E — Scratch Percentage | 0-5 — 1304-E |
| 1302-F — Largest Scratch Length (Inches) | 7 — 1304-F |
| 1302-G — Largest Scratch Width (Inches) | 0.25 — 1304-G |
| 1302-H — Hail Damage Percentage (Maximum) | > 15 — 1304-H |
| Undercarriage Oxidization Percentage | Any |
| Interior Stain Percentage | 0-30 |
| ... | ... |
| 1302-N — Criterion N | X — 1304-N |

1300

1302    1304

VEHICLE IMAGING AND INSPECTION SYSTEM

CROSS REFERENCE TO RELATED APPLICATIONS

This application is a continuation of U.S. patent application Ser. No. 18/533,995 filed Dec. 8, 2023, which is continuation of U.S. patent application Ser. No. 18/341,504 filed Jun. 26, 2023, now allowed, which is a continuation of U.S. patent application Ser. No. 17/574,025 filed Jan. 12, 2022, now U.S. Pat. No. 11,756,110 issued Sep. 12, 2023, which is a continuation-in-part of U.S. patent application Ser. No. 16/385,329 filed Apr. 16, 2019, which is a continuation-in-part of U.S. patent application Ser. No. 15/012,033 filed Feb. 1, 2016, now U.S. Pat. No. 10,681,261 issued Jun. 9, 2020, which is a continuation-in-part of U.S. patent application Ser. No. 14/574,638 filed Dec. 18, 2014, which is a continuation-in-part of U.S. patent application Ser. No. 14/088,939 filed Nov. 25, 2013, which claims the benefit of U.S. Provisional Patent Application No. 61/792,258 filed Mar. 15, 2013 and U.S. Provisional Patent Application No. 61/732,078 filed Nov. 30, 2012. U.S. patent application Ser. No. 16/385,329 is also a divisional of U.S. patent application Ser. No. 14/575,260 filed Dec. 18, 2014, now U.S. Pat. No. 10,269,059 issued Apr. 23, 2019, which is a continuation-in-part of U.S. patent application Ser. No. 14/574,638 filed Dec. 18, 2014. U.S. patent application Ser. No. 14/575,260 also claims the benefit of U.S. Provisional Patent Application No. 61/920,576 filed Dec. 24, 2013 and U.S. Provisional Patent Application No. 61/918,492 filed Dec. 19, 2013. U.S. patent application Ser. No. 17/574,025 is also a continuation-in-part of U.S. patent application Ser. No. 15/945,828 filed Apr. 5, 2018, now U.S. Pat. No. 11,270,350 issued Mar. 8, 2022, which claims the benefit of U.S. Provisional Patent Application No. 62/484,197 filed Apr. 11, 2017. U.S. patent application Ser. No. 15/945,828 is also a continuation-in-part of U.S. patent application Ser. No. 14/575,260. U.S. patent application Ser. No. 15/945,828 is also a continuation-in-part of U.S. patent application Ser. No. 15/012,033. The entire contents of the above applications and patents are incorporated herein by reference for all purposes.

BACKGROUND

Consumers usually make purchases in one of two ways. The first, a traditional approach, involves visiting a dealer or merchant's place of business, listening to a salesperson's pitch, testing selected goods, and then haggling over price. Similarly, consumers purchase real estate by the traditional approach by visiting and touring the real estate and then haggling over price. This approach advantageously provides consumers an opportunity to view the particular product or real estate in-person and receive hands-on demonstrations of features and options or the ability to view it in its entirety. However, this approach is time-consuming and interacting with a salesperson can be intimidating for many consumers.

The second approach involves a "virtual showroom" where consumers can research and price goods, real estate, and the like on the Internet. This approach advantageously allows consumers to search for goods or real estate in less time and with less salesperson interaction than the traditional approach. Unfortunately, when visiting a virtual showroom, consumers are often limited to stock photographs and generic information and must forego the more traditional "walk around" experience. Current systems and methods of acquiring photographs and/or videos of goods or real estate and making them available on the Internet are labor-intensive and require skillful use of technologically advanced devices and software. Consequently, even if actual photographs and/or videos of a particular product, real estate, or the like are available, they are often limited in scope and cannot adequately convey how a product or real estate appears in-person and its actual condition. In addition, the information available is often non-specific and relates generally to a make and model rather than specifically to the particular item. In other words, consumers sacrifice advantageous aspects of the traditional goods or real estate purchasing approach in order to enjoy the convenience and other advantages of the virtual showroom approach.

Moreover, many virtual sellers often employ a "no haggle" pricing model. As a result, it becomes important for virtual sellers to make a high volume of sales. A virtual seller attempting to make a high volume of sales must quickly acquire information about goods or real estate in its inventory, including photographs and/or videos of the goods or real estate, and make that information available to consumers on the Internet. Conventional systems and methods are unable to acquire photographs and/or videos of goods or real estate and post them on the Internet with the necessary throughput to keep up with the quick turnaround of high-volume sales.

SUMMARY

In accordance with an embodiment of the invention, the front-end of an automated studio collects images and/or videos of items under inspection, such as vehicles, goods, real estate, or the like and makes them available on the Internet. An aspect of this end-to-end solution captures images and other information of an item under inspection, processes and stores the images and information, and adds the item to a virtual showroom or other virtual inspection site that presents an inventory of such vehicles, goods, real estate, or the like. This aspect of the solution provides users with ample information about the particular item under inspection. For example, users, such as consumers, can inspect vehicles available in the inventory virtually along with the traditional benefits of a showroom. Further, this aspect of the solution provides sellers with a user-friendly and quick way of acquiring images and information about the items and creating a virtual showroom to display them (e.g., 7 minutes or less per item under inspection). This aspect makes high-volume "no-haggle" sales tactics economical to employ. Also in accordance with aspects of the invention, image acquisition is automated in conjunction with the movement of an item under inspection from a first location to a second location. Additionally, in accordance with aspects of the invention, the processing of the imaged item can include the identification or detection of damage, defects, and/or other identifiable features with the execution of computer-executable functions.

In an aspect, a system for acquiring images of an item, such as a vehicle, includes a gantry structure that has a first leg, a second leg, a cross beam, a first plurality of side view cameras, a second plurality of side view cameras, and a processor. The first leg and the second leg are located between a first predefined location and a second predefined location on opposite sides of a travel path for the vehicle. The cross beam is located above the travel path and bridges the first and second legs. Each plurality of side view cameras is affixed to a corresponding leg (i.e., the first plurality of cameras is affixed to the first leg). The side view cameras are configured for acquiring image data of the exterior of the vehicle traveling on the path from the first predefined location to the second predefined location. The processor is configured for executing computer-executable functions for processing the images from one or more of the side view cameras.

In another aspect, a system for acquiring images of an item, such as a vehicle, includes a first camera tower, a second camera tower, a camera boom, a first plurality of side view cameras, and a second plurality of side view cameras. The first camera tower and the second camera tower are located between a first predefined location and a second predefined location on opposite sides of a travel path for the vehicle. The camera boom is affixed to the first camera tower and extends toward the second camera tower above the travel path. Each plurality of side view cameras is affixed to a corresponding camera tower (i.e., the first plurality of cameras is affixed to the first camera tower). The side view cameras are configured for acquiring image data of the exterior of the vehicle traveling on the path from the first predefined location to the second predefined location.

In yet another aspect, a method of identifying or detecting damage or defects in the exterior of an item, such as a vehicle, includes the steps of providing a front-end image acquisition component, a database, and a processor, acquiring a series of new images of the vehicle with the front-end image acquisition component, and using a processor to execute computer-executable functions. The front-end image acquisition component has a plurality of cameras configured for recording a series of new images of the vehicle. The database includes previously acquired images of the same or other vehicles and information associated with the previously acquired images. The processor is configured for executing computer-executable functions for processing the new images taken by one or more of the plurality of cameras. The acquisition of new images of the vehicle involves the activation of one or more of the plurality of cameras in the front-end image acquisition component as the vehicle moves on a path from a first predefined location to a second predefined location. The processor is configured to execute computer-executable functions that compare the new images taken by the front-end image acquisition component with the contents of the database to identify or detect damage or defects in the exterior of the vehicle.

Other objects and features will be in part apparent and in part pointed out hereinafter.

BRIEF DESCRIPTION OF THE DRAWINGS

FIG. 2A is a diagram of a mobile image acquisition apparatus comprised of various components for use in the automated studio of FIG. 1 in accordance with an embodiment of the invention.

FIGS. 8A and 8B illustrate an imaging apparatus comprised of cameras, arms, and a hub for use in the automated studio of FIG. 1 in accordance with an embodiment of the invention.

FIGS. 9A-9D illustrate the imaging apparatus of FIGS. 8A and 8B with supports in accordance with an embodiment of the invention.

FIGS. 10A-10D and 11A-11D illustrate the imaging apparatus of FIGS. 8A and 8B with supports and a structure mount in accordance with an embodiment of the invention.

FIG. 12A is a block diagram illustrating a data structure for criterion identifiers and associated criterion values for an item of interest according to an embodiment of the invention.

FIG. 13A is a block diagram illustrating a data structure for criterion identifiers and associated criterion values for a desired item according to an embodiment of the invention.

Corresponding reference characters indicate corresponding parts throughout the drawings.

Corresponding reference characters indicate corresponding parts throughout the drawings.

DETAILED DESCRIPTION OF THE INVENTION

Figure 1:
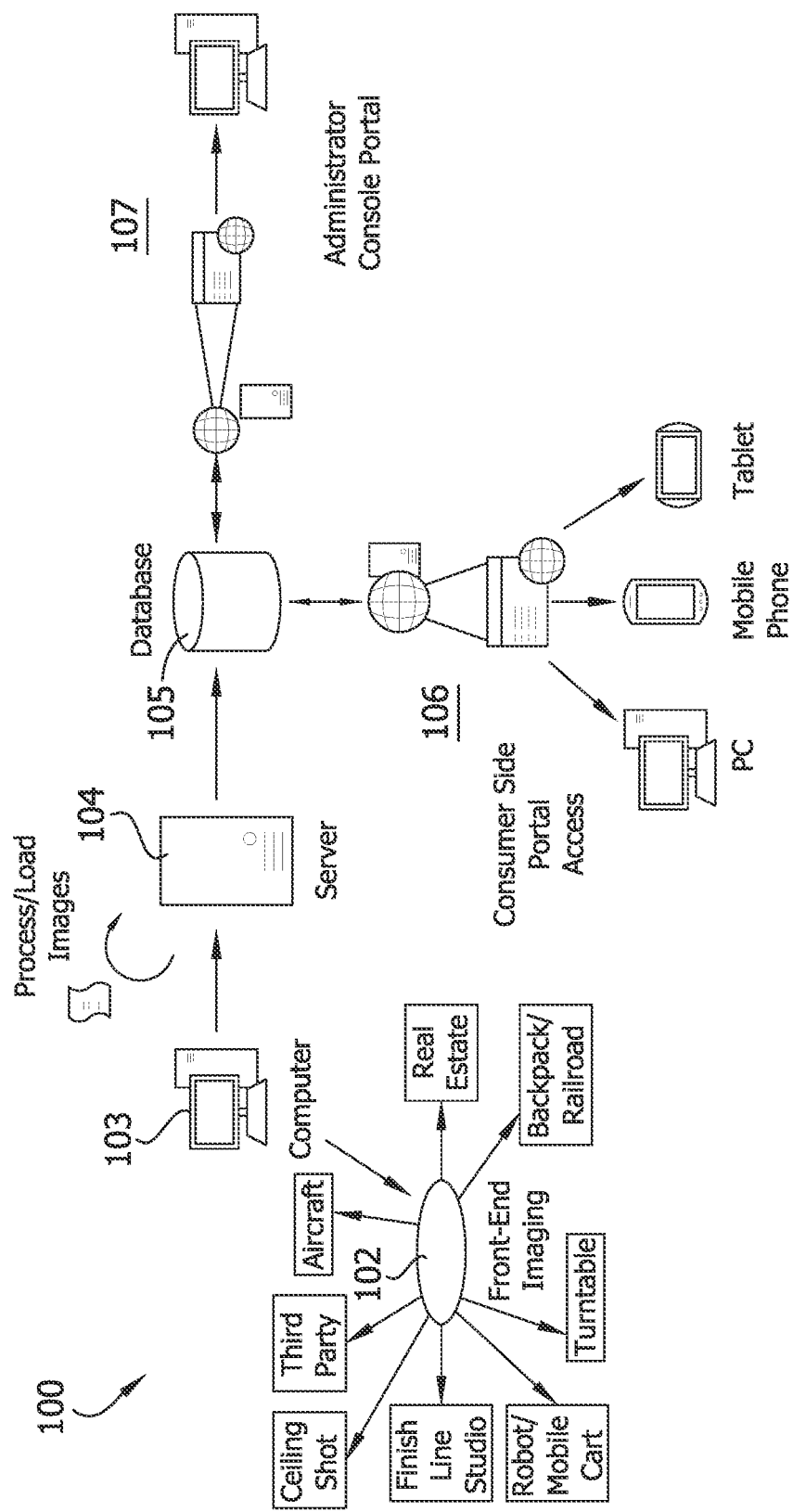
FIG. 1 is a diagram of an automated studio comprised of various components in accordance with an embodiment of the invention.

FIG. 1 illustrates an automated studio, generally indicated at 100, embodying aspects of the present invention. In accordance with aspects of the present invention, the automated studio 100 collects images and/or videos of objects or scenes and makes them available on the Internet.

In an embodiment, automated studio 100 includes a front-end image acquisition component 102 and a computer 103. The studio 100 communicates via a server 104 to a database 105, end-user console portals 106, and administrator console portal 107. The front-end image acquisition component 102 is communicatively connected to the computer 103, which is communicatively connected to the server 104. As shown in FIG. 1, server 104 is communicatively connected to the database 105, which is communicatively connected to the consumer-side portal access 106 and the administrator console portal 107.

The automated studio 100 provides an end-to-end solution in which images of a particular object are acquired, processed, stored, and used to create an entry for the object in an online inventory of objects, all with minimal human effort and in a short enough period of time to make a high volume of image acquisitions economically feasible. In an aspect, automated studio 100 provides simplicity and portability and employs software that can be utilized across multiple sites and platforms and is easy to use, install, and support. Contemplated objects include, by way of example and not limitation, automobiles, boats, watercraft, recreational vehicles, motorcycles, all-terrain vehicles, trailers, aircraft, vessel interiors, real estate and associated structures and fixtures, and the like. Beneficially, automated studio 100 provides improvements in the fields of automated object imaging, online marketplaces, and transportation maintenance and safety by providing a means to acquire images of a particular object and upload them to an online inventory or database in a small amount of time and with little or no human involvement.

According to aspects of the invention, front-end image acquisition component 102 is adapted for acquiring images of an object of interest. As used herein, images include still photographs (e.g., snap shots), moving photographs (e.g., videos or movies), panoramics, stereoscopic photographs, infrared images, or any combination thereof. In addition to acquiring images of an entire object, images of only a portion of an object may be acquired. For example, front-end image acquisition component 102 is configured for taking images of identifying information or any areas of the object that are particularly noteworthy, such as damaged areas, areas most likely to be damaged, identification numbers, and the like. It is also contemplated that a salesperson can provide a video demonstration of the object's features and options to be integrated into the final virtual showroom or inventory.

Referring further to FIG. 1, computer 103 executes computer-readable instructions embodied in software, namely, an automatic photography application that integrates with front-end image acquisition component 102. In one embodiment, computer 103 displays, on a graphical user interface (GUI), a systematic process for acquiring images of an object and receives commands from a user to acquire the images. For example, computer 103 may display on a GUI acquired images and stock images in a grayscale format for images from perspectives that have yet to be acquired. FIGS. 7A-7F illustrate an exemplary GUI for acquiring images and/or information and receiving commands from a user. In this embodiment, the software, preferably stored on a non-transitory computer-readable medium, such as a memory device associated with computer 103, implements the commands and acquires the images for use in generating an inventory or showroom experience by manipulating front-end image acquisition component 102. In another embodiment, computer 103 functions as a repository for images acquired by front-end image acquisition component 102 so that a user may manipulate the images in various ways. In another embodiment, computer 103 functions as an intermediary between front-end image acquisition component 102 and server 104. Further embodiments of computer 103 are disclosed herein and in U.S. patent application Ser. No. 14/088,939, incorporated herein by reference above.

The server 104 of FIG. 1 hosts (e.g., stores and/or distributes) the acquired images for use by consumers or sellers via the Internet. Server 104 receives acquired images from computer 103 and stores them on computer-readable media. In an embodiment, server 104 inventories, compresses, stitches, or otherwise processes the received images in addition to, or in the absence of, such actions by computer 103 or front-end image acquisition component 102. Further embodiments of server 104 are disclosed herein and in U.S. patent application Ser. Nos. 16/385,329, 15/012,033, 14/575,260, and 14/088,939, incorporated herein by reference above.

Referring further to FIG. 1, database 105 is associated with server 104 for organizing stored images and content. Database 105 may reside on server 104 or on an external computing device that is connected to server 104 via a communications channel. Database 105 stores the acquired images along with metadata or other corresponding information relating to the images and/or the objects themselves. For example, database 105 can store information corresponding to imaged vehicles including, by way of example and not limitation, vehicle stock number, vehicle identification number (VIN), vehicle color, vehicle make, vehicle model, vehicle type, objective vehicle condition information, and the like. In one embodiment, the information contained in database 105 is used with a website template stored on server 104 or an external server for showcasing the objects to consumers via a virtual showroom. Database 105 is capable of using various standards, such as SQL, ODBC, and JDBC, for example. Exemplary database management systems (DBMS) include MySQL, Microsoft SQL Server, Oracle, and SAP. Database 105 and the information it contains is accessible via the Internet, such as through the use of a web browser or an API. In an exemplary embodiment, database 105 is accessible to end-user console portals 106 and/or an administrator console portal 107, as disclosed in U.S. patent application Ser. Nos. 14/088,939, 14/575,260, and 14/574,638, incorporated herein by reference above. Further embodiments of database 105 are disclosed herein and in U.S. patent application Ser. Nos. 14/088,939, 14/575, 260, and 14/574,638, incorporated herein by reference above.

In an embodiment, database 105 is configured such that the acquired images and data stored in the database can be mined for patterns, analogous values, and the like. In an exemplary embodiment, computing devices implementing machine learning algorithms and/or other data analysis techniques (e.g., image processing, pattern recognition, natural language processing, artificial intelligence, etc.) analyze the images and/or data stored in database 105, as disclosed in U.S. patent application Ser. No. 15/945,828, incorporated herein by reference above. By way of example only, the computing devices can be programmed to identify defects or damaged components in an imaged vehicle.

The consumer-side portal 106 shown in FIG. 1 provides a means for users, such as consumers, to access the acquired images, content, and information stored in database 105. In one embodiment, consumer-side portal 106 is a computing device, such as a personal computer, a mobile device, a tablet computing device, and the like. Further embodiments of consumer-side portal 106 are disclosed herein and in U.S. patent application Ser. Nos. 16/385,329, 15/012,033, 14/575,260, and 14/088,939, incorporated herein by reference above. It is to be understood that the users of consumer-side portal 106 need not be purchasers of goods or real estate. Instead, such users include inspectors, inventory/property managers, maintenance personnel, etc.

As shown in FIG. 1, administrator console portal 107 provides a means for managing information stored in database 105 and/or on server 104. In one embodiment, the information contained in database 105 is used with administrator console portal 107 stored on server 104 or an external server for managing an inventory of objects or acquired images. Such an inventory management application advantageously allows for easily tracking the progress of an object among the various stages of automated studio 100 (e.g., image acquisition, image processing, and inventory creation). In one embodiment, a seller can execute an administrator console portal 107 application remotely (e.g., via a web application) to provide an automated ticketing process for tracking object progress. Administrator console portal 107 also provides metrics and reporting data and tracks objects, customers, and process information. In addition, administrator console portal 107 provides access to detailed logs and reporting to troubleshoot object-processing errors. The metadata and other corresponding information relating to the images and/or the objects permit a user to determine the location of image and video files. Further embodiments of administrator console portal 107 are disclosed herein and in U.S. patent application Ser. Nos. 16/385,329, 15/012,033, 14/575,260, and 14/088,939, incorporated by reference above.

In an embodiment, automated studio 100 includes server 104, database 105, consumer-side portal access 106, and administrator console portal 107 in addition to front-end image acquisition component 102 and computer 103.

In addition to the embodiments described above, embodiments of the present disclosure may comprise a special purpose computer including a variety of computer hardware, as described in greater detail below.

Embodiments within the scope of the present disclosure also include computer-readable media for carrying or having computer-executable instructions or data structures stored thereon. Such computer-readable media can be any available media that can be accessed by a special purpose computer. By way of example, and not limitation, computer-readable storage media include both volatile and nonvolatile, removable and non-removable media implemented in any method or technology for storage of information such as computer readable instructions, data structures, program modules or other data. Computer storage media are non-transitory and include, but are not limited to, random access memory (RAM), read only memory (ROM), electrically erasable programmable ROM (EEPROM), compact-disk ROM (CD-ROM), digital versatile disks (DVD), or other optical disk storage, solid state drives (SSDs), magnetic cassettes, magnetic tape, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the disclosure may be implemented. Although not required, aspects of the disclosure will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of the program code means for executing steps of the methods disclosed herein. The particular sequence of such executable instructions or associated data structures represent examples of corresponding acts for implementing the functions described in such steps.

Those skilled in the art will appreciate that aspects of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwire links, wireless links, or by a combination of hardwired or wireless links) through a communications network. In a distributed computing environment, program modules may be located in both local and remote memory storage devices.

An exemplary system for implementing aspects of the disclosure includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes nonvolatile and volatile memory types. A basic input/output system (BIOS), containing the basic routines that help transfer information between elements within the computer, such as during stat-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a removable magnetic disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for strong data can be used, including magnetic cassettes, flash memory cards, digital video disks, Bernoulli cartridges, RAMs, ROMs, SSDs, and the like.

Communication media typically embody computer readable instructions, data structures, program modules or other data in a modulated data signal such as a carrier wave or other transport mechanism and includes nay information discovery media.

One or more aspects of the disclosure may be embodied in computer-executable instructions (i.e., software), routines, or functions stored in system memory or nonvolatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets, and the Internet.

When used in a LAN networking environment, the computer is connected to the local network through a network interface or adapter. When used in a WAN networking environment, the computer may include a modem, a wireless link, or other means for establishing communications over the WAN, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over WAN may be used.

Preferably, computer-executable instructions are stored in a memory, such as the hard disk drive, and executed by the computer. Advantageously, the computer processor has the capability to perform all operations (e.g., execute computer-executable instructions) in real time.

The order of execution or performance of the operations in the embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects of the disclosure.

Embodiments may be implemented with computer-executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures described herein. Other embodiments may include different computer-executable instructions or components having more or less functionality than illustrated and described herein.

FIG. 12A illustrates a detailed criteria data structure 1200, for criterion identifiers and corresponding values that are associated with an item of interest, in accordance with an embodiment of the invention. In one embodiment, detailed criteria data structure 1200 is adapted to provide data representing an item of interest (e.g., a vehicle) in an objective manner.

The detailed criteria data structure 1200 comprises a first group of criterion identifier fields 1202, which include data that represents various criterion identifiers by which the item of interest may be identified or evaluated. For example, the criterion identifier fields 1202 may include data representing criterion identifiers that ascertain the item of interest, such as a VIN, make, model, and the like of a vehicle. Further, criterion identifier fields 1202 may include data representing evaluating criteria such as a percentage of an item of interest that is damaged and dimensions of damaged areas. It is to be understood by one skilled in the art that the criterion identifier fields 1202 may also include data representing evaluating criteria that are subjective, such as condition categories and opinions on the value of the item of interest.

Referring further to FIG. 12A, the detailed criteria data structure 1200 also has a second group of criterion value fields 1204 including data that represents values associated with a corresponding criterion identifier field 1202. For example, the criterion identifier field 1202-C includes data representing a criterion identifier of "color" and corresponding criterion value field 1204-C includes data representing a value of "red."

In one embodiment, detailed criteria data structure 1200 is stored in database 105 on server 104. In a further embodiment, criterion identifier fields 1202 and criterion value fields 1204 include data that is presented to a user via various components of a comprehensive condition report.

One embodiment of detailed criteria data structure 1200 provides a benefit of reduced network bandwidth usage. This benefit may be provided by detailed objective information of detailed criteria data structure 1200 and allows finite communications network resources to be used to carry out other tasks. Additionally, detailed criteria data structure 1200 may reduce the usage of computing resources of server 104 while still providing users with desired information about a desired item or item of interest. Moreover, increased user efficiency provided by detailed criteria data structure 1200 results in reduced usage of stored electrical energy in a battery powering a display device in end-user console portals 106 on which data from detailed criteria data structure 1200 is displayed. In another embodiment, detailed objective information provided by detailed criteria data structure 1200 about an item of interest allows consumers to realize advantages of both the traditional goods or real estate purchasing approach and the virtual showroom approach. Further, detailed criteria data structure 1200 can improve the efficiency of automated search processes involving database 105, as discussed in greater detail below with respect to FIG. 12C.

Figure 12B:
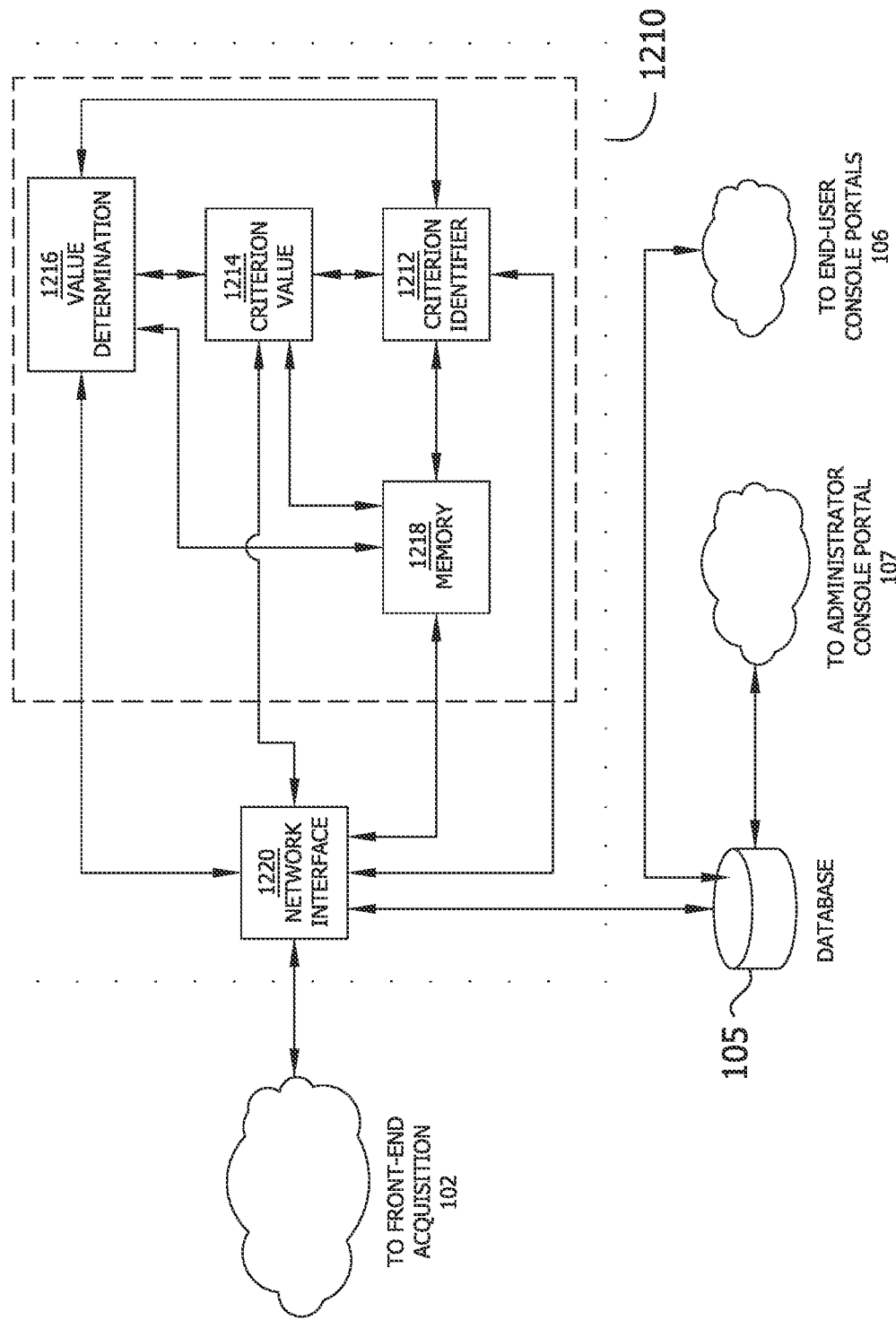
FIG. 12B illustrates a component for determining criterion values associated with criterion identifiers for an item of interest according to an embodiment of the invention.

FIG. 12B illustrates a detailed criteria component 1210, which is adapted for determining values that are represented by data included in criterion identifier fields 1202 and criterion value fields 1204. In the embodiment illustrated by FIG. 12B, the detailed criteria component 1210 is presented in tangible form as a computer-executable module on server 104. However, it is to be understood by one skilled in the art that detailed criteria component 1210 may also be implemented as a digital or analog electronic circuit. Detailed criteria component 1210 comprises sub-components, including a criterion identifier component 1212, a criterion value component 1214, a value determination component 1216, and a memory 1218. Also included in this embodiment is a network interface 1220 of server 104.

The network server interface 1220 is communicatively connected to front-end information acquisition components 102 and database 105 via communications networks, such as the Internet. The network interface 1220 is also communicatively connected to the memory 1228, the criterion identifier component 1212, the criterion value component 1214, and the value determination component 1216. In this manner, network interface 1220 is also communicatively connected to detailed criteria component 1210. These communicative connections between network interface 1220 and other components included within server 104 may be accomplished via electrical interconnects. Memory 1218 is also electrically connected to criterion identifier component 1212, criterion value component 1214, and value determination component 1216. Further, criterion identifier component 1212, criterion value component 1214, and value determination component 1216 are each electrically connected to one another.

The network interface 1220 is adapted for facilitating data communication between front-end information acquisition components 102, database 105, and detailed criteria component 1210 and its various sub-components. Memory 1218 is adapted for storing data utilized and/or generated by criterion identifier component 1212, criterion value component 1214, and value determination component 1216.

Criterion identifier component 1212 is adapted for providing data representing a current criterion identifier, such as criterion identifier field 1202-F that corresponds to a largest scratch length value of a scratch on a vehicle of interest. Value determination component 1216 is adapted for determining a value corresponding to the current criterion identifier provided by criterion identifier component 1212. In one embodiment, further explained below with respect to FIG. 12C, value determination component 1216 utilizes data provided by criterion identifier component 1212 and an image obtained from front-end information acquisition components 102 via network interface 1220 to determine the value corresponding to the current criterion identifier provided by criterion identifier component 1212.

Criterion value component 1214 is adapted for providing data representing the determined current criterion value. In one embodiment, criterion value component 1214 provides data representing the value in criterion value field 1204-F that corresponds to a value of "6" for the largest scratch length value of a scratch on the vehicle of interest. The data provided by criterion value component 1214 may be received from value determination component 1216. The data provided by criterion value component 1214 may also be received from front-end information acquisition components 102 via either network interface 1220 or memory 1218.

In an embodiment, detailed criteria component 1210 provides advantages including increased user efficiency, reduced network bandwidth usage, and reduced computing resource utilization due to detailed information provided by detailed criteria component 1210.

Figure 12C:
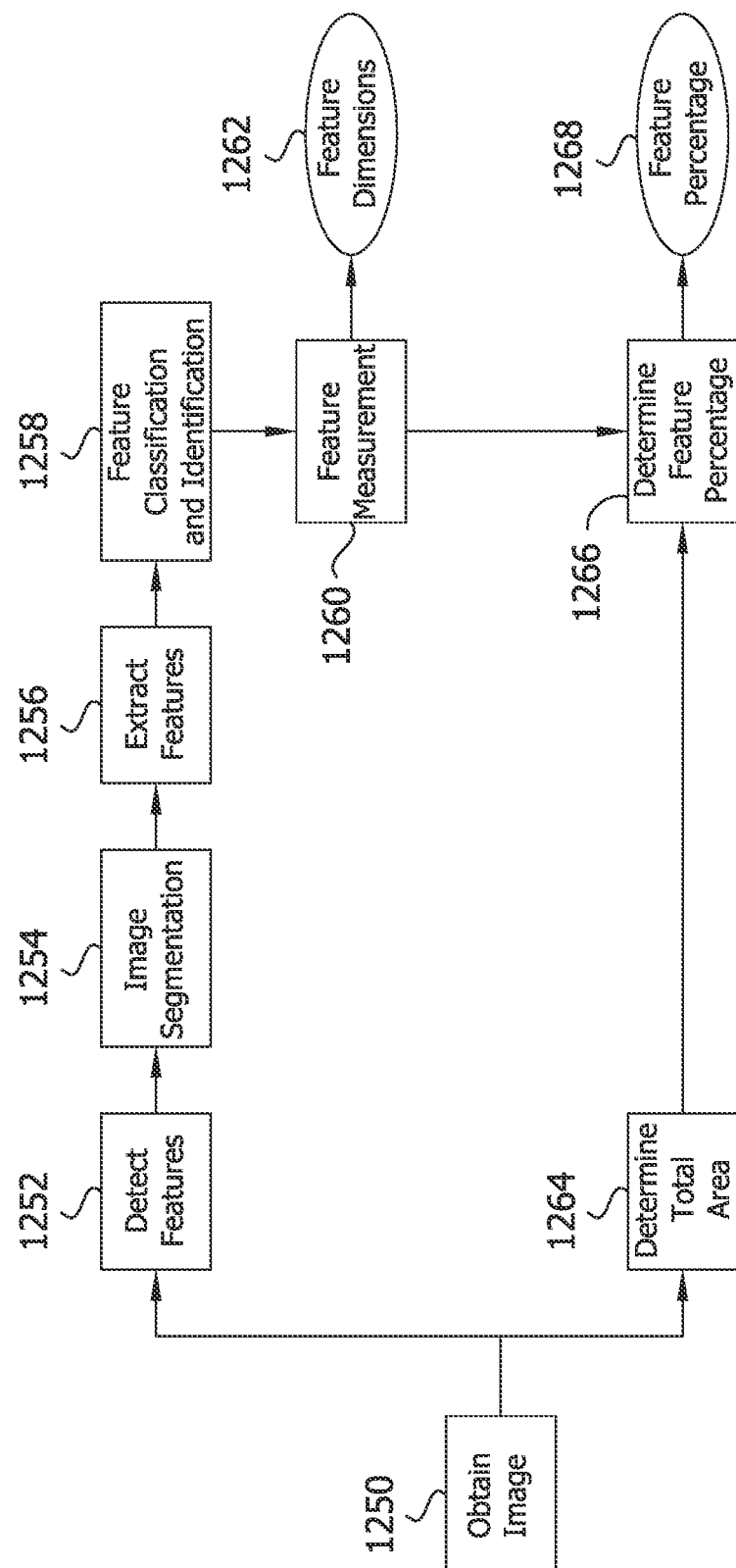
FIG. 12C is a flow chart illustrating a method of determining criterion values associated with criterion identifiers for an item of interest according to an embodiment of the invention.

Referring to FIG. 12C, a flow chart illustrates a method of determining values that are represented by data included in criterion value fields 1204. The method includes an image acquisition step 1250, a feature detection step 1252, an image segmentation step 1254, a feature extraction step 1256, a feature identification and classification step 1258, a feature measurement step 1260, a feature dimension output step 1262, an area determination step 1264, a feature percentage step 1266, and a feature percentage output step 1268. In one embodiment, the method steps are embodied in computer-executable instructions executing on server 104. In another embodiment, the method steps may also be implemented by digital or analog electronic circuitry.

In operation according to one embodiment, an image is obtained at image acquisition step 1250 and stored in a computer-readable format. For example, an image is acquired with front-end information acquisition components 102 and transmitted to server 104. Upon completion of the image acquisition step 1250, feature detection step 1252 is performed. In one embodiment, feature detection step 1252 comprises examining each pixel of the acquired image to determine whether a feature is present at a given pixel. Exemplary image features include, but are not limited to, edges, corners (e.g., interest points), regions of interest (e.g., blobs), and ridges. Feature detection step 1252 may utilize feature detection methods such as Canny, smallest univalue segment assimilating nucleus (SUSAN) and features from accelerated segment test (FAST) embodied as computer-executable instructions, for example. Alternatively, feature detection step 1252 may be facilitated by methods that involve accessing photographs and/or associated vehicle information from other vehicles previously acquired and stored in database 105.

In one embodiment, after feature detection step 1252 is completed, image segmentation step 1254 is performed. During image segmentation step 1254, the obtained image is transformed by a partitioning into multiple sets of pixels in order to locate objects and boundaries (e.g., lines, curves) in the obtained image. It is to be understood by one skilled in the art that while image segmentation step 1254 may be omitted and the method may proceed from feature detection step 1252 directly to feature extraction step 1256.

Referring further to FIG. 12C, the feature extraction step 1256 transforms the obtained image into a set of features, such that the set contains relevant information form the obtained image. For example, feature extraction step 1256 may transform an obtained image of a vehicle of interest into a set of scratches on the vehicle. In an embodiment, feature extraction step 1256 transforms the obtained image into a set of features with minimal resources of server 104 and memory 1218. In one embodiment, feature extraction step 1256 comprises general dimensionality reduction techniques, such as principal component analysis and latent semantic analysis, for example. In another embodiment, feature extraction step 1256 utilizes a set of application-dependent features.

After feature extraction step 1256, the method illustrated by FIG. 12C proceeds to the feature identification and classification step 1258, in which one feature from the set of features is identified and classified as being of a certain type. In an embodiment, feature identification and classification step 1258 selects one feature from the set of features produced by feature extraction step 1256 and associates a unique identifier with that feature. The unique identifier given to the selected feature allows that feature to be tracked among more than one image and to be distinguished among other features. The unique identifier can further be tracked with respect to analogous features belonging to another vehicle or vehicles, whether such information is already stored in database 105 or will be collected and/or stored at a later time. When tracked in this manner, the unique identifier given to each selected feature can facilitate machine learning algorithms and/or other data analysis techniques implemented by a processor, which can be used to train the processor for identifying specific features on the vehicle's exterior. In another embodiment, feature identification and classification step 1258 associates a selected feature with a type of features. For example, a feature that corresponds to a scratch on a vehicle of interest may be classified as type "scratch." The classification allows multiple features of the same type to be associated with each other for categorization. In one embodiment, feature identification and classification step 1258 utilizes data provided by criterion identifier component 1212 to provide the classification of the feature.

Still referring to the method illustrated by FIG. 12C, the dimensions of the identified feature are determined by feature measurement step 1260. In an embodiment, feature measurement step 1260 determines the dimensions of the identified feature in terms of pixels. In a further embodiment, feature measurement step 1260 utilizes a predetermined value that is a function of the distance of the imaging device from the imaged object in order to determine the dimensions of the identified feature in real-world units (e.g., inches, centimeters, etc.). In yet another embodiment, feature measurement step 1260 utilizes a known real-world dimension of an object in the same image as the identified feature in order to determine the dimensions of the identified feature in real-world units. The determined dimensions of the identified feature are feature dimensions 1262. In an embodiment, feature dimensions 1262 are provided to criterion value component 1216.

The embodiment of FIG. 12C further determines the total area of a region of interest, which includes the identified feature, at area determination step 1264. In an exemplary embodiment, area determination step 1264 uses edges detected in feature detection step 1252 to determine four edges that comprise the perimeter of a rectangular area of interest. The dimensions of the four edges are determined by feature measurement step 1260. Then, using the dimensions, area determination step 1264 uses the equation that the area of a rectangle is equal to the width of the rectangle multiplied by the length of the rectangle (i.e., A=W×L) to calculate the area of the rectangular area of interest. It is to be understood by one skilled in the art that the total area of regions having other shapes may also be determined. For example, circular areas (i.e., $A=\pi r^2$) and irregularly shaped areas e.g., using a definite integral) may also be determined. In one embodiment, area determination step 1264 determines the area of the region of interest in the unit of pixels. In another embodiment, area determination step 1264 utilizes a predetermined value that is a function of the distance of the imaging device from the imaged object in order to determine the dimensions of the identified feature in real-world units (e.g., inches, centimeters, etc.). In yet another embodiment, area determination step 1264 utilizes a known real-world dimension of an object in the same image as the identified feature in order to determine the dimensions of the identified feature in real-world units.

The feature percentage step 1266 then determines the ratio of the identified feature to the area of the region of interest. In an exemplary embodiment, feature percentage step 1266 determines the area of an item of interest that is scratched and divides that value by the total area of the item of interest to calculate the ratio of the item of interest that is scratched. The determined ratio of the identified feature to the area of the region of interest is feature percentage 1268. In an embodiment, feature percentage 1268 is provided to criterion value component 1216.

FIG. 13A illustrates a desired criteria data structure 1300 for criteria and corresponding values that are associated with a desired item of interest according to an embodiment of the invention. The desired criteria data structure 1300 has a first group of desired criterion identifier fields 1302 comprising data that represents criterion identifiers by which the desired item of interest may be identified or evaluated. In one exemplary embodiment, desired criterion identifier fields 1302 include data representing identifying criteria such as a make, model, color, and the like of a vehicle. Additionally, desired criterion identifier fields 1302 may include data representing evaluating criteria such as a desired percentage level of damage to an item of interest and acceptable dimensions of damaged areas. Moreover, desired criterion identifier fields 1302 may also include data representing evaluating criteria that are subjective, such as acceptable condition categories (e.g., mint, average, fine, poor) and desired opinions on the value of the item of interest (e.g., CONSUMERS DIGEST BEST BUY™).

Referring again to FIG. 13A, desired criteria data structure 1300 also includes a second group of desired criterion value fields 1304, each including data that represents values associated with a corresponding desired criterion identifier field 1302. For example, desired criterion identifier field 1302-G includes data representing a criterion of a maximum scratch width, in inches, acceptable to a user and corresponding desired criterion value field 1304-G includes data representing a value of "0.25." Desired criterion value fields 1304 may also contain data representing acceptable values expressed in other ways. For example, "less than" and "greater than" values, such as "less than 15" of desired criterion value field 1304-H, the "any" of desired criterion value field 1304-A indicating that a user does not have a preference for the corresponding criterion 1302-A, and the range "0-5" of desired criterion value field 1304-E.

In one embodiment, desired criteria data structure 1300 functions as a wish list or favorites list of desired or acceptable criteria and corresponding values for a desired item of interest. In one embodiment, desired criteria data structure 1300 is stored in database 105 on server 104. In a further embodiment, desired criterion identifier fields 1302 and desired criterion value fields 1304 include data that are presented to a user via various components of a comprehensive condition report. In another embodiment, desired criteria data structure 1300 functions as a model for a machine-learning algorithm for identifying features belonging to particular classes of vehicles.

One embodiment of desired criteria data structure 1300 provides a benefit of reduced network bandwidth usage. This benefit may be provided by desired criterion values provided by desired criteria data structure 1300 and allows finite communications network resources to be used to carry out other tasks. Further, desired criteria data structure 1300 may reduce the usage of computing resources on server 104 while still providing users with the ability to locate a desired item or item of interest. Additionally, increased user efficiency provided by desired criteria data structure 1300 results in reduced usage of stored electrical energy in a battery powering a display device in end-user console portals 106. In another embodiment, desired criteria data structure 1300 allows consumers to realize advantages of both the traditional goods or real estate purchasing approach and the virtual showroom approach. Further, detailed criteria data structure 1300 can improve the efficiency of automated search processes involving database 105, as discussed in greater detail below with respect to FIG. 13C.

Figure 13B:
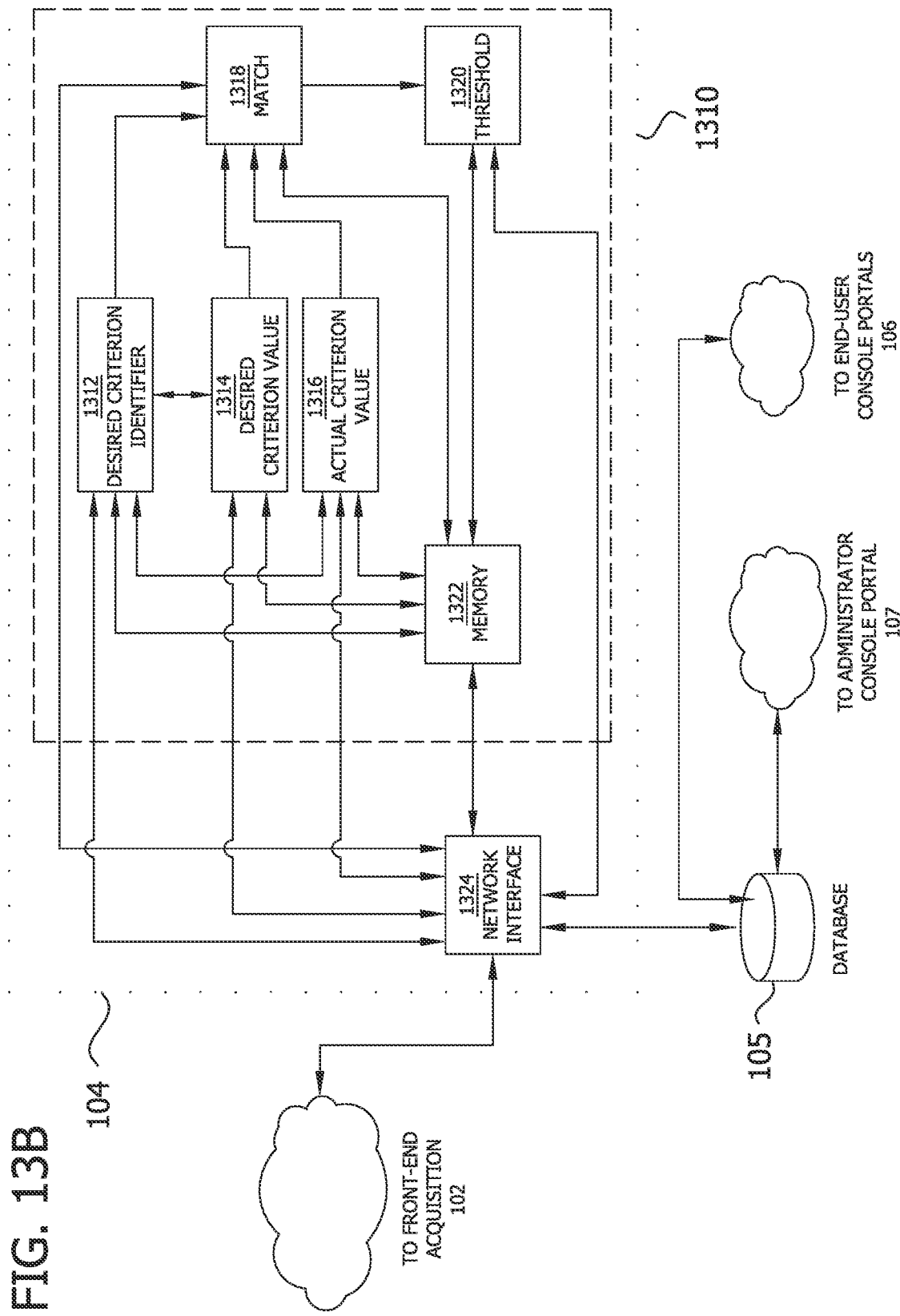
FIG. 13B illustrates a component for determining when a criterion value for a desired item satisfies a criterion value of an item of interest according to an embodiment of the invention.

FIG. 13B illustrates a desired criteria component 1310 that, in one embodiment, is adapted for determining when an actual criterion value matches a desired criterion value. In a further embodiment, desired criteria component 1310 is adapted for determining when an amount of matched criterion values satisfies an acceptable threshold level. The desired criteria component 1310 includes a desired criterion identifier component 1312, a desired criterion value component 1314, an actual criterion value component 1316, a match component 1318, a threshold component 1320, and a memory 1322. In the embodiment of FIG. 13B, desired criteria component 130 is included within server 104, in addition to a network interface 1324.

The network interface 1324 is communicatively connected to front-end information acquisition components 102 and database 105 via communications networks, such as the Internet. Network interface 1324 is also communicatively connected to the desired criterion identifier component 1312, the desired criterion value component 1314, the actual criterion value component 1316, the match component 1318, the threshold component 1320, and the memory 1322. By virtue of network interface 1324 being communicatively connected to the sub-components of desired criteria component 1310, one skilled in the art will understand that network interface 1324 can be said to also be communicatively connected to desired criteria component 1310. Memory 1322 is electrically connected to desired criterion identifier component 1312, desired criterion value component 1314, actual criterion value component 1316, match component 1318, and threshold component 1320. Desired criterion identifier component 1312 is electrically connected to desired criterion value component 1314, actual criterion value component 1316, and match component 1318. Desired criterion value component 1314 and actual criterion value component 1316 are each electrically connected to match component 1318. Moreover, threshold component 1320 is electrically connected to match component 1318.

Referring further to FIG. 13B, the network interface 1324 is adapted for facilitating data communication between front-end information acquisition components 102, database 105, and desired criteria component 1310 and its sub-components. Memory 1322 is adapted for storing data utilized and/or generated by desired criterion identifier component 1312, desired criterion value component 1314, actual criterion value component 1316, match component 1318, and threshold component 1320. In an embodiment, memory 1322 is a memory component on server 104 that may be utilized by additional components of server 104. In another embodiment, memory 1322 is a memory component utilized solely by desired criteria component 1310.

Desired criterion identifier component 1312 is adapted for providing data representing a current desired criterion identifier, such as desired criterion identifier field 1302-H corresponding to a maximum desired percentage of hail damage to a desired vehicle. In one embodiment, desired criterion identifier component 1312 receives the current desired criterion identifier from database 105 via network interface 1324. In a further embodiment, desired criterion identifier component 1312 receives the current desired criterion identifier from memory 1322.

Desired criterion value component 1314 of FIG. 13B is adapted for providing data representing a desired criterion value corresponding to the current desired criterion identifier provided by desired criterion identifier component 1312. In an embodiment, desired criterion value component 1314 provides data representing desired criterion value field 1304H, which corresponds to a value of the maximum desired percentage of hail damage to the desired vehicle. The desired criterion value 1314 may be acquired from database 105 and/or may be generated by a processor at least in part based on previously acquired vehicle information stored in database 105.

Actual criterion value component 1316 is adapted for providing data representing an actual criterion value corresponding to the current desired criterion identifier provided by desired criterion identifier component 1312. In one embodiment, actual criterion value component 1316 provides data representing criterion value field 1204-H, which corresponds to a value of the percentage of hail damage to a vehicle of interest.

Still referring to FIG. 13B, match component 1318 is adapted for determining when the actual criterion value provided by actual criterion value component 1316 satisfies the desired criterion value provided by desired criterion value component 1314. In an embodiment, the data provided by desired criterion identifier component 1312, desired criterion value component 1314, and actual criterion value component 1316 are received by match component 1318. Match component 1318 then compares the actual criterion value and the desired criterion value, as further described below with respect to FIG. 13C. In an embodiment in which the actual criterion value satisfies the desired criterion value, match component 1318 provides the desired criterion identifier and a match indicator to memory 1322, threshold component 1320, and/or network interface 1324. In an embodiment in which the actual criterion value fails to satisfy the desired criterion value, match component 1318 provides the desired criterion identifier and a no-match indicator to memory 1322, threshold component 1320, and/or network interface 1324.

Threshold component 1320 is adapted for determining when a number of match indicators provided by match component 1318 and/or memory 1322 satisfies a threshold value provided by memory 1322 and/or network interface 1324. In one embodiment, data provided by match component 1318 is received by threshold component 1320. In a further embodiment, data stored in memory 1322 is retrieved by threshold component 1320. Threshold component 1320 compares a percent of match indicators to a threshold value, as further described below with respect to FIG. 13D.

In one embodiment, a threshold value is provided by an end-user console portal 106 and stored in database 105 or memory 1322. In another embodiment, a threshold value is produced by an executed algorithm that compares previously acquired vehicle information, such as photographs and/or related metadata stored in database 105, and then generates an idealized value based on specified parameters, such as (by way of example only) a value representing a predefined percentile of all vehicles compared by the algorithm. The threshold value indicates an amount of deviation from a desired item that will be considered acceptable. For example, desired criteria data structure 1300 may represent criterion values of a desired vehicle, such that satisfaction of every criterion value by a vehicle of interest would be deemed a complete match. However, a deviation from a complete match, such as a vehicle of interest that satisfies ninety percent of the criterion values, may be acceptable for a particular need. In this instance, the vehicle of interest will be deemed a matching vehicle although it is not a complete match.

In an embodiment in which the percent of match indicators satisfies the threshold value, threshold component 1320 provides a match indication. For example, the match indication may be provided by threshold component 1320 to memory 1322, database 105 via network interface 1324, and/or end-user console portals 106 via network interface 1324. In an embodiment in which the percent of match indicators does not satisfy the threshold value, threshold component 1320 does not provide a match indication.

In an embodiment, desired criteria component 1310 provides advantages including increased user efficiency, reduced network bandwidth usage, and reduced computing resource utilization due to data provided by match component 1318 and/or threshold component 1320.

Figure 13C:
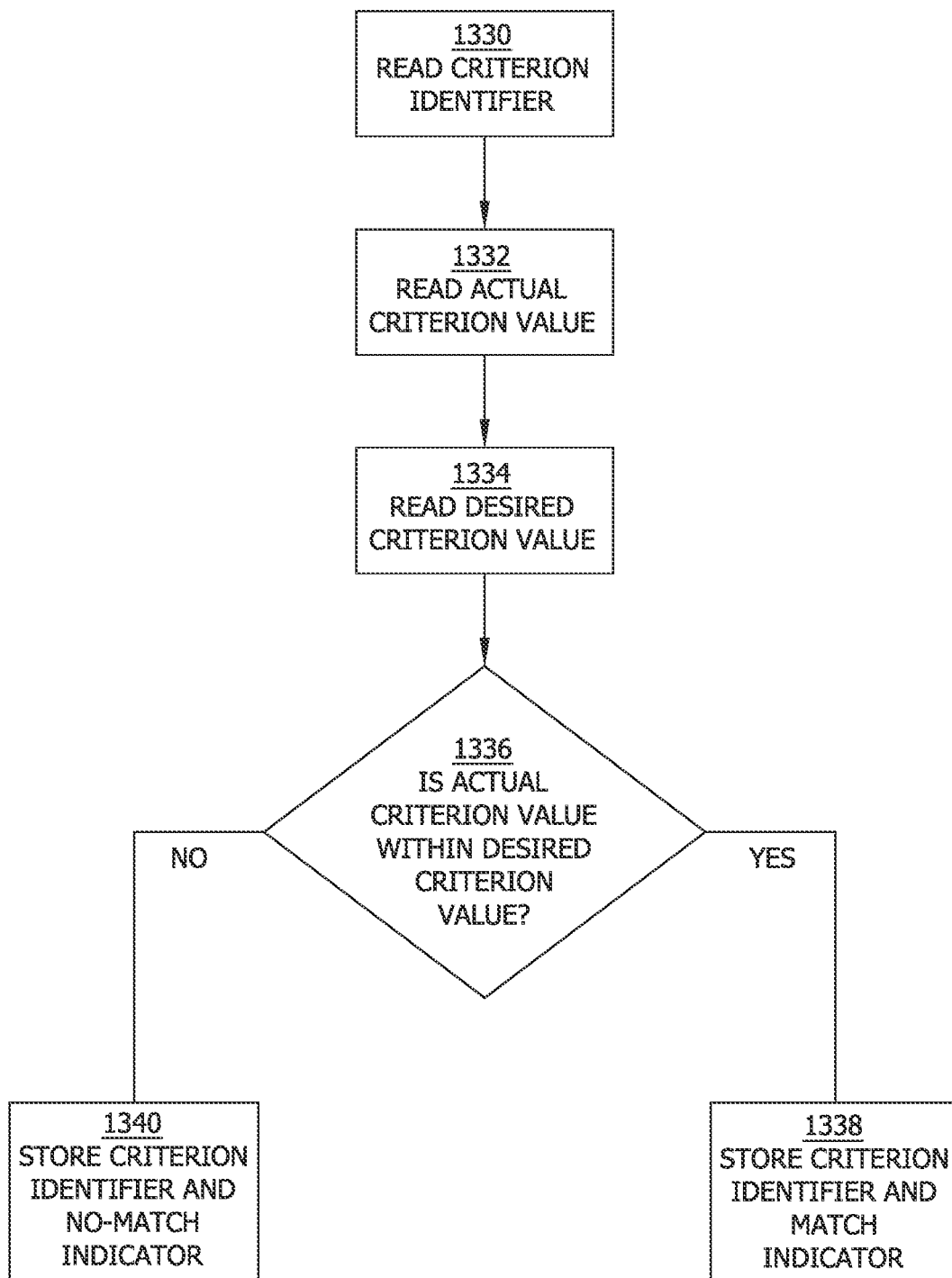
FIG. 13C is a flow chart illustrating a method of determining when a criterion value for a desired item satisfies a criterion value of an item of interest according to an embodiment of the invention.

Referring next to FIG. 13C, a flow chart illustrates a method of determining a match between a desired criterion value and an actual criterion value. In one embodiment, the illustrated method is embodied in computer-executable instructions stored on server 104 and executed by match component 1318. The method includes a read criterion identifier step 1330, a read actual criterion value step 1332, a read desired criterion value step 1334, a determination step 1336, a store match indicator step 1338, and a store no-match indicator step 1340.

During the read criterion identifier step 1330, data representing a desired criterion identifier is accessed or received. In an exemplary embodiment, match component 1318 receives the data representing the desired criterion identifier provided by desired criterion identifier component 1312. At the read actual criterion value step 1332, data representing an actual criterion value is accessed or received. For example, match component 1318 receives the data representing the actual criterion value provided by actual criterion value component 1316. The read desired criterion value step 1334 results in data representing a desired criterion value being accessed or received. In an embodiment, match component 1318 receives the data representing the desired criterion value provided by desired criterion value component 1314.

At determination step 1336 of FIG. 13C, it is ascertained whether the actual criterion value satisfies the desired criterion value. For example, match component 1318 may compare an actual value of "10" (e.g., the percentage of hail damage to a vehicle of interest in criterion value field 1204-H) to a desired value of "less than 15" (e.g., the maximum desired percentage of hail damage to a desired vehicle in desired criterion value field 1304-H). In this example, the actual value "10" satisfies the desired value of "less than 15," and thus the vehicle of interest matches the desired vehicle with respect to the maximum percentage of hail damage criterion identifier." Such a satisfaction of the desired criterion value results in the method proceeding to step 1338, in which the criterion identifier and a match indicator are stored in memory 1322 and/or database 105. The match indicator specifies that the desired criterion value has been satisfied by the actual criterion value for the corresponding criterion identifier.

In the event determination step 1336 ascertains that the actual criterion value does not satisfy the desired criterion value, the method proceeds to step 1340. At step 1340, the criterion identifier and a no-match indicator are stored in memory 1322 and/or database 105. The no-match indicator specifies that the actual criterion value has failed to satisfy the desired criterion value for the corresponding criterion identifier.

Figure 13D:
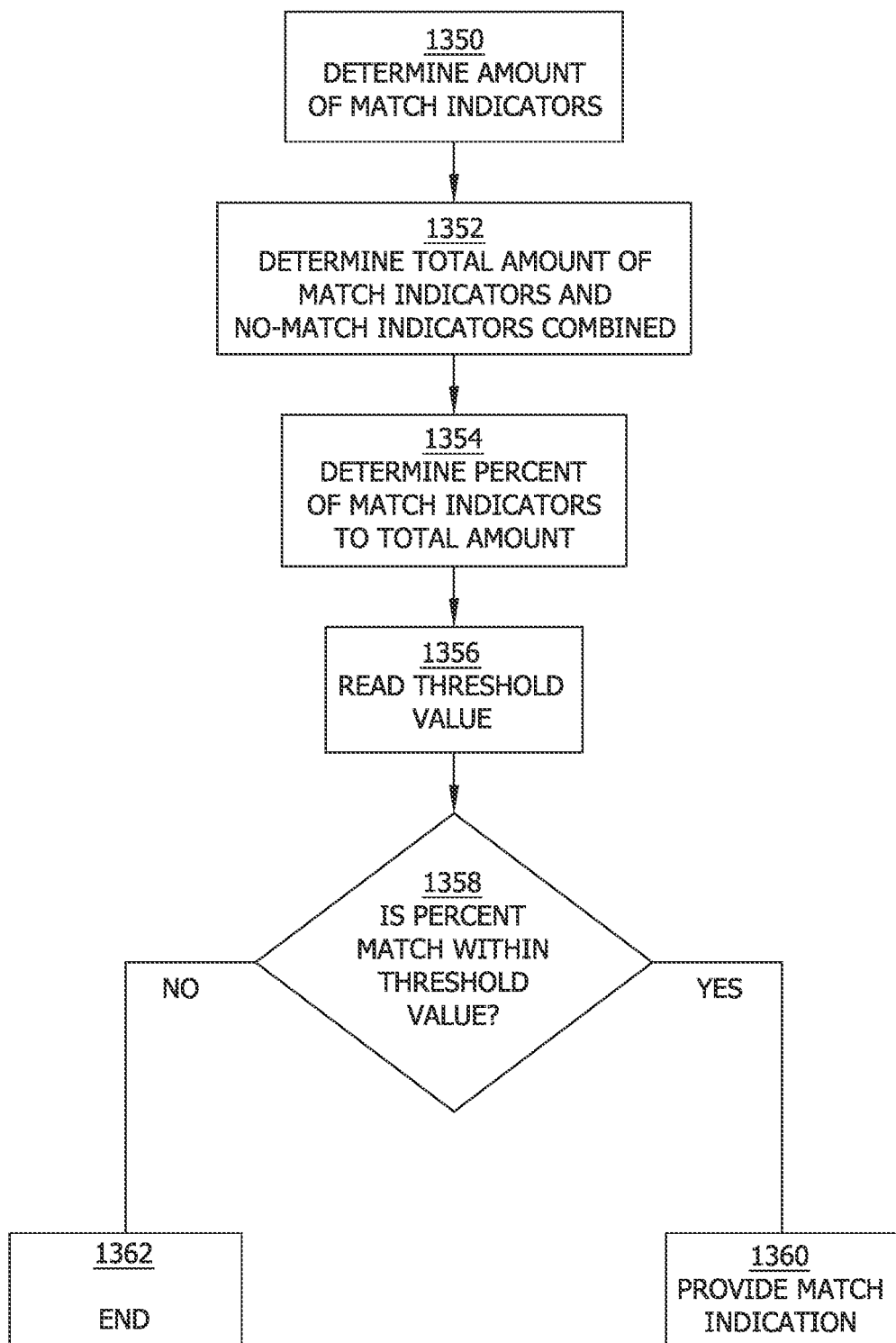
FIG. 13D is a flow chart illustrating a method of determining when an amount of matched criterion values satisfies a threshold value according to an embodiment of the invention.

Referring to FIG. 13D, a flow chart illustrates a method of determining when an item of interest falls with a desired match threshold value. As explained above with respect to FIG. 13B, the threshold value indicates an amount of deviation from a desired item that will be considered acceptable. In one embodiment, the method of FIG. 13D is embodied in computer-executable instructions stored on server 104 and executed by threshold component 1320. The method includes a match indicator amount step 1350, a total combined amount step 1352, a percent determination step 1354, a threshold value step 1356, a satisfaction determination step 1358, a match indication step 1360, and an end process step 1362.

At the match indicator amount step 1350, a determination is made of an amount of the number of match indicators for a particular item of interest. In one embodiment, threshold component 1320 accesses match indicators stored in memory 1322 and determines a total number of match indicators associated with an item of interest.

During the total combined amount step 1352 of FIG. 13D, a determination is made of a total combined number of match indicators and no-match indicators associated with the item of interest. For example, threshold component 1320 may access the match indicators and no-match indicators stored in memory 1322 and then add the amount of each together.

At percent determination step 1354, a determination is made of the ratio of match indicators to the total combined number of match indicators and no-match indicators. In an embodiment, the ratio indicates an amount that an item of interest deviates from a desired item. During threshold value step 1356, a threshold value is accessed by threshold component 1320. In one embodiment, threshold component 1320 accesses the threshold value from memory 1322. Threshold component 1320 may also access the threshold value from database 105 or receive the threshold value end-user console portals 106 via network interface 1324.

Still referring to FIG. 13D, a satisfaction determination step 1358 ascertains whether the percentage determined at percent determination step 1354 satisfies the thresh old value from threshold value step 1356. For example, a percentage of 95 percent may be determined during percent determination step 1354 and a threshold value of 90 percent may be accessed at threshold value step 1356. Thus, the item of interest deviates from a desired item by 5 percent (i.e., the difference between 100 and 95) and the amount of deviation from the desired item that is acceptable is 10 percent (i.e., the difference between 100 and 90). In this example, the percentage of 95 percent satisfies the threshold value of 90 percent. Such a satisfaction of the threshold value results in the method proceeding to step 1360, in which a match indication is provided. In an embodiment, a match indication is provided as an alert on a GUI of a device of end-user console portals 106. A match indication may also be an e-mail, a text message, or the like. In another embodiment, the match indication is provided to database 105 via network interface 1324. In the event satisfaction determination step 1358 ascertains that the percentage does not satisfy the threshold value, the method proceeds to step 1362 where the process ends.

FIG. 2A illustrates a mobile image acquisition apparatus 200, which in one embodiment serves as the front-end image acquisition component 102 of FIG. 1. The mobile image acquisition apparatus 200 includes a backpack 202, camera 210, light source 220, support and positioning cord 230, umbilical cable 240, electrical power source 250, wireless communications transceiver 260, computing device 270, and computing device data cable 280. Mobile image acquisition apparatus 200 may also be used in conjunction with a support member 290.

In an embodiment, mobile image acquisition apparatus 200 is adapted for acquiring images of the interior of a vessel 292 that has an opening 294. The opening 294 allows ingress and egress of portions of mobile image acquisition apparatus 200 relative to the interior of the vessel 292. In the embodiment of FIG. 2A, vessel 292 is an oil tanker railcar and opening 294 is a manway.

Referring further to FIG. 2A, the light source 220 is physically connected to the camera 210. The support and positioning cord 230 is physically connected to camera 210 and support member 290. The umbilical cable 240 is electrically connected to light source 220 and camera 210 as well as to the electrical power source 250, wireless communications transceiver 260, and computing device data cable 280. Computing device data cable is electrically connected to umbilical cable 240, wireless communications transceiver 260, and computing device 270. Camera 210 is in electrical communication with wireless communications transceiver 260 via umbilical cable 240. Further, camera 210 is in electrical communication with computing device 270 via umbilical cable 240 and computing device data cable 280. Computing device 270 is in electrical communication with wireless communications transceiver 260 via computing device data cable 280. Electrical power source 250 is electrically connected to wireless communications transceiver 260.

The support member 290 of FIG. 2A is adapted for being positioned at a point above opening 294 of vessel 292 such that support and positioning cord 230 and other portions of mobile imaging apparatus 200 are also positioned above opening 294 of vessel 292. Support member 290 is also adapted for being moved into positions closer to opening 294 or farther away from opening 294 and/or for being moved in a plane that is parallel to the plane of opening 294. In the embodiment of FIG. 2, support member 290 is the hand of a human user.

Figure 2B:
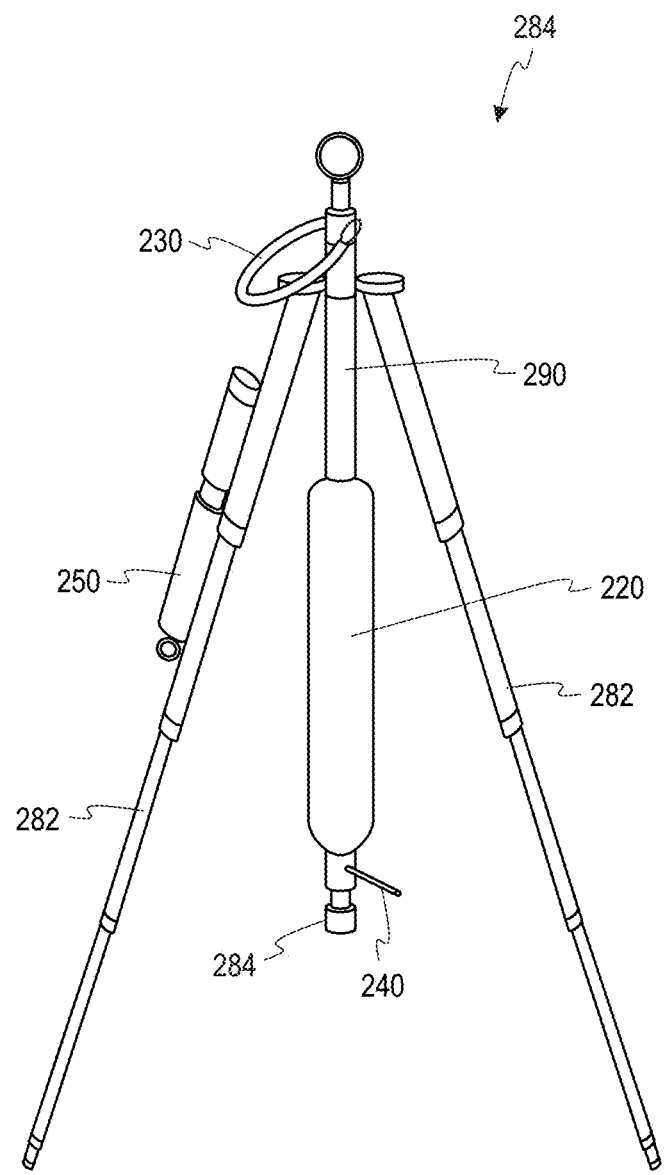
FIG. 2B is a diagram of a tripod device for use with the mobile image acquisition apparatus of FIG. 2A.

As shown in FIG. 2A, support member 290 is a structure of rigid members assembled together to create a frame-like structure. In an alternative embodiment, shown by FIG. 2B, support member 290 is included with a structure of legs 282 that are rigid members assembled together to create a tripod 284 that may straddle opening 294 of vessel 292. In the embodiment of FIG. 2B, support member 290 is connected to rigid members 282 at the apex of the tripod 284. Support member 290 may alternatively be attached to another machine that facilitates acquiring images of the interior of vessel 292 while vessel 292 is in motion or transit. In another embodiment, support member 290 may be an unmanned aerial vehicle.

Referring to FIG. 2A, vessel 292 may be any receptacle that contains materials during transit for a variety of transportation methods. For example, vessel 292 may be a railcar, a shipping container, a semi-trailer, or an intermodal freight container. In another aspect, vessel 292 may be any container that holds hazardous materials during transportation of the hazardous materials. Opening 294 may be any gap in the body of vessel 292. For example, opening 294 may be a door opening, a valve, an outlet, a vent, and the like.

As shown in FIG. 2A, support and positioning tether 230 is adapted for supporting camera 210, light source 220, and portions of umbilical cable 240. Support and positioning tether 230 is also adapted for transferring a corresponding manipulation of support member 290 to camera 210, light source 220, and portions of umbilical cable 240. For example, support and positioning tether 230 may be a nylon-covered cable, a steel cable, or the like. Support and positioning tether 230 may be wound around a spool or a reel in order to facilitate easier lengthening and shortening. In the embodiment of FIG. 2B, support and positioning tether 230 is connected to tripod 284. Support and positioning tether 230 may be used to lower tripod 284 through opening 294 of vessel 292. In another embodiment, support and positioning tether 230 may be used to retrieve tripod 284, and attached components, from vessel 292.

In an embodiment, support and positioning tether 230 may be comprised of a rigid material, such as one or more pieces of aluminum welded or bolted together. In another embodiment, support and positioning tether 230 comprised of a rigid material may telescope. Advantageously, telescoping functionality allows mobile image acquisition apparatus 200 to remain compact during storage or transit while providing the ability to position camera 210 and light source 220 a greater distance from support member 290. In an embodiment, support and positioning tether 230 is adapted for providing an extension to position camera 210 and light source 220 inside vessel 292 while keeping other components of mobile image acquisition apparatus 200 outside vessel 292. Support and positioning tether 230 may also be of such a thickness that it does not readily appear in stitched-together images acquired from inside vessel 292.

The camera 210 is adapted for acquiring images of the interior portion of a wall of vessel 292 and/or other objects within the cavity of vessel 292. In the embodiment of FIG. 2A, two cameras 210 having fisheye lenses are mounted back-to-back and physically connected to the end of support and positioning cord 230 opposite support member 290. Each fisheye camera 210 allows essentially a hemisphere of viewing and preferably converts the distorted hemispherical image into a conventional rectilinear projection. As used herein, images include still photographs (e.g., snap shots), moving photographs (e.g., videos or movies), panoramas, stereoscopic photographs, infrared images, or any combination thereof. In addition to acquiring images of the entire interior portion of vessel 292, images of only a portion of an interior portion of vessel 292 may also be acquired. For example, areas of the interior that are particularly noteworthy, such as fissures, scratches, dents, hail damage, welded joints, and the like. Further, camera 210 may also acquire images of the exterior of vessel 292. For example, images of the top of the exterior or the bottom of the exterior, such as the undercarriage, axles, and wheels may also be acquired by camera 210. In the embodiment of FIG. 2B, camera 210 may be connected to support member 290 at a connection point 284.

In an embodiment, camera 210 is configured to convert a distorted hemispherical image into other projections, such as cylindrical, spherical, or other specialized projections. Camera 210 may be a programmable digital single-lens reflex (DSLR) camera that provides pan, tilt, and zoom capabilities. Suitable DSLR cameras are available from Nikon Corporation and Canon, Inc. Camera 210 may also be an Internet Protocol (IP) camera adapted for connecting to a telecommunications network, for example one utilizing the IP communications protocol. Suitable IP cameras are available from GeoVision, Inc. Arecont Vision provides suitable IP video cameras and associated software. Camera 210 may also be adapted for directly coupling to computing device 270 via a communications channel employing serial and/or parallel communications methods. Camera 210 may also utilize other lens types. In addition, various filters, such as polarizing filters, may be employed on camera 210 for improving image quality. Advantageously, software on camera 210, computing device 270, an external computing device, or any combination thereof, is capable of automatically stitching the acquired images together to form a continuous image that accurately depicts a 360-degree view of the interior of vessel 292. In another embodiment, camera 210 comprises a power source and does not utilize power source 250, described below.

In the embodiment of FIG. 2A, light source 220 is adapted for providing sufficient lighting conditions inside the cavity of vessel 292 for acquisition of images by camera 210. The light source 220 is physically mounted on cameras 210 and is comprised of, for example, a plurality of light-emitting diodes (LEDs). In another embodiment, light source 220 is independent of cameras 210 and, for example, suspended from its own support structure through opening 294 or an alternate opening in vessel 292. In the embodiment of FIG. 2B, light source 220 is connected to support member 290 and suspended from tripod 284 such that it is adapted for entering vessel 292. In another embodiment, more than one light source 220 is utilized, with one light source 220 physically mounted on cameras 210 and another light source 220 suspended from its own support structure.

In an embodiment, light source 220 is a single LED. Light source 220 may also be an incandescent light bulb, a compact fluorescent light bulb, and the like. In another embodiment light source 220 also emits electromagnetic waves outside the visible portion of the electromagnetic spectrum.

The umbilical cable 240 of FIG. 2A is adapted for transmitting electrical power from electrical power source 250 to camera 210 and light source 220. Umbilical cable 240 is also adapted for transmitting electrical signals between camera 210, light source 220, wireless communications transceiver 260, computing device data cable 280, and computing device 270. In an embodiment, umbilical cable 240 transmits acquired images from camera 210 to wireless communications transceiver 260 and computing device 270 and also transmits control signals from computing device 270 to camera 210 and/or light source 220. In the embodiment of FIG. 2A, umbilical cable 240 is comprised of an Ethernet cable and an electrical power cable that are enclosed in a protective sheath and having an exposed connection location at a point along the length of umbilical cable 240. Advantageously, these exposed connections allow camera 210, light source 220, support and positioning cord 230, and a portion of umbilical cable 240 to be disconnected from the remaining portion of umbilical cable 240 to facilitate user access, storage, and portability of mobile image acquisition apparatus 200. The protective sheath facilitates cable management and organization and also provides protection against edges of opening 294 and/or other portions or contents of vessel 292.

In the embodiment of FIG. 2B, umbilical cable 240 is connected to support member 290 and suspended from tripod 284 such that a connector is available near connection point 284. Umbilical cable 240 may also be comprised of other cables, including Universal Serial Bus (USB), Ethernet, and the like. Umbilical cable 240 may also be used without a protective sheath. Umbilical cable 240 may also be used with a protective sheath that does not have an exposed connection location.

Electrical power source 250 is adapted for providing electrical energy to power the various components of mobile image acquisition apparatus 200, including camera 210, light source 220, and wireless communications transceiver 260. In the embodiment of FIG. 2A, electrical power source 250 is a battery and is located in backpack 202 worn by a user of mobile image acquisition apparatus 200. In the embodiment of FIG. 2B, electrical power source 250 is connected to one leg 282 of tripod 284 and is adapted for providing electrical energy to light source 220. In an embodiment, electrical power source 250 is adapted such that electrical energy is provided to various components of image acquisition apparatus 200 while requiring only one connection to an external power source for charging. In one embodiment, electrical power source 250 is a solar power system.

Referring further to FIG. 2A, wireless communications transceiver 260 is adapted for transmitting acquired images to a server or database via a communications medium, such as the Internet. For example, wireless communications transceiver 260 may transmit acquired images to server 104 and/or database 105 of FIG. 1. Additionally, wireless communications transceiver 260 is adapted for receiving control signals via a communications medium, such as the Internet. The control signals provide information regarding the operation and manipulation of camera 210 and/or light source 220. In the embodiment of FIG. 2, wireless communications transceiver 260 is the 341U cellular network modem available from Netgear, Inc. and is located within backpack 202. Advantageously, wireless communications transceiver 260 allows mobile image acquisition apparatus 200 to receive and send information without the need for wires and to operate in a variety of locations. Another benefit of wireless communications transceiver 260 is the ability to immediately upload acquired images to a server or other remote storage means across a communications network (e.g., the Internet) for processing. This ability provides savings in the cost, labor, and time required for image acquisition and processing.

It is to be understood that wireless communications transceiver 260 is configured to operate according to, for example, the IEEE 802.11 (WiFi) standard and/or the IEEE 802.15.1 (Bluetooth™) standard. Embodiments of wireless communications transceiver 260 also include a cellular network modem or a computing device having wireless communications capabilities.

Computing device 270 is adapted for executing computer-readable instructions embodied in software, adapted for displaying, on a graphical user interface (GUI), a systematic process for acquiring images of the interior of vessel 292, and adapted for receiving commands from a user to acquire the images. FIGS. 7A-7F illustrate an exemplary GUI for acquiring images and/or information and receiving commands from a user. In the embodiment of FIG. 2, computing device 270 is, for example, a laptop computer having its own electrical power source and braced near the user's body by computing device support strap 272 that is worn around the user's neck and physically connected to computing device 270. Computing device support strap 272 is adapted for supporting the weight of computing device 270. In the embodiment of FIG. 2A, computing device support strap 272 is comprised of polypropylene webbing and utilizes strap adjusters to facilitate lengthening or shortening of the strap. Advantageously, support strap 272 allows computing device 270 to be located in an easily accessible location for the user without the need for a separate support surface and also allows the user to keep both hands free.

In one embodiment, computing device 270 is a processor. In another embodiment, computing device 270 is an integrated circuit containing one or more processing units, a memory, an arithmetic logic unit, and/or a control unit.

Computing device data cable 280 is adapted for transmitting electrical signals between umbilical cable 240, wireless communications transceiver 260, and computing device 270. In the embodiment of FIG. 2, computing device data cable 280 is an Ethernet cable that is connected to a portion of umbilical cable 240 and computing device 270. Advantageously, computing device data cable 280 allows computing device 270 to be disconnected from umbilical cable 240 to facilitate user access, storage, and portability of mobile image acquisition apparatus 200.

Computing device data cable 280 is preferably embodied by a communications channel employing serial and/or parallel communications methods. And computing device 270 is configured such that the transmission of data between umbilical cable 240, wireless communications transceiver 260, and computing device 270 can be accomplished via wireless communications methods, such as the IEEE 802.11 (WiFi) standard and the IEEE 802.15.1 (Bluetooth™) standard.

Referring to FIG. 2B, tripod 284 includes three legs 282. In an embodiment, legs 282 may be comprised of a rigid material, such as one or more pieces of aluminum affixed together. In another embodiment, legs 282 comprised of a rigid material may telescope. Advantageously, telescoping functionality allows tripod 284 to remain compact during storage or transit, while still providing the ability to position camera 210 and light source 220 inside an opening 294 of vessel 292. In an embodiment, tripod 284 is collapsed and affixed to backpack 202 during transport or storage. In another embodiment, tripod 284 is adapted for providing an extension to position camera 210 and light source 220 inside vessel 292 while keeping other components of mobile image acquisition apparatus 200 outside vessel 292.

During use according to one embodiment, a user manually moves mobile image acquisition apparatus 200 or a portion thereof to position it relative to vessel 292. In another embodiment, support member 290 is attached to a machine or vehicle that self-locomotes or support member 290 is itself a machine or vehicle that self-locomotes. Advantageously, self-locomotive capabilities allow the mobile image acquisition apparatus to be moved without the need for manual movement by a human user and also allows movement commands to be transmitted from a remote computing device or stored on computing device 270.

Mobile image acquisition apparatus 200 may also transmit acquired images to a server or database. Mobile image acquisition apparatus 200 may also include a barcode scanner or a radio-frequency identification (RFID) reader that communicates with other portions of mobile image acquisition apparatus 200 via wireless communications methods, umbilical cable 240, or an additional communications cable. Advantageously, a barcode scanner or an RFID reader allows for the collection of information identifying vessel 292 and the integration of that information with acquired images of vessel 292. In an embodiment, mobile image acquisition apparatus 200 is adapted for acquiring images of a vessel that is the subject of an accident or disaster investigation or rescue mission.

In operation of an embodiment, support member 290 is positioned at a point above opening 294 of vessel 292 such that support and positioning cord 230 and portions of mobile imaging apparatus 200 are also positioned above opening 294 of vessel 292. Then support member 290 is moved to a position closer to opening 294 such that portions of support and positioning cord 230 and portions of mobile imaging apparatus 200 enter a cavity of vessel 292 through opening 294. In an embodiment, camera 210, light source 220, and portions of umbilical cable 240 are the portions of mobile imaging apparatus 200 that enter the cavity of vessel 292 through opening 294.

Once camera 210 and light source 220 are positioned inside the cavity of vessel 292, light source 220 illuminates the interior portion of a wall of vessel 292. Camera 210 acquires images of the interior portion of a wall of vessel 292 and/or other objects within the cavity of vessel 292. Support member 290 and/or support and positioning cord 230 are manipulated in order to focus or point camera 210 and/or light source 220 at various locations of the interior portion of vessel 292. Functions specific to camera 210 (e.g., zoom and pan) are also utilized via computing device 270 to further focus camera 210 at the various locations. In addition to these functions, camera 210 is also otherwise manipulated from commands on computing device 270 that are communicated to camera 210 via computing device data cable 280 and/or umbilical cable 240. Moreover, various filters for camera 210 are also implemented from commands on computing device 270 that are communicated to the camera 210 via computing device data cable 280 and/or umbilical cable 240. In addition, light source 220 is controlled from commands on computing device 270 that are communicated to light source 220 via computing device data cable 280 and/or umbilical cable 240.

The image data collected by camera 210 is then transmitted to wireless communications transceiver 260 and computing device 270 via umbilical cable 240 and computing device data cable 280. The image data is then wirelessly transmitted to an external receiver via wireless communications transceiver 260. This wireless transmission to the external receiver allows the acquired images to be uploaded to a remote server or storage device without the need to wait until the user finishes the image collection process. Beneficially, the immediate uploading of images allows the images to be processed sooner than conventional techniques. The image processing techniques described in U.S. patent application Ser. Nos. 15/012,033, 14/574,638, and 14/088,939 may be used for this purpose. The image data may also displayed via a GUI on computing device 270.

Figure 3A:
FIGS. 3A-C illustrate a turntable and camera within an imaging space for use in the automated studio of FIG. 1 in accordance with an embodiment of the invention.
Figure 3B:
Figure 3C:
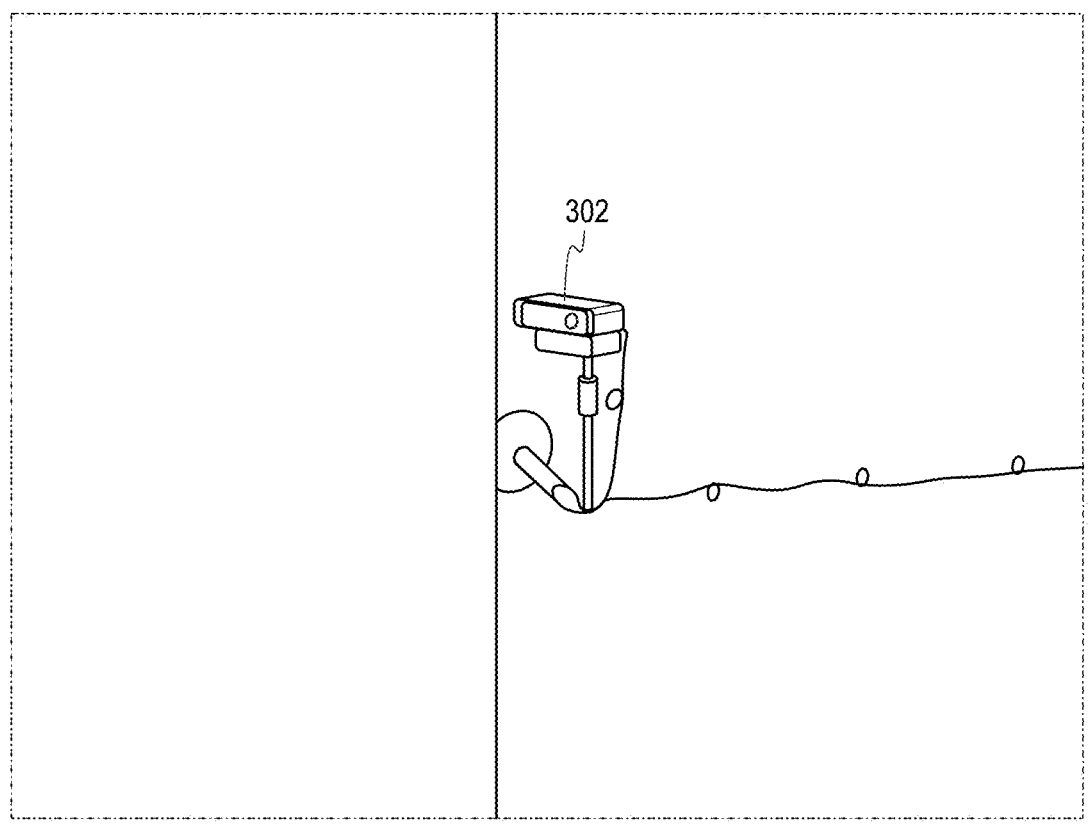

FIGS. 3A and 3C illustrate a turntable 301 and at least one camera 302, which in one embodiment serve as the front-end image acquisition component 102 of FIG. 1. Turntable 301 comprises a rotatable platform adapted for receiving and supporting, for example, a vehicle and rotating the vehicle 360 degrees as well as portions and iterations thereof. According to aspects of the invention, a relay provides an interface between turntable 301 and computer 103 or a communications network transmitting control information. Upon receiving an appropriate command or control signal from computer 103 or communications network, turntable 301 rotates the desired angular distance at the desired angular velocity, thus rotating the vehicle a uniform distance and at a uniform velocity. Suitable turntables include those described in U.S. Pat. Nos. 6,817,300 and 7,631,602. FIG. 3B illustrates turntable 301 supporting a vehicle and located within an enclosure having a ceiling 303 and walls 304, further described herein and in U.S. patent application Ser.

No. 14/088,939, incorporated herein by reference above. Contemplated vehicles include, by way of example and not limitation, automobiles, boats, watercraft, recreational vehicles, motorcycles, all-terrain vehicles, trailers, aircraft, and the like.

The cameras 302 are adapted for acquiring images of a vehicle supported by turntable 301, preferably as the vehicle rotates via turntable 301. As used herein, images include still photographs (e.g., snap shots), moving photographs (e.g., videos or movies), panoramics, stereoscopic photographs, infrared images, or any combination thereof. Preferably, cameras 302 are configured for acquiring images of an entire vehicle or, if desired, images of a portion of a vehicle. For example, images may be taken of the VIN, text identifying the model of the vehicle, or any areas of the vehicle that are particularly noteworthy, such as scratches, dents, hail damage, add-ons, tire treads, and the like. It is also contemplated that a salesperson can provide a video demonstration of the vehicle's features and options to be integrated into the final virtual showroom. The video "sales pitch" can be made while the vehicle is rotating via turntable 301 or stationary.

Referring to FIG. 3C, cameras 302 preferably include one or more programmable DSLR cameras that provide pan, tilt, and zoom capabilities. Suitable DSLR cameras are available from Nikon Corp. and Canon, Inc. Cameras 302 may also be Internet protocol (IP) cameras adapted for connecting to a telecommunications network, for example one utilizing the Internet Protocol communications protocol, such as the Internet. Suitable IP cameras are available from GeoVision, Inc. Arecont Vision provides suitable IP video cameras and associated software. It is also contemplated that cameras 302 are capable of directly coupling to a computing device via a relay or a communications channel employing serial and/or parallel communications methods. The cameras 302 preferably utilize a wide-angle lens, including, by way of example and not limitation, a fisheye lens. The present embodiment also contemplates the use of one or more handheld cameras. In addition, various filters, such as polarizing filters, may be employed on cameras 302 for improving image quality.

In an embodiment illustrated by FIG. 3C, at least one of cameras 302 is located at a fixed position outside the circumference of turntable 301 and is pointed generally toward the center of turntable 301. The fixed camera 302 is preferably affixed at a height between five feet and six and one-half feet above turntable 301 to provide a view from the perspective of an average consumer if the consumer were viewing the vehicle in-person. Advantageously, affixing the camera 302 at a fixed height while acquiring images provides the same perspective for each image so that a user is provided with a constant perspective when viewing the acquired images. Additionally, images having the same perspective provide a consistent and seamless view when the acquired images are stitched together to provide a better user experience. As turntable 301 rotates the vehicle, fixed camera 302 acquires images of the vehicle's exterior. Advantageously, software executed by cameras 302, computer 103, server 104, or any combination thereof, is capable of automatically stitching the acquired images together to form a continuous image that accurately depicts a 360-degree view of the exterior of the vehicle. Further embodiments of the cameras 302 are disclosed herein and in U.S. patent application Ser. Nos. 15/012,033, 14/574,638, and 14/088,939, incorporated herein by reference above.

In another embodiment, cameras 302 utilize a processor to facilitate receiving and transmitting electronic control data and acquired image data. For example, cameras 302 may be affixed to a tower structure that houses computer 103. In an embodiment, cameras 302 may utilize computer 103, which displays on a GUI a systematic process for acquiring images of an object and acquired images. FIGS. 7A-7F illustrate an exemplary GUI for acquiring images and/or information and receiving commands from a user. Computer 103 may also display on a GUI stock images in a grayscale format for images of the object from perspectives that have yet to be acquired. In another embodiment, cameras 302 utilize an integrated circuit containing one or more processing units, a memory, an arithmetic logic unit, and/or a control unit to facilitate receiving and transmitting electronic control data and acquired image data.

Figure 4A:
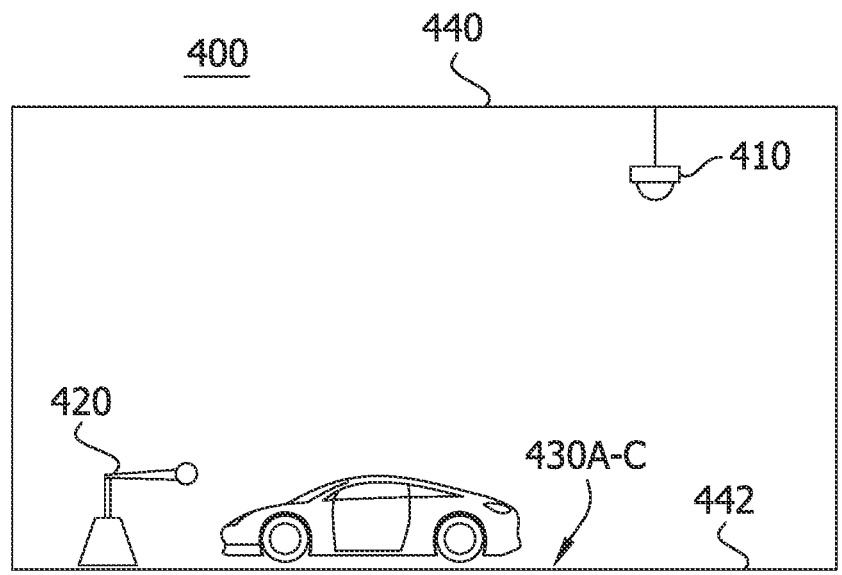
FIGS. 4A-B illustrate an imaging studio comprised of various components for use in the automated studio of FIG. 1 in accordance with an embodiment of the invention.
Figure 4B:
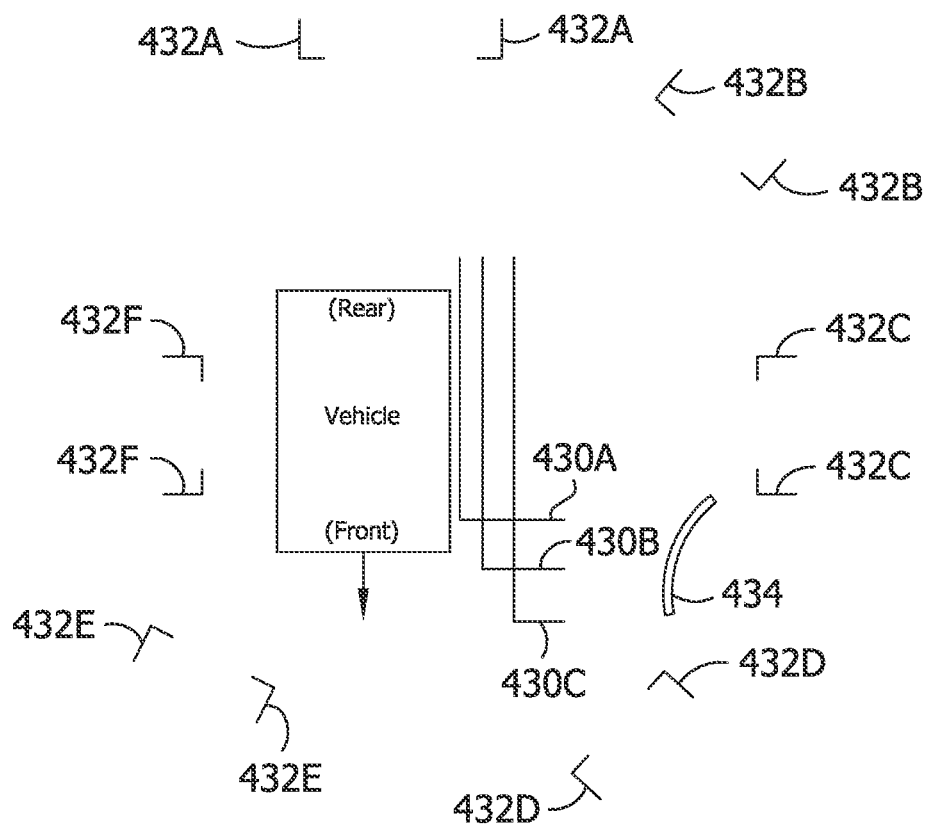

FIGS. 4A-B illustrate an exemplary imaging studio 400, which in one embodiment serves as the front-end image acquisition component 102 of FIG. 1. FIG. 4A provides a side view perspective, while FIG. 4B provides a top view perspective of the imaging studio 400. The imaging studio 400 includes a stationary camera 410, a movable camera 420, subject alignment patterns 430A-C, camera alignment patterns 432A-F, an alignment facilitator 434, a structure 440, and a support surface 442. Beneficially, the imaging studio 400 is capable of installation in a pre-existing structure. For example, the imaging studio 400 may be installed in an automotive service bay. This capability provides the advantage of utilizing a service bay as an imaging space when there is no demand to use the bay to service automobiles. As a result, the service bay owner can increase the uses to which the space can be put, optimize resource usage, and increase overall profit. Additionally, the use of a pre-existing structure reduces the initial capital investment required for the imaging studio 400 and allows for easy removal and/or resale of various components of the imaging studio 400.

The stationary camera 410 in the illustrated embodiment is physically connected to structure 440. Movable camera 420, subject alignment patterns 430A-C, and camera alignment patterns 432A-F are located upon support surface 442. The subject being imaged (e.g., a vehicle) is also supported by support surface 442.

According to aspects of the invention, stationary camera 410 is adapted for acquiring images of the subject. Stationary camera 410 is physically attached at a fixed location to structure 440 via bolts, screws, welding, or the like. Stationary camera 410 preferably includes one or more DSLR cameras that provide pan, tilt, and zoom capabilities. Suitable DSLR cameras are available from Nikon Corp. and Canon, Inc. Stationary camera 410 may also include one or more Internet protocol (IP) cameras adapted for connecting to a telecommunications network, for example one utilizing the Internet Protocol communications protocol, such as the Internet. Suitable IP cameras are available from GeoVision, Inc. Arecont Vision provides suitable IP video cameras and associated software. In another embodiment, stationary camera 410 is communicatively connected to computer 103, receives electronic command signals from computer 103, and transmits acquired image data to computer 103. In another embodiment, stationary camera 410 is adapted for directly coupling to computer 103 via a relay or communications channel employing serial and/or parallel communications methods. In yet another embodiment, stationary camera 410 transmits acquired image data to server 104 and/or database 105. In addition, various filters, such as polarizing filters, may be employed on stationary camera 410 for improving image quality.

Referring further to FIGS. 4A and 4B, movable camera 420 is adapted for acquiring images of the exterior and/or interior of the subject. In one embodiment, movable camera 420 is imaging apparatus 500 (see FIGS. 5A-5C) described herein. In another embodiment, movable camera 420 is imaging apparatus 550 (see FIG. 5D) described herein. In another embodiment, movable camera 420 is one or more handheld cameras. Preferably, movable camera 420 transmits acquired image data to computer 103, server 104, and/or database 105. In one embodiment, movable camera 420 and stationary camera 410 acquire images of the same subject substantially simultaneously. In another embodiment, movable camera 420 and stationary camera 410 acquire images of the same subject at different times. For example, stationary camera 410 may acquire images of the subject and after that image acquisition process is complete, movable camera 420 may acquire images of the same subject.

The subject alignment patterns 430A-C, as illustrated by FIG. 4B, are adapted for providing a means to consistently position subjects for imaging with respect to camera alignment patterns 432A-F. The embodiment of FIG. 4B is preferably utilized to acquire images of a vehicle. In this embodiment, subject alignment pattern 430A is designed to be used for vehicles with a small footprint or wheelbase (e.g., compact car), subject alignment pattern 430B is designed to be used for vehicles with a medium footprint or wheelbase (e.g., sedan), and subject alignment pattern 430C is designed to be used for vehicles with a large footprint or wheelbase (e.g., truck). Each subject alignment pattern 430A-C contains a short portion that runs parallel to the axles of the vehicle and represents where the front wheels of the vehicle should be located. Each subject alignment pattern 430A-C also contains a longer portion that runs perpendicular to the axles of the vehicle and represents where the edge of the footprint of the vehicle should be located. In one embodiment, each subject alignment pattern 430A-C is a different color to allow a human user to easily distinguish the patterns and determine which subject alignment pattern 430A-C to utilize for a particular vehicle. For example, subject alignment patter 430A may be blue, subject alignment patter 430A may be green, and subject alignment patter 430A may be red. In a further embodiment, the different color of each subject alignment pattern 430A-C may correspond to a matching colored marking device located upon the vehicle. In this way, a determination can be made as to which subject alignment pattern 430A-C should be utilized with a particular vehicle so that when a driver enters the vehicle to drive it into position, he or she can immediately know which subject alignment pattern 430A-C to utilize. One skilled in the art will recognize that subject alignment patterns 430A-C may be comprised of markings of various shapes and in various numbers to accommodate various subjects to be imaged.

The camera alignment patterns 432A-F, as illustrated by FIG. 4B, are adapted for providing a means to consistently position movable camera 420 with respect to a subject being imaged and subject alignment patterns 430A-C. The embodiment of FIG. 4B is preferably utilized to acquire images of a vehicle. In this embodiment, each camera alignment pattern 432A-F comprises two markings that indicate where the front and sides of movable camera 420 should be located. In operation of this embodiment, movable camera 420 is initially positioned at camera alignment pattern 432A. After images are acquired by movable camera 420 at camera alignment pattern 432A, movable camera 420 is repositioned at camera alignment pattern 432B where movable camera 420 acquires additional images. This operation is repeatable by repositioning movable camera 420 at each of the remaining camera alignment patterns 432C-F. The movable camera may be repositioned at each of camera alignment patterns 432A-F in order, out of order, or by skipping some of the camera alignment patterns 432A-F. In another embodiment, camera alignment patterns 432A-F are footprints that indicate where a human user using a handheld camera should stand to acquire images of the subject being imaged. Advantageously, subject alignment patterns 430A-C and camera alignment patterns 432A-F allow a user to quickly position subjects to be imaged and movable camera 420 so that images can be acquired from a consistent perspective. Camera alignment patterns 432A-F may be comprised of more or less alignment patterns depending upon the subject to be imaged.

The alignment facilitator 434 is adapted to aid positioning of the subject being imaged. In one embodiment, alignment facilitator 434 is a mirror used in conjunction with subject alignment patterns 430. For example, a driver of a vehicle that is the subject being imaged may use alignment facilitator 434 embodied as a mirror for determining when the center of one wheel of the vehicle, and thus the entire vehicle, is in a suitable position with respect to subject alignment patterns 430. In other embodiments, alignment facilitator 434 may be an electronic sensor.

The structure 440, as illustrated by FIG. 4A, is adapted for providing physical support for stationary camera 410. In this embodiment, structure 440 provides a means for stationary camera 410 to acquire images of the subject from a consistent location above the imaged subject. In one embodiment, structure 440 is the ceiling of a pre-existing automotive service bay.

Support surface 442 is adapted for receiving and supporting the subject to be imaged and for supporting movable camera 420, subject alignment patterns 430A-C, and camera alignment patterns 432A-F. In one embodiment, support surface 442 is the floor of a pre-existing automotive service bay. In another embodiment, support surface 442 is a turntable, such as turntable 301, described herein and in U.S. patent application Ser. No. 14/088,939, incorporated herein by reference above.

In another embodiment, stationary camera 410 and/or movable camera 420 utilize a processor to facilitate receiving and transmitting electronic control data and acquired image data. For example, stationary camera 410 may be affixed to a tower structure that houses computer 103. In an embodiment, stationary camera 410 and movable camera 420 may utilize computer 103, which displays on a GUI a systematic process for acquiring images of an object and acquired images (e.g., ceiling shots, undercarriage shots, etc.). FIGS. 7A-7F illustrate an exemplary GUI for acquiring images and/or information and receiving commands from a user. Computer 103 may also display on a GUI stock images in a grayscale format for images of the object from perspectives that have yet to be acquired. In another embodiment, stationary camera 410 and/or movable camera 420 utilize an integrated circuit containing one or more processing units, a memory, an arithmetic logic unit, and/or a control unit to facilitate receiving and transmitting electronic control data and acquired image data.

In one embodiment, a method for acquiring images for rendering a virtual vehicle showroom comprises positioning a vehicle at a first predetermined location upon a support surface, positioning a mobile imaging apparatus at a second predetermined location relative to the vehicle, acquiring a plurality of images of the vehicle with the mobile imaging apparatus at the second predetermined location, positioning the mobile imaging apparatus at a third predetermined location relative to the vehicle, and acquiring a plurality of images of the vehicle with the mobile imaging apparatus at the third predetermined location. In another embodiment, the method further comprises transforming the acquired images into a stitched 360-degree panoramic image.

Figure 5A:
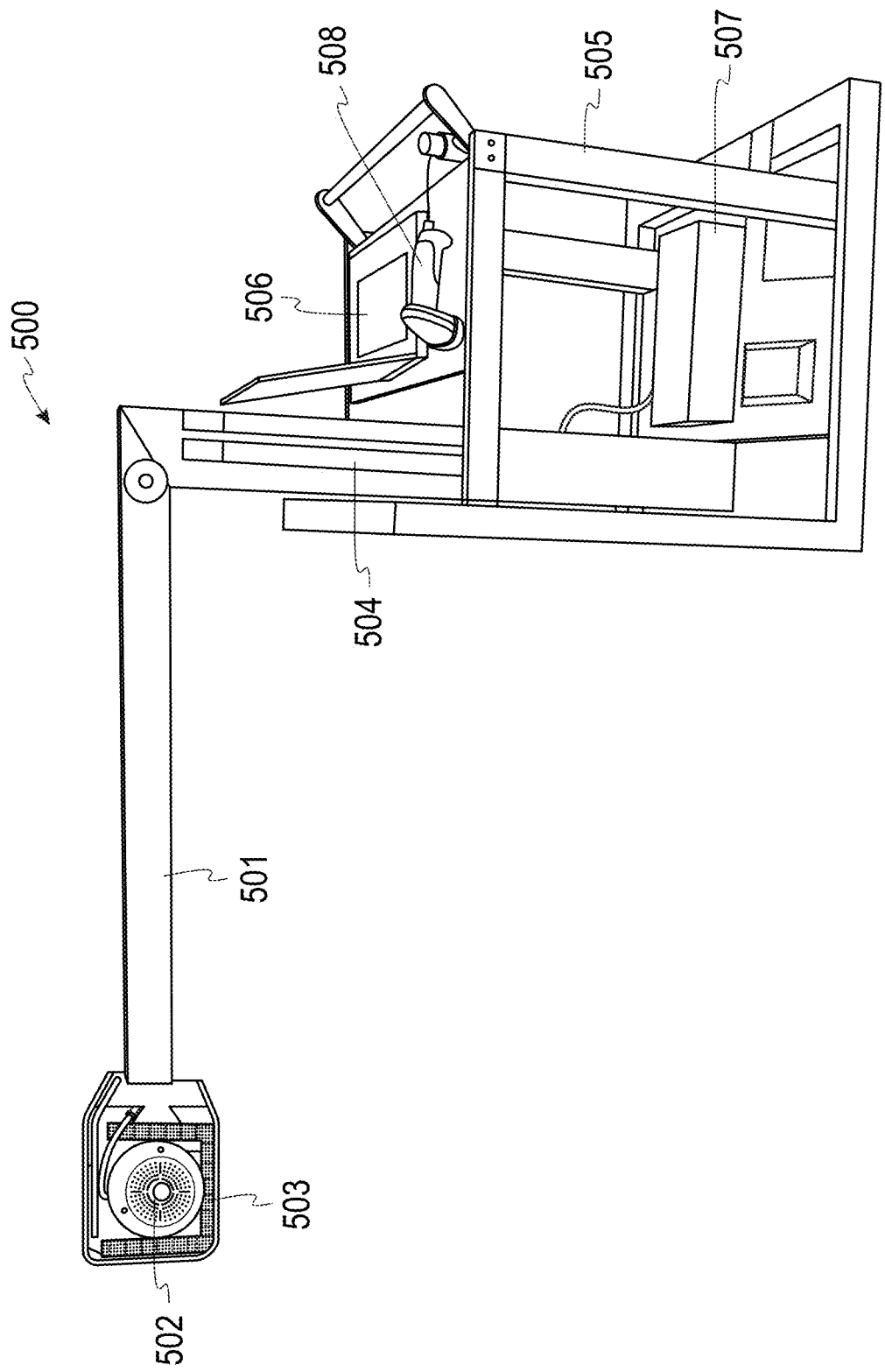
FIGS. 5A-C illustrate an imaging apparatus comprised of cameras, a support arm, and a linear motion member for use in the automated studio of FIG. 1 in accordance with an embodiment of the invention.

FIG. 5A illustrates an imaging apparatus 500, which in one embodiment serves as the front-end image acquisition component 102 of FIG. 1. In the illustrated embodiment, the imaging apparatus 500 includes a mobile cart 505, a support arm 501, a linear motion member 504, one or more cameras 502, one or more light sources 503, a barcode scanner 508, one or more wireless communications transceivers 506, and an electric power source 507.

In an embodiment, imaging apparatus 500 is adapted for positioning cameras 502 and light sources 503 (e.g., LEDs) inside a vehicle or the like to acquire images of the vehicle's interior and for transmitting the images to server 104 and/or database 105. In another embodiment, imaging apparatus 500 is adapted for positioning cameras 502 and light sources 503 at various locations around the perimeter of the vehicle to acquire images of the vehicle's exterior and for transmitting the images to server 104 and/or database 105. Advantageously, an embodiment of imaging apparatus 500 allows acquisition of images of the interior of the particular vehicle being added to the online inventory, rather than using stock images or a representative model. This advantage allows consumers to view, for example, a particular vehicle that is for sale and provides them with more information for their purchasing decision.

Referring further to FIG. 5A, mobile cart 505 is adapted for providing a support structure upon which to affix various components of imaging apparatus 500 and a means with which to position imaging apparatus 500 relative to the vehicle being imaged. Mobile cart 505 is comprised of rigid members assembled together to create a frame-like structure. By way of example and not limitation, mobile cart 505 may be comprised of pieces of aluminum welded or bolted together. Mobile cart 505 may have a padding material, such as foam, affixed to the rigid material to provide a buffer that prevents the rigid material from scratching anything, such as a vehicle, during use of the cart 505. In one embodiment, the frame-like structure of mobile cart 505 is enclosed in a protective housing to make imaging apparatus 500 waterproof and shockproof. Other components of imaging apparatus 500 may be permanently or temporarily affixed to the frame structure of mobile cart 505, which provides portability and self-containment for imaging apparatus 500.

During use according to one embodiment, a user manually moves mobile cart 505 to position imaging apparatus 500 relative to the vehicle or other subject to be imaged. For example, the user moves cart 505 to position cameras 502 inside a vehicle having a view of substantially the entire vehicle interior. In another embodiment, mobile cart 505 self-locomotes via a motor, which drives a device that enables movement of imaging apparatus 500 across a surface. By way of example and not limitation, an electric motor drives wheels, skid-steer tracks, or the like to move imaging apparatus 500 across a surface to position imaging apparatus 500 relative to the vehicle. In another embodiment, mobile cart 505 remains stationary while support arm 501 is positioned relative to the vehicle. Advantageously, a user familiar with the system can acquire the images needed to generate a 360-degree view of the vehicle's interior in a short amount of time (e.g., less than two minutes).

In an embodiment, support arm 501 is adapted for providing an extension to position cameras 502 and light sources 503 inside the vehicle while keeping the other components of imaging apparatus 500 outside the vehicle. In another embodiment, support arm 501 is adapted for providing an extension to position cameras 502 and light sources 503 at various points around the exterior of the vehicle, such as above or below the vehicle. Support arm 501 is comprised of rigid members assembled together. Support arm 501 may be comprised of pieces of the same material as cart 505 or may be comprised of different materials. Support arm 501 is of such a thickness that it does not readily appear in stitched-together images acquired, for example, from inside the vehicle. An exemplary thickness of support arm 501 is less than two inches (e.g., 1.875 inches).

According to aspects of the invention, support arm 501 has a portion that extends in a vertical direction and a portion that extends in a horizontal direction and is affixed at some point to cart 505. By way of example and not limitation, support arm 501 may extend vertically upward from cart 505 and then make a 90-degree bend and extend horizontally away from cart 505. In an embodiment, support arm 501 is one single, unitary piece. In another embodiment, support arm 501 is adapted for moving in a vertical direction by a linear motion member 504. Linear motion member 504 moves support arm 501 via a motor drive, such as a stepper motor drive. Advantageously, linear motion member 504 allows support arm 501 to be moved vertically so cameras 502 and light sources 503 can be positioned through an open window of the vehicle at varying heights. In another embodiment, support arm 501 telescopes in a vertical direction and/or a horizontal direction. Advantageously, the telescoping capability of support arm 501 allows imaging apparatus 500 to remain compact while providing the ability to position cameras 502 and light sources 503 a greater distance from mobile cart 505. In one embodiment, support arm 501 allows cameras 502 and light sources 503 to be positioned above a vehicle, such that images can be acquired of the roof of the vehicle. In another embodiment, support arm 501 allows cameras 502 and light sources 503 to be positioned under a vehicle, such that cameras 502 can acquire images of the undercarriage of the vehicle. In this embodiment, support arm 501 may extend vertically downward from cart 505 and then make a bend that is substantially 90 degrees and extend horizontally away from cart 505.

Figure 5B:
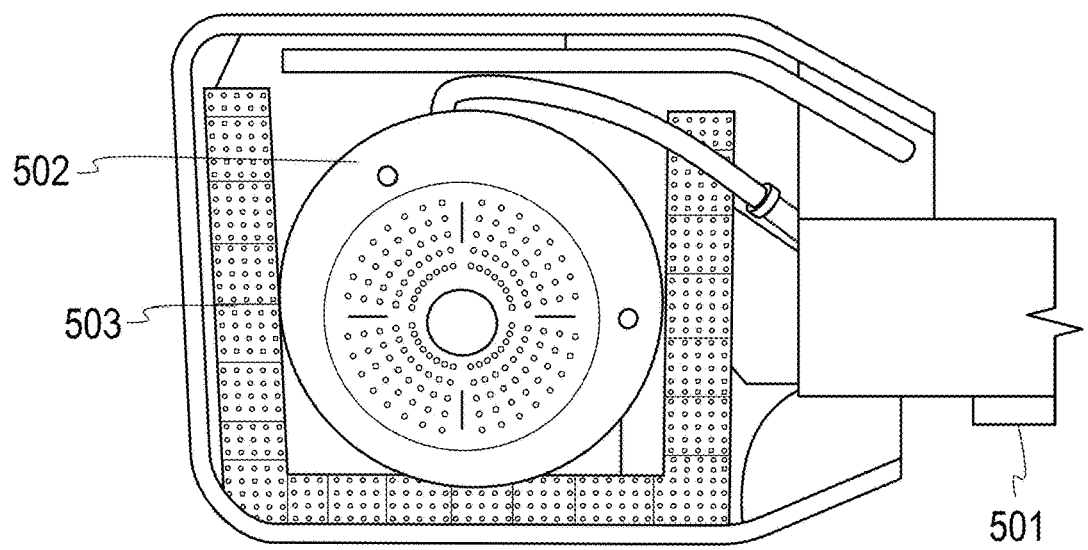

The one or more cameras 502 are adapted for acquiring images of the interior of the vehicle. In the embodiment of FIGS. 5A and 5B, two cameras 502 having fisheye lenses are mounted back-to-back on the end of the horizontal portion of support arm 501 farthest from the vertical portion. Each fisheye camera 502 allows essentially a hemisphere of viewing and preferably converts the distorted hemispherical image into a conventional rectilinear projection. It is contemplated that other projections may be used, such as cylindrical, spherical, or other specialized projections. Advantageously, software executed by cameras 502, computer 103, server 104, or any combination thereof, automatically stitches the images together to form a continuous image that accurately depicts the interior of the vehicle. Cameras 502 preferably include one or more programmable DSLR cameras that provide pan, tilt, and zoom capabilities. Suitable DSLR cameras are available from Nikon Corp. and Canon, Inc. Cameras 502 may also be on or more Internet protocol (IP) cameras adapted for connecting to a telecommunications network, for example one utilizing the Internet Protocol communications protocol, such as the Internet. Suitable IP cameras are available from GeoVision, Inc. Arecont Vision provides suitable IP video cameras and associated software. It is also contemplated that cameras 502 are capable of directly coupling to a computing device via a relay or a communications channel employing serial and/or parallel communications methods. Cameras 502 preferably utilize a wide-angle lens, including, by way of example and not limitation, a fisheye lens. The present embodiment also contemplates the use of one or more handheld cameras. In addition, various filters, such as polarizing filters, may be employed on cameras 502 for improving image quality.

The one or more light sources 503 are adapted for providing sufficient lighting conditions inside the vehicle for acquisition of the images. In the embodiment of FIGS. 5A and 5B, light sources 503 are mounted on support arm 501 adjacent to cameras 502. Preferably, light sources 503 are comprised of light-emitting diodes.

Figure 5C:
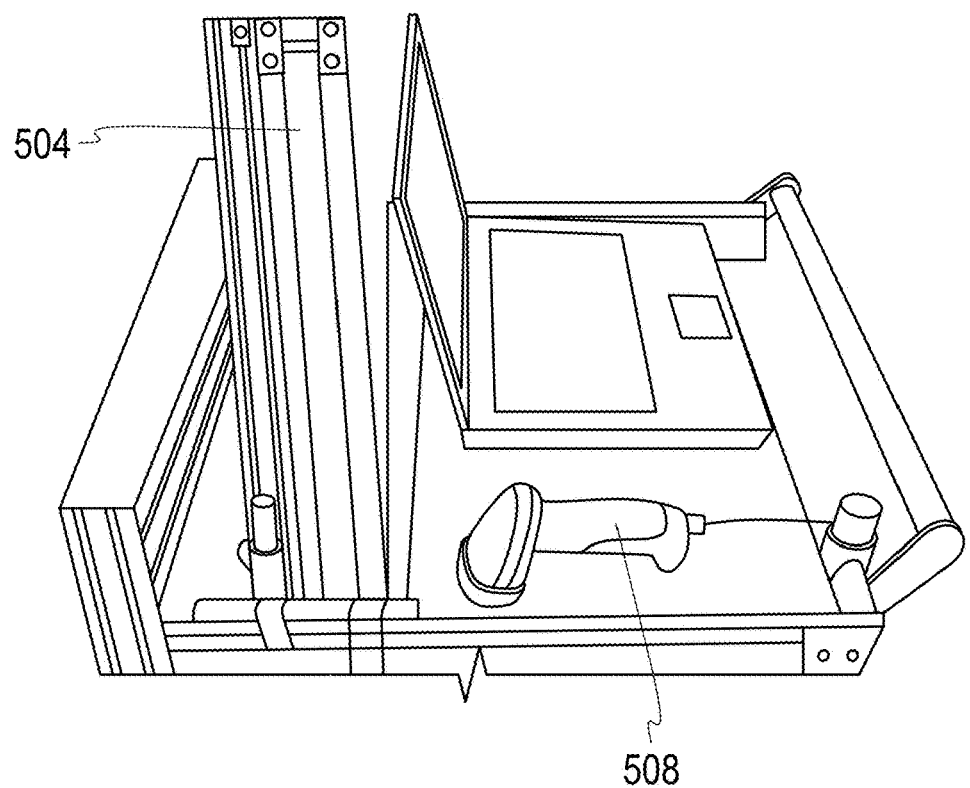

Referring to FIGS. 5A and 5C, barcode scanner 508 is adapted for scanning the VIN of the vehicle. Advantageously, barcode scanner 508 is handheld and allows a user to collect the VIN without the need to manually enter the VIN into computer 103 or database 105. In an embodiment, acquiring the VIN will initiate the image acquisition process.

The one or more wireless communications transceivers 506 are adapted for transmitting acquired images to server 104 and/or database 105 via a communications medium, such as the Internet. Additionally, wireless communications transceivers 506 are adapted for receiving control signals generated by computer 103 or another computing device via a communications medium, such as the Internet. The control signals provide information regarding the relative position of cart 505 with respect to the vehicle, regarding the vertical movement of support arm 501, and regarding the operation and manipulation of cameras 502 and light sources 503. Wireless communications transceivers 506 are affixed to cart 505 and may be any transceiver capable of receiving and/or transmitting communications signals. By way of example and not limitation, wireless communications transceivers 506 may operate according the IEEE 802.11 (WiFi) standard, the IEEE 802.15.1 (Bluetooth™) standard, may be a cellular network modem, or may be a laptop computer having wireless communications capabilities. A suitable cellular network modem is the 341U available from Netgear, Inc. Advantageously, wireless communications transceivers 506 allow imaging apparatus 500 to receive and send information without the need for wires and to operate in a variety of locations.

The electric power source 507 is preferably adapted for providing electrical energy to power the various components of the imaging apparatus, including the electric motor of cart 505, the motor of linear motion member 504, cameras 502, light sources 503, and wireless communications transceivers 506. Electric power source 507 is affixed to cart 505. Preferably, electric power source 507 is a battery that can be recharged or replaced, such as, by way of example and not limitation, an automotive battery. In another embodiment, electric power source 507 is a photovoltaic cell.

In another embodiment, various components of imaging apparatus 500, including one or more cameras 502, utilize a processor to facilitate receiving and transmitting electronic control data and acquired image data. In another embodiment, various components of imaging apparatus 500, including one or more cameras 502, utilize an integrated circuit containing one or more processing units, a memory, an arithmetic logic unit, and/or a control unit to facilitate receiving and transmitting electronic control data and acquired image data.

In one embodiment, imaging apparatus 500 is positioned at a predefined location. The positioning may be accomplished by a user manually moving imaging apparatus 500 or by imaging apparatus 500 self-locomoting. The predefined location is one of a plurality of predefined locations surrounding the footprint of the vehicle. In one embodiment, the predefined locations comprise markings on a floor surface. In one embodiment, imaging apparatus 500 is programmed via computer-executable instructions executing on computer 103 to self-locomote around the perimeter of a vehicle being imaged and acquire images of the vehicle.

In another embodiment, once in the predefined location, computer 103 provides a user a list of preset image selections that correspond to a portion of the vehicle being imaged. Once the user selects a desired preset image selection, computer 103 transmits control data to cameras 502 for focusing on the corresponding portion of the vehicle and acquiring an image. For example, a preset image selection may be "front driver-side headlight," which corresponds to the front driver-side headlight on the vehicle. The user selects a graphical button representing "front driver-side headlight" on a graphical user interface (GUI) of computer 103 and computer 103 sends a command to cameras 502 to focus on the front driver-side headlight of the vehicle. A preview image of the front driver-side headlight is shown to the user via the GUI of computer 103. An exemplary and non-limiting list of preset image selections for a vehicle includes headlight, taillight, tire tread, vehicle side, grill, emblem/logo, mirror, door handle, wheels, tailgate, doors, engine, and trunk. For selections such as engine and trunk, a door or enclosure may need to be manually opened before an image is acquired. In an alternative embodiment, once the user is satisfied with the preview image, the user selects another graphical button on the GUI of computer 103 that results in computer 103 sending a command to cameras 502 to acquire an image.

Figure 5D:
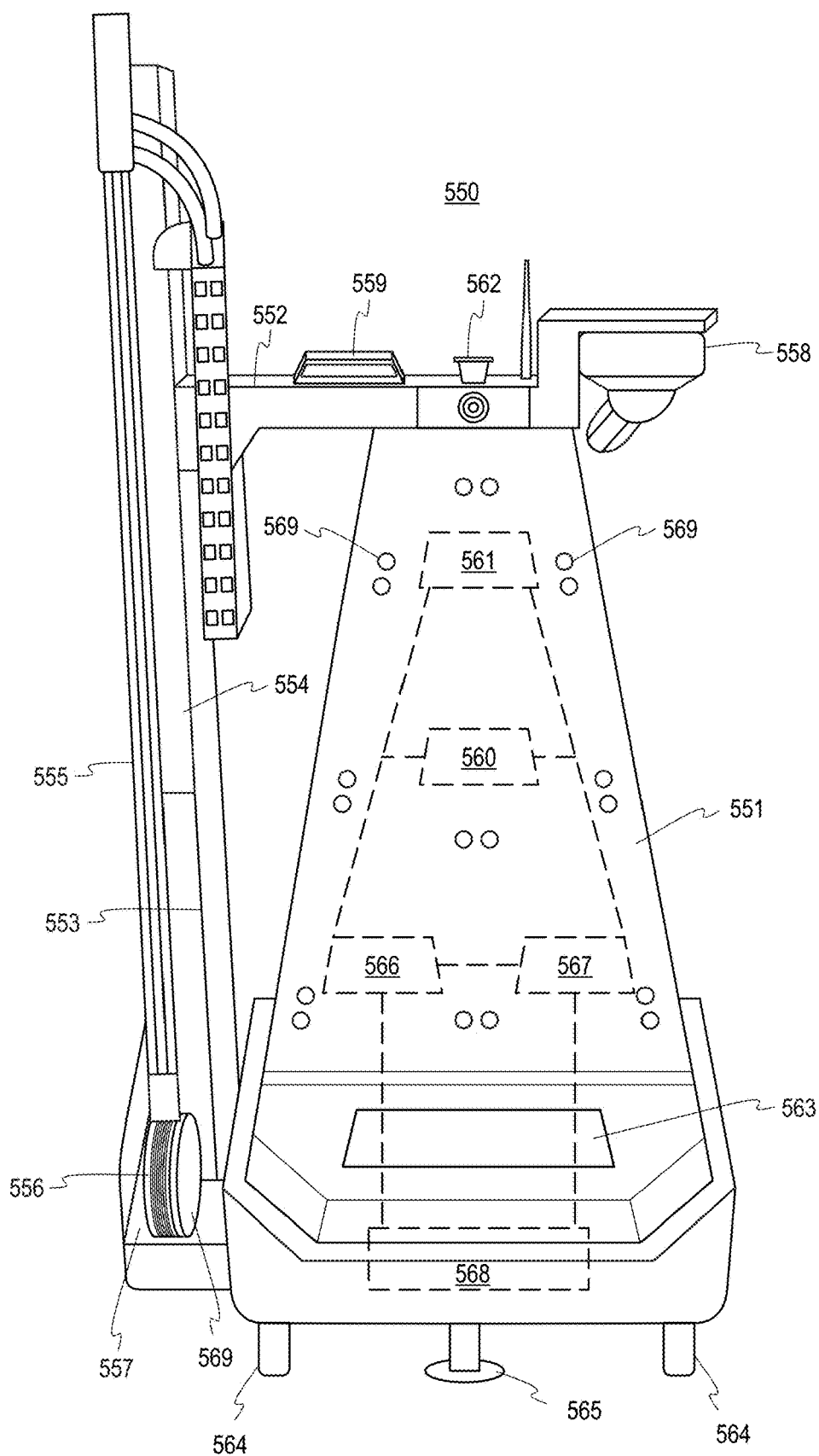
FIG. 5D illustrates an imaging apparatus comprised of various components for use in the automated studio of FIG. 1 in accordance with an embodiment of the invention.

FIG. 5D illustrates imaging apparatus 550, which is another embodiment of imaging apparatus 500 and in one embodiment serves as the front-end image acquisition component 102 of FIG. 1. One skilled in the art will appreciate that various components of imaging apparatus 500 and imaging apparatus 550 may be interchanged for each other or combined into additional embodiments. Imaging apparatus 550 includes body support component 551, extension support member 552, vertical support member 553, vertical motion member 554, camera support arm 555, movable camera and light source 556, camera housing 557, stationary camera 558, warning light 559, speaker 560, wireless transceiver 561, kill switch 562, access door 563, wheels 564, balance support 565, processor 566, power source 567, motor 568, and sensors 569. Beneficially, imaging apparatus 550 provides improvements in the field of automated object imaging by providing a means to acquire images of a particular object and upload them to an online inventory or database in a small amount of time and with little or no human involvement.

Referring further to FIG. 5D, the extension support member 552, camera housing 557, speaker 560, wireless transceiver 561, access door 563, wheels 564, balance support 565, processor 566, power source 567, motor 568, and sensors 569 are each physically connected to body support component 551. The vertical support member 553, stationary camera 558, warning light 559, and kill switch 562 are each physically connected to extension support member 552. Vertical motion member 554 is physically connected to vertical support member 553. Camera support arm 555 is physically connected to vertical motion member 554. Movable camera and light source 556 is physically connected to camera support arm 555. Vertical motion member 554, camera support arm 555, movable camera and light source 556, stationary camera 558, warning light 559, speaker 560, wireless transceiver 561, kill switch 562, processor 566, motor 568, and sensors 569 are each electrically connected to power source 567. Vertical motion member 554, camera support arm 555, movable camera and light source 556, stationary camera 558, warning light 559, speaker 560, wireless transceiver 561, kill switch 562, motor 568, and sensors 569 are each electrically connected to processor 566.

In an embodiment, imaging apparatus 550 is adapted for positioning movable camera and light source 556 inside a vehicle to acquire images of the vehicle's interior and for transmitting the acquired images to server 104 and/or database 105. In another embodiment, imaging apparatus 550 is adapted for positioning stationary camera 558 at various locations around the perimeter of the vehicle to acquire images of the vehicle's exterior and for transmitting the images to server 104 and/or database 105. Beneficially, imaging apparatus 550 may acquire images of a vehicle without the need for a human user to manually position imaging apparatus 550 at various locations around the vehicle. Another advantage of imaging apparatus 550 is that it allows images to be acquired of the particular vehicle's interior and exterior so that they can be added to the online inventory instead of using stock images or a representative model. These advantages allow consumers to view the particular vehicle that is for sale and provides them with more information for their purchasing decision.

In FIG. 5D, body support component 551 is adapted for providing a support structure upon which to affix various components of imaging apparatus 550 and also for providing a means to enclose various components of imaging apparatus 550. Body support component 551 is comprised of a molded plastic housing that provides both support and enclosure capabilities. Body support component 551 may be comprised of other materials, such as aluminum, steel, composite materials, and the like.

The extension support member 552 is adapted for providing a structural link between vertical support member 553, vertical motion member 554, camera support arm 555, movable camera and light source 556 and body support component 551 that extends horizontally from body support component 551. In one embodiment, extension support member 552 is affixed to body support component 551 via bolts. Extension support member 552 may also be affixed to body support component 551 via welding or other methods of joining materials. By way of example and not limitation, extension support member 552 may be comprised of pieces of aluminum welded or bolted together and may also be comprised of plastic.

Referring further to FIG. 5D, vertical support member 553 is adapted for providing a structural link between vertical motion member 554, camera support arm 555, and movable camera and light source 556 and extension support member 552. Vertical support member 553 extends substantially perpendicular to extension support member 552 and is affixed to extension support member 552 and camera housing 557. In one embodiment, vertical support member 553 is affixed to extension support member 552 and camera housing 557 via bolts. In other embodiments, vertical support member 553 may be affixed to extension support member 552 and camera housing 557 via welding and other methods of joining materials. By way of example and not limitation, vertical support member 553 may be comprised of pieces of aluminum welded or bolted together and may also be comprised of plastic.

In an embodiment, vertical motion member 554 is adapted for providing a means to change the vertical positioning of camera support arm 555 and movable camera and light source 556. For example, vertical motion member 554 may be an actuator or motor.

The camera support arm 555 is adapted for providing an extension to position movable camera and light source 556 inside the vehicle. In another embodiment, camera support arm 555 is adapted for providing an extension to position movable camera and light source 556 at various points around the exterior of the vehicle, such as above or below the vehicle. Camera support arm 555 is affixed to vertical support member 553 and pivots so that it can extend away horizontally from vertical support member 553 and body support component 551 or so that it can be stowed in a vertical position substantially parallel to vertical support member 553. In one embodiment, camera support arm 555 is affixed to vertical support member 553 via bolts. In other embodiments, camera support arm 555 is affixed to vertical support member 553 via welding and other methods of joining materials. By way of example and not limitation, camera support arm 555 comprises pieces of aluminum welded or bolted together and/or plastic. Camera support arm 555 is of such a thickness that it does not readily appear in stitched-together images acquired, for example, from inside the vehicle. An exemplary thickness of camera support arm 555 is 1.875 inches. In another embodiment, camera support arm 555 telescopes, which provides the advantage of allowing it to remain compact while providing the ability to position movable camera and light source 556 a greater distance from body support component 551 and vertical support member 553. In addition, one or more sensors 569 may be affixed to camera support arm 555.

Referring further to FIG. 5D, movable camera and light source 556 is adapted for providing sufficient lighting conditions and acquiring images of the interior of, for example, a vehicle and is comprised in this embodiment of two cameras having fisheye lenses mounted back-to-back at the end of camera support arm 555. Each fisheye camera allows essentially a hemisphere of viewing and preferably converts the distorted hemispherical image into a conventional rectilinear projection. In other embodiments, other projections, such as cylindrical, spherical, or other specialized projections may be used. Advantageously, software executed by movable camera and light source 556, computer 103, server 104, or any combination thereof, automatically stitches the images together to form a continuous image that accurately depicts the interior of the vehicle. Movable camera and light source 556 preferably includes one or more programmable DSLR cameras that provide pan, tilt, and zoom capabilities. Suitable DSLR cameras are available from Nikon Corp. and Canon, Inc. Movable camera and light source 556 may also include one or more Internet protocol (IP) cameras adapted for connecting to a telecommunications network, for example one utilizing the Internet Protocol communications protocol, such as the Internet. Suitable IP cameras are available from GeoVision, Inc. Arecont Vision provides suitable IP video cameras and associated software. It is also contemplated that movable camera and light source 556 is capable of directly coupling to a computing device via a relay or a communications channel employing serial and/or parallel communications methods. The cameras of movable camera and light source 556 preferably utilize a wide-angle lens, including, by way of example and not limitation, a fisheye lens. The present embodiment also contemplates the use of one or more handheld cameras. In addition, various filters, such as polarizing filters, may be employed on the cameras of movable camera and light source 556 for improving image quality. The light source of movable camera and light source 556 is mounted on camera support arm 555 adjacent to the cameras and is preferably comprised of light-emitting diodes. Further, one or more sensors 569 may be affixed on, or integrated into, movable camera and light source 556. For example, sensors 569 may help prevent damage to the subject being imaged by movable camera and light source 556.

The camera housing 557 is adapted for protecting movable camera and light source 556 when it is not in use. Camera housing 557 may be comprised of plastic, aluminum, steel, composite materials, or the like. Preferably, camera housing 557 has a three surfaces to protect movable camera and light source 556, including a bottom portion, a back portion, and an outer side portion. In this configuration, camera housing 557 is open at the top and on the side facing the front of imaging apparatus 550 to allow camera support arm 555 to pivot and place movable camera and light source 556 inside camera housing 557.

In the illustrated embodiment, stationary camera 558 is adapted for acquiring images of the exterior of the vehicle. Stationary camera 558 is affixed to the end of extension support member 552 opposite vertical support member 553. Stationary camera 558 preferably includes one or more programmable DSLR cameras that provide pan, tilt, and zoom capabilities. Suitable DSLR cameras are available from Nikon Corp. and Canon, Inc. Stationary camera 558 may also include one or more Internet protocol (IP) cameras adapted for connecting to a telecommunications network, for example one utilizing the Internet Protocol communications protocol, such as the Internet. Suitable IP cameras are available from GeoVision, Inc. Arecont Vision provides suitable IP video cameras and associated software. It is also contemplated that stationary camera 558 is capable of directly coupling to a computing device via a relay or a communications channel employing serial and/or parallel communications methods. In addition, various filters, such as polarizing filters, may be employed on stationary camera 558 for improving image quality. In an embodiment, stationary camera 558 is adapted for acquiring images of the exterior of the vehicle in a "zoomed out" perspective, while movable camera and light source 556 is adapted for acquiring images of the exterior of the vehicle in a "zoomed in" perspective.

The warning light 559 is adapted for alerting users as well as bystanders of the operation of imaging apparatus 550 by flashing or blinking a light source, such as an LED. Warning light 559 is affixed to extension support member 552. In one embodiment, warning light 559 flashes when imaging apparatus 550 is moving by self-locomotion. In another embodiment, warning light 559 flashes when camera support arm 555 pivots, extends, or moves in other respects. In another embodiment, warning light 559 may be used as a visual signal to a user that certain actions need to be taken with respect to imaging apparatus 550 or that imaging apparatus 550 has completed various portions of an image acquisition process.

According to aspects of the invention, speaker 560 is adapted for alerting users as well as bystanders of the operation of imaging apparatus 550 by producing various sounds. Speaker 560 is affixed inside body support component 551 and utilizes openings in body support component 551 for sound to escape. In one embodiment, speaker 560 produces sounds when imaging apparatus 550 is moving by self-locomotion. In another embodiment, speaker 560 produces sounds when camera support arm 555 pivots, extends, or moves in other respects. In another embodiment, speaker 560 may be used as an audible signal to a human user that certain actions need to be taken with respect to imaging apparatus 550 or that imaging apparatus 550 has completed various portions of an image acquisition process.

Referring further to FIG. 5D, wireless transceiver 561 is adapted for transmitting acquired images to computer 103, server 104, and/or database 105 via a communications medium, such as the Internet. Additionally, wireless transceiver 561 is adapted for receiving control signals generated by computer 103 or another computing device via a communications medium, such as the Internet. The control signals may provide information regarding the relative position of imaging apparatus 550 with respect to the vehicle, regarding movements of camera support arm 555, and regarding the operation and manipulation of movable camera and light source 556 and stationary camera 558. Wireless transceiver 561 is affixed to body support component 551 and has an antenna that extends from the top of body support component 551. Wireless transceiver 561 may be any transceiver capable of receiving and/or transmitting communications signals. By way of example and not limitation, wireless transceiver 561 may operate according the IEEE 802.11 (WiFi) standard, the IEEE 802.15.1 (Bluetooth™) standard, may be a cellular network modem, or may be a laptop computer having wireless communications capabilities. A suitable cellular network modem is the 341U available from Netgear, Inc. Advantageously, wireless transceiver 561 allows imaging apparatus 550 to receive and send information without the need for wires and to operate in a variety of locations.

The kill switch 562 is adapted for providing an easy means for a human user to stop the operation of imaging apparatus 550. For example, kill switch 562 may be an emergency stop button that, when pressed, immediately stops any self-locomotion of imaging apparatus 550 or manipulation of camera support arm 555. Advantageously, kill switch 562 allows a user to quickly stop any erroneous operations of imaging apparatus 550 and contributes to the ability of imaging apparatus 550 to operate safely around humans.

The access door 563 is adapted for providing a means to easily access components of imaging apparatus 550 that are located inside body support component 551. In one embodiment, access door 563 slides to create an opening in the surface of body support component 551. Access door 563 may open by other means, such as hinges, latches, and the like. In another embodiment, access door 563 includes a locking mechanism to prevent unauthorized opening. Advantageously, access door 563 allows body support component 551 to conceal certain components of imaging apparatus 550 while still providing a means for a human to access the concealed components for maintenance, troubleshooting, and the like.

The wheels 564 and motor 568 are adapted for providing self-locomotive capabilities for imaging apparatus 550. Motor 568 rotates an axle that is connected to wheels 564 such that motor 568 provides the necessary rotational torque to turn wheels 564. Motor 568 and wheels 564 also provides means for positioning imaging apparatus 550 at various locations relative to the vehicle. In one embodiment, skid-steer tracks or the like are used instead of wheels 564 to move imaging apparatus 550 across a surface to position imaging apparatus 550 relative to the vehicle.

In FIG. 5D, balance support 565 is adapted for helping to support the load of imaging apparatus 550 and keeping it stable. In an embodiment, balance support 565 may provide anti-tip capabilities and be referred to as an anti-tip support.

According to aspects of the invention, processor 566 is adapted for controlling various components of imaging apparatus 550. In one embodiment, processor 566 executes computer-executable instructions and generates electronic control signals to control vertical motion member 554, movable camera and light source 556, stationary camera 558, warning light 559, speaker 560, wheels 564, and motor 568 and send electronic signals via wireless transceiver 561. Further, processor 566 may receive electronic signals from vertical motion member 554, movable camera and light source 556, stationary camera 558, wireless transceiver 561, and kill switch 562 in order to transform them into electronic control signals. In one embodiment, processor 566 includes an associated memory that stores computer-executable instructions and electronic data. In one embodiment, processor 566 receives control signals from computer 103 and transforms them into electronic control signals to manipulate respective components of imaging apparatus 550 accordingly. In another embodiment, processor 566 executes computer-executable instructions to generate electronic control signals to control various components of imaging apparatus 550. In another embodiment, computing device 270 is an integrated circuit containing one or more processing units, a memory, an arithmetic logic unit, and/or a control unit.

The power source 567 is adapted for providing electrical energy to power the various components of imaging apparatus 550, including vertical motion member 554, camera support arm 555, movable camera and light source 556, stationary camera 558, warning light 559, speaker 560, wireless transceiver 561, processor 566, motor 568, and sensors 569. Power source 567 is affixed inside body support component 551. In one embodiment, power source 567 is a battery that can be recharged or replaced, such as, by way of example and not limitation, an automotive battery. In another embodiment, power source 567 is a photovoltaic cell.

The sensors 569 are adapted for providing information about the attributes of a surrounding environment of imaging apparatus 550, including the subject being imaged. For example, sensors 569 may utilize ultrasonic, radar, sonar, or infrared propagation techniques to determine the distance from imaging apparatus 550, or portions thereof, to another object. In an embodiment, sensors 569 aid in allowing imaging apparatus 550 to avoid obstacles. In another embodiment, sensors 569 allow imaging apparatus 550 to operate and acquire images without human involvement. Further, sensors 569 may provide measurement or dimension information about the subject being imaged.

In operation of one embodiment, imaging apparatus 550 is positioned at a predefined starting location outside the footprint of an object to be imaged either by a user manually moving imaging apparatus 550 or by imaging apparatus 550 self-locomoting. For example, the predefined starting location may be a base station associated with imaging apparatus 550 that provides recharging of power source 567. Once in the predefined location, processor 566 receives an electronic signal from computer 103 via wireless transceiver 561. Computer-executable instructions executing on processor 566 generate electronic control signals to control various components of imaging apparatus 550. For example, stationary camera 558 acquires images of the object, motor 568 powers wheels 564 to change the positioning of imaging apparatus 550, warning light 559 flashes, speaker 560 generates audible sounds, vertical motion member 554 alters the vertical height of camera support arm 555 and movable camera and light source 556, camera support arm 555 pivots to extend movable camera and light source 556, and movable camera and light source 556 provides sufficient lighting conditions and acquires images of the object. In an embodiment, imaging apparatus 550 is programmed to find its own way around the subject or vehicle being imaged such that it operates and acquires images in an autonomous manner.

In one embodiment, imaging apparatus 550 comprises a body support component that provides structure to a plurality of components of the imaging apparatus and an enclosure for a plurality of components of the imaging apparatus. The imaging apparatus further comprising an extension support member extending from the body support component, a vertical support member affixed to a first portion of the extension support member, and a stationary camera affixed to a second portion of the extension support member. The imaging apparatus further comprising a vertical motion member affixed to the vertical support member, a camera support arm affixed to the vertical motion member at a first end, a movable camera and light source affixed to a second end of the camera support arm. The imaging apparatus further comprising a camera housing affixed to the body support component and adapted to receive the movable camera and light source. The imaging apparatus further comprising a warning light affixed to the extension support member, a speaker enclosed within the body support component, a wireless transceiver enclosed within the body support component, a kill switch affixed to the extension support member, a balance support affixed to the body support component, a processor enclosed within the body support component, a power source enclosed within the body support component, and a motor enclosed within the body support component. The imaging apparatus further comprising an access door affixed to the body support component and wheels mechanically linked to the motor.

In addition to automobiles, various imaging apparatuses, methods, and/or imaging studios described herein are especially well suited to acquire exterior and/or interior images of an aircraft. In this embodiment, an imaging apparatus acquires images of the cockpit, cabin interior, fuselage exterior, top, bottom, wings, tail, and the like. For example, imaging apparatus 500 or imaging apparatus 550 may be used for this purpose. The acquired images are transmitted or transferred to computer 103, server 104, and/or database 105 according to embodiments of the invention.

In another embodiment of the present invention, various imaging apparatuses, methods, and/or imaging studios described herein are suitable for acquiring images of real estate and associated structures and/or fixtures. For example, mobile image acquisition apparatus 200, imaging apparatus 500, and/or imaging apparatus 550 are suitable for this purpose. In another embodiment, one or more cameras as described herein are affixed to a tripod and placed in the middle of a room or space, indoors or outdoors, and images of the room or space are acquired as described herein. The imaging apparatus in this embodiment is capable of transmitting or transferring images to computer 103, server 104, and/or database 105.

FIGS. 6A-E illustrate imaging studio 600, which in one embodiment serves as the front-end image acquisition component 102 of FIG. 1. The imaging studio 600 in the illustrated embodiment includes an optional vehicle transporter 602, camera towers 604, a camera boom 606, and cameras 608. The imaging studio 600 is configured to allow a vehicle to travel through locations 610, 612, 614, 616, 618, and 620 (whether it moves independently or is carried through by the vehicle transporter 602). In the embodiments of FIGS. 6A-E, imaging studio 600 is adapted for acquiring images of a vehicle, but it is contemplated that imaging studio 600 may be used to acquire images of other objects. In one embodiment, imaging studio 600 is referred to as a finish line studio.

Figure 6A:
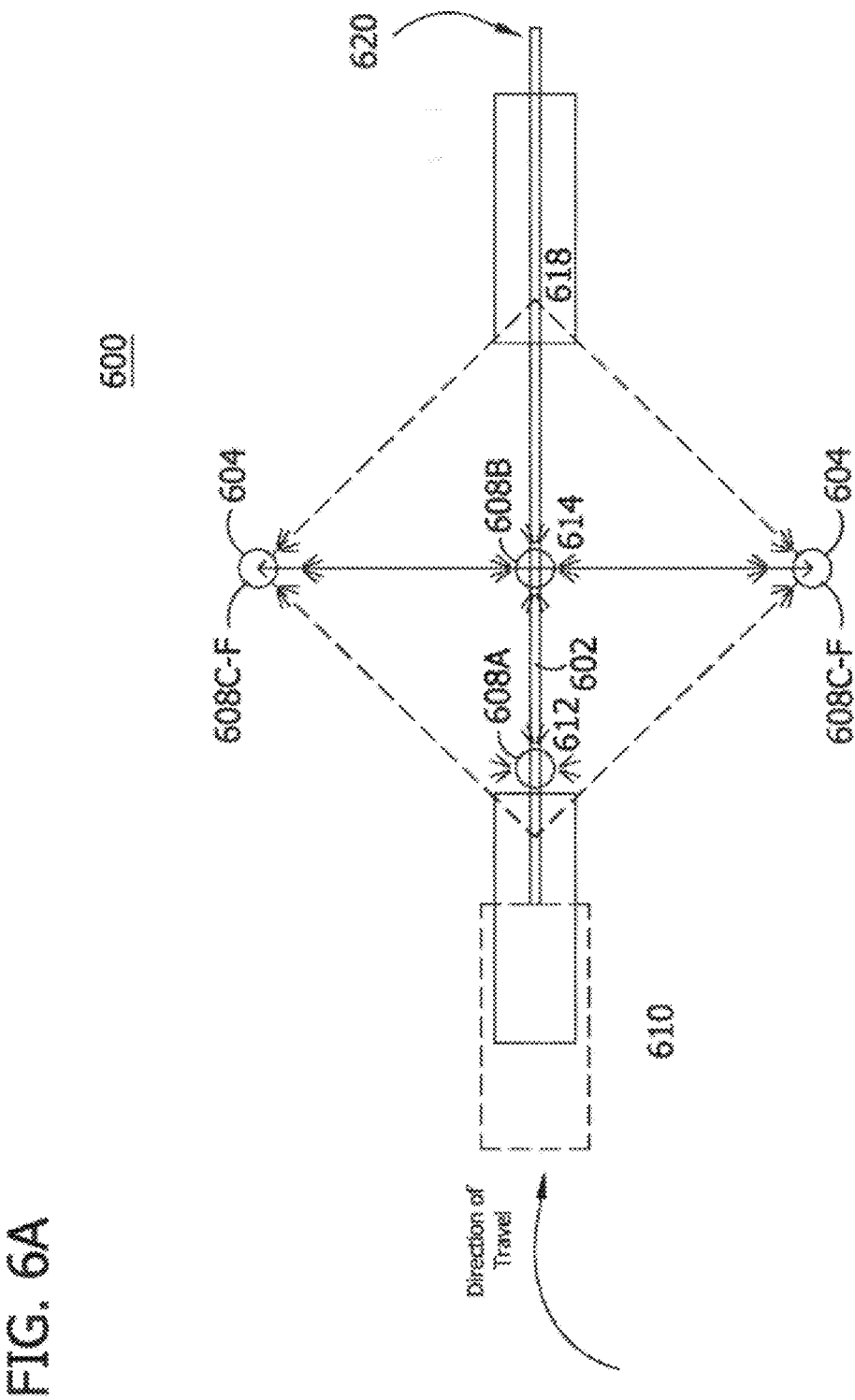
FIGS. 6A-E illustrate an imaging studio comprised of cameras, camera towers, camera booms, and a vehicle transporter for use in the automated studio of FIG. 1 in accordance with an embodiment of the invention.
Figure 6B:
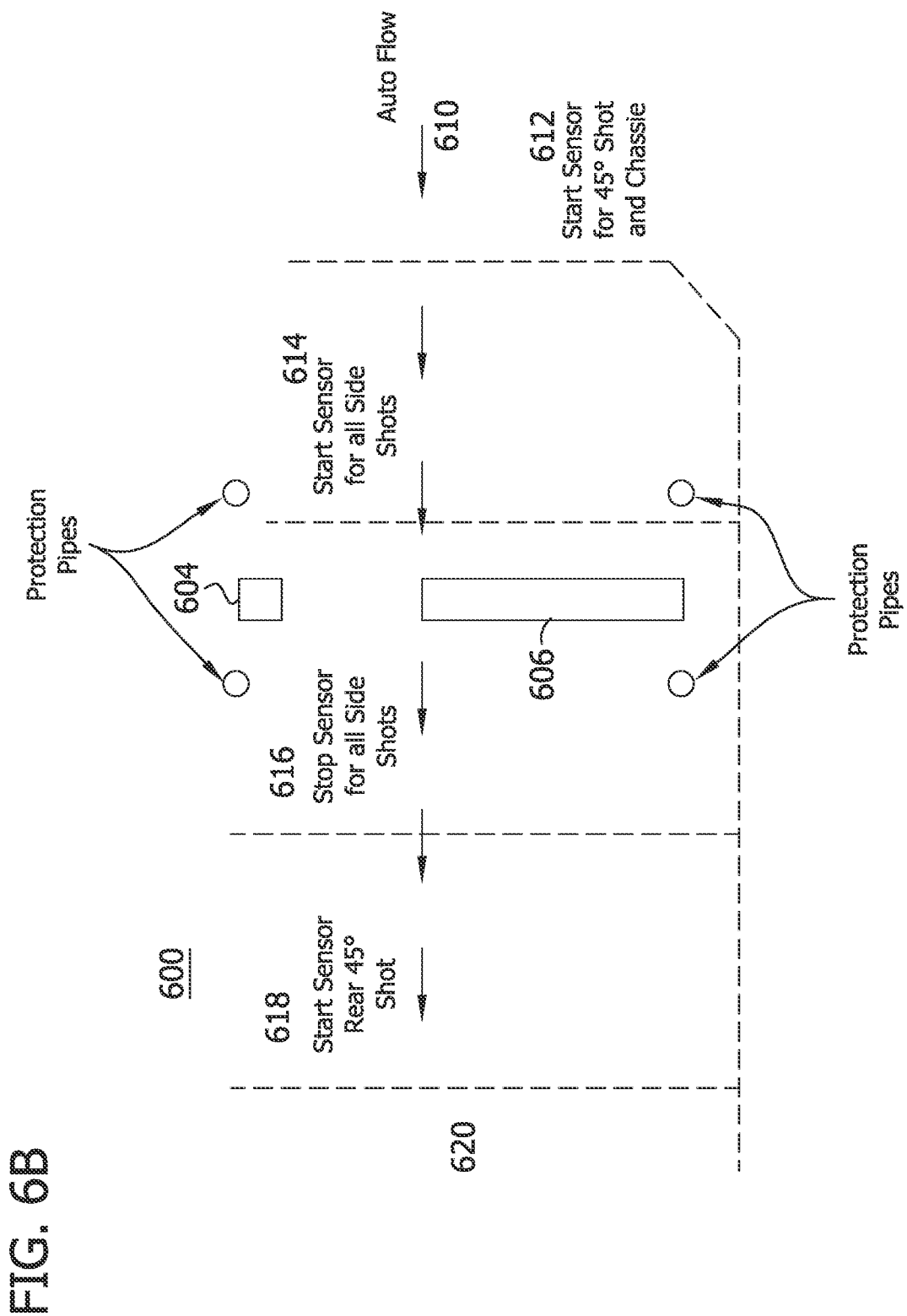
Figure 6C:
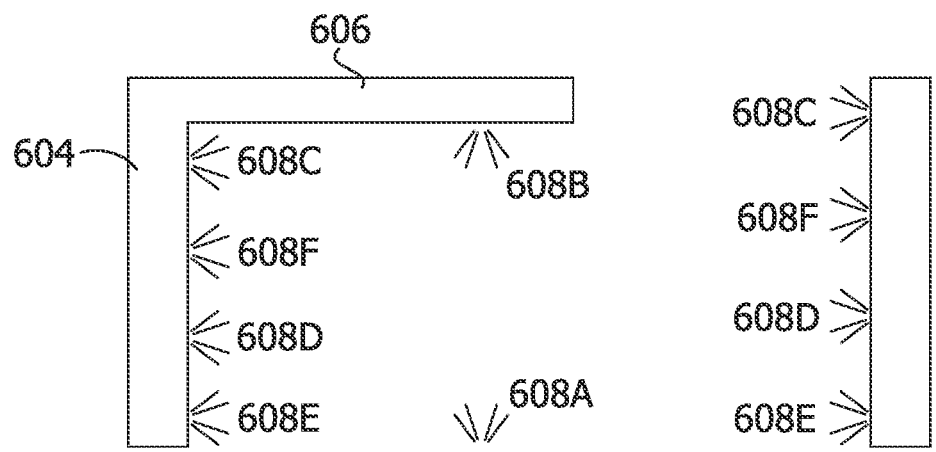
Figure 6D:
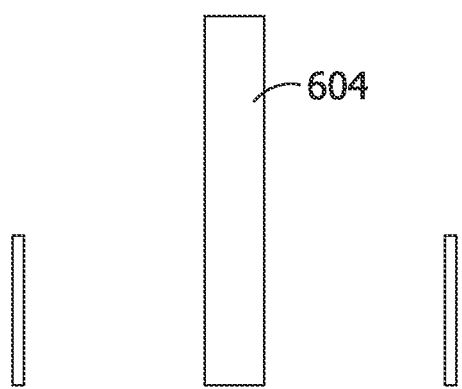
Figure 6E:
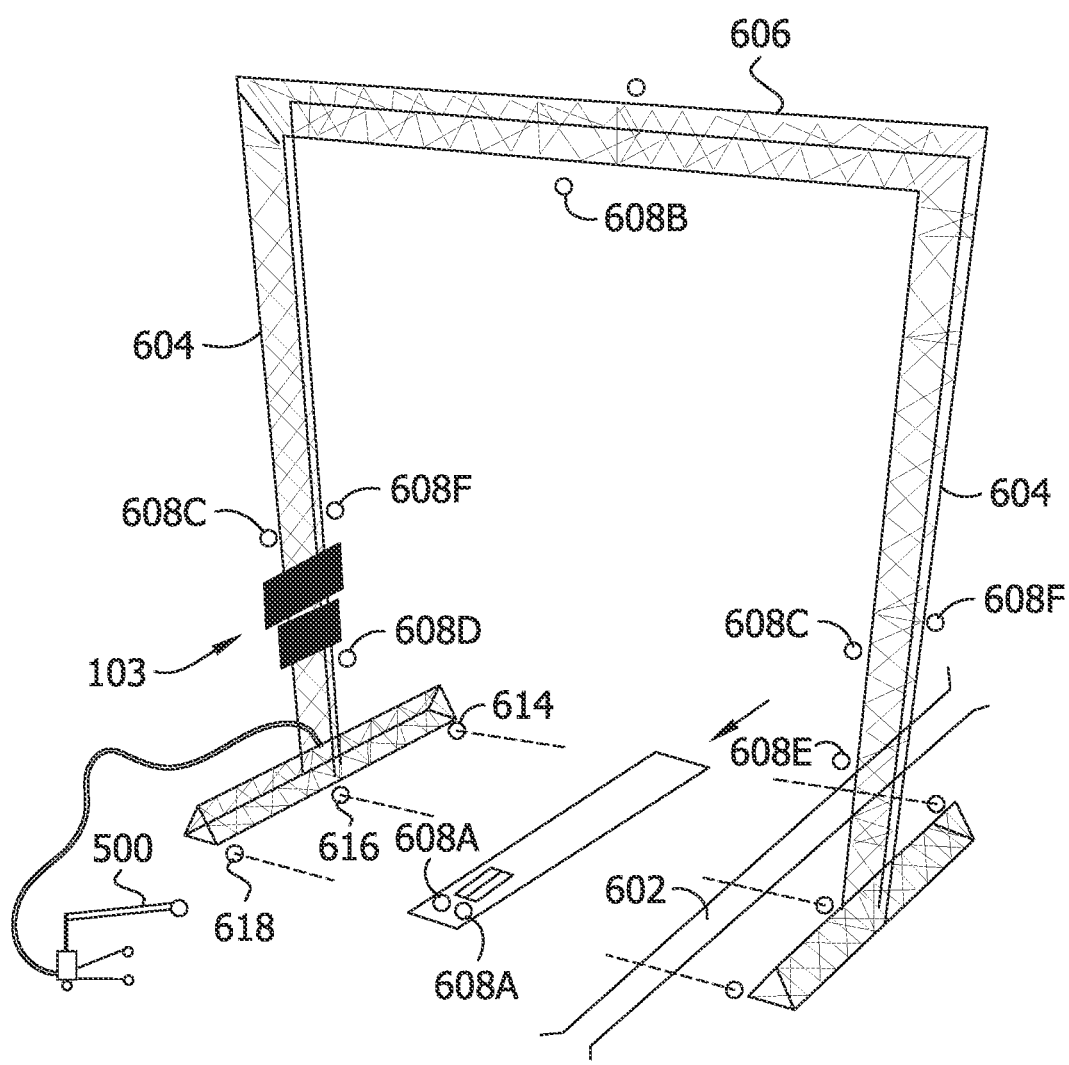
Figure 7A:
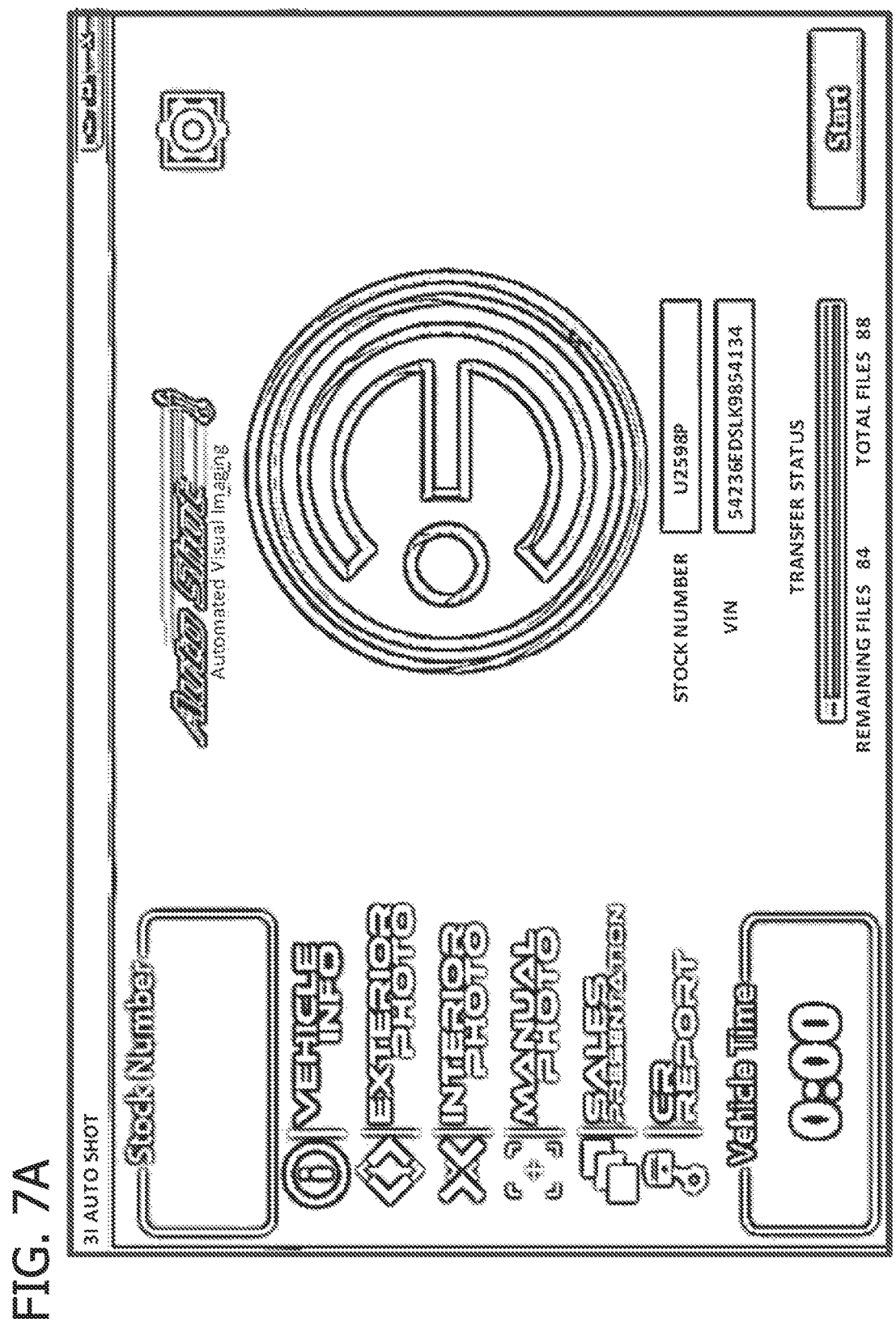
FIGS. 7A-7F illustrate an exemplary GUI for acquiring images and/or information and receiving commands from a user.
Figure 7B:
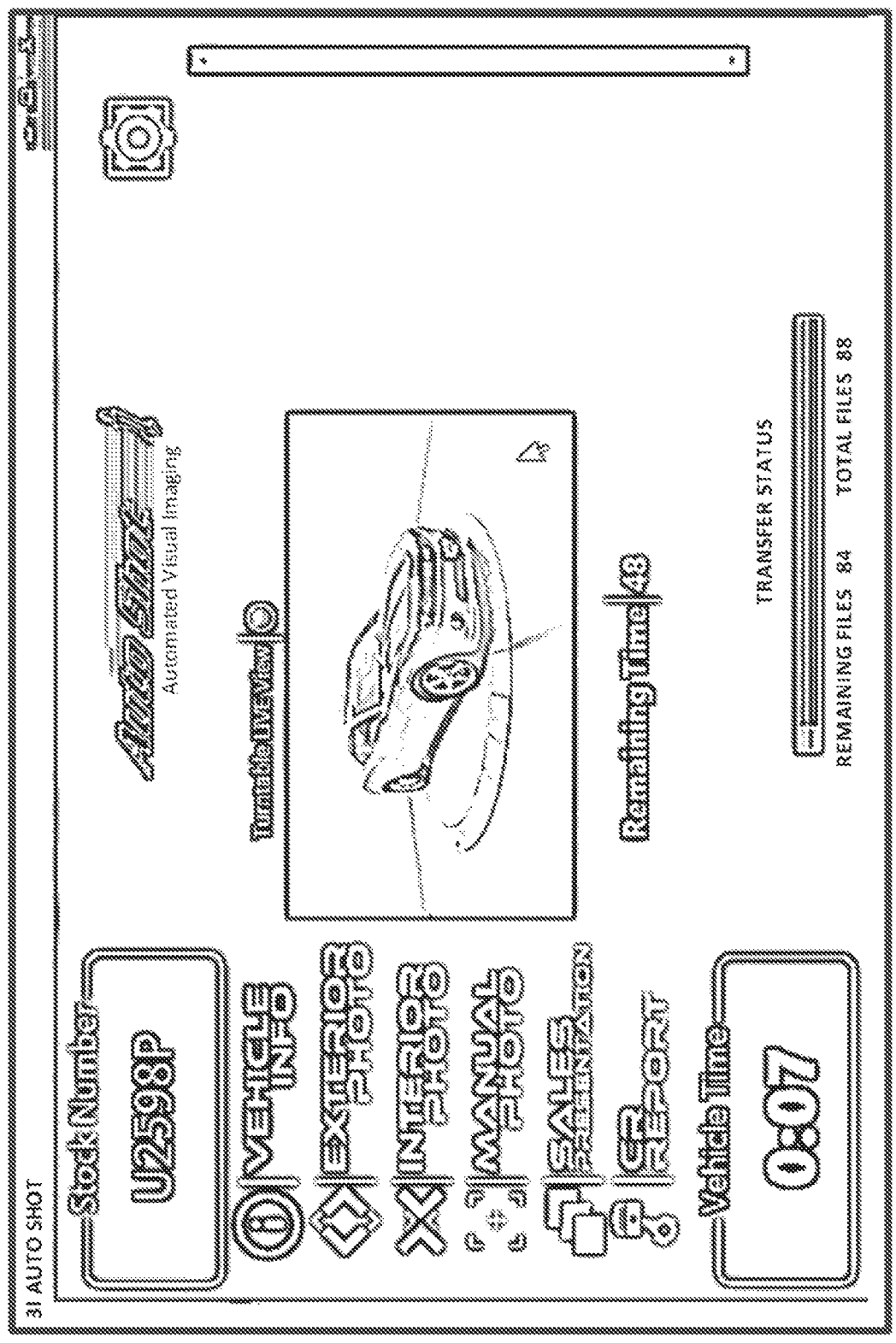
Figure 7C:
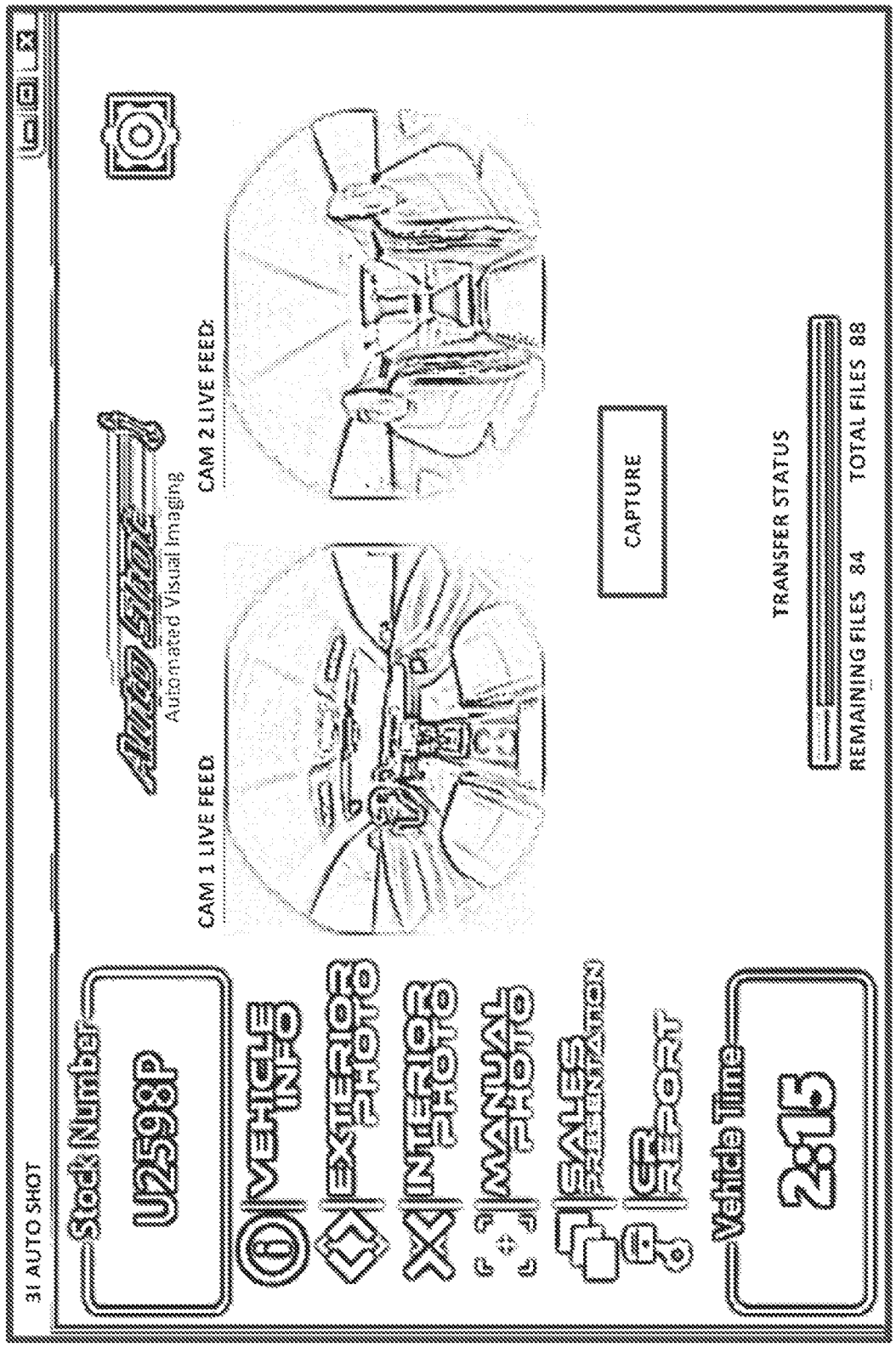
Figure 7D:
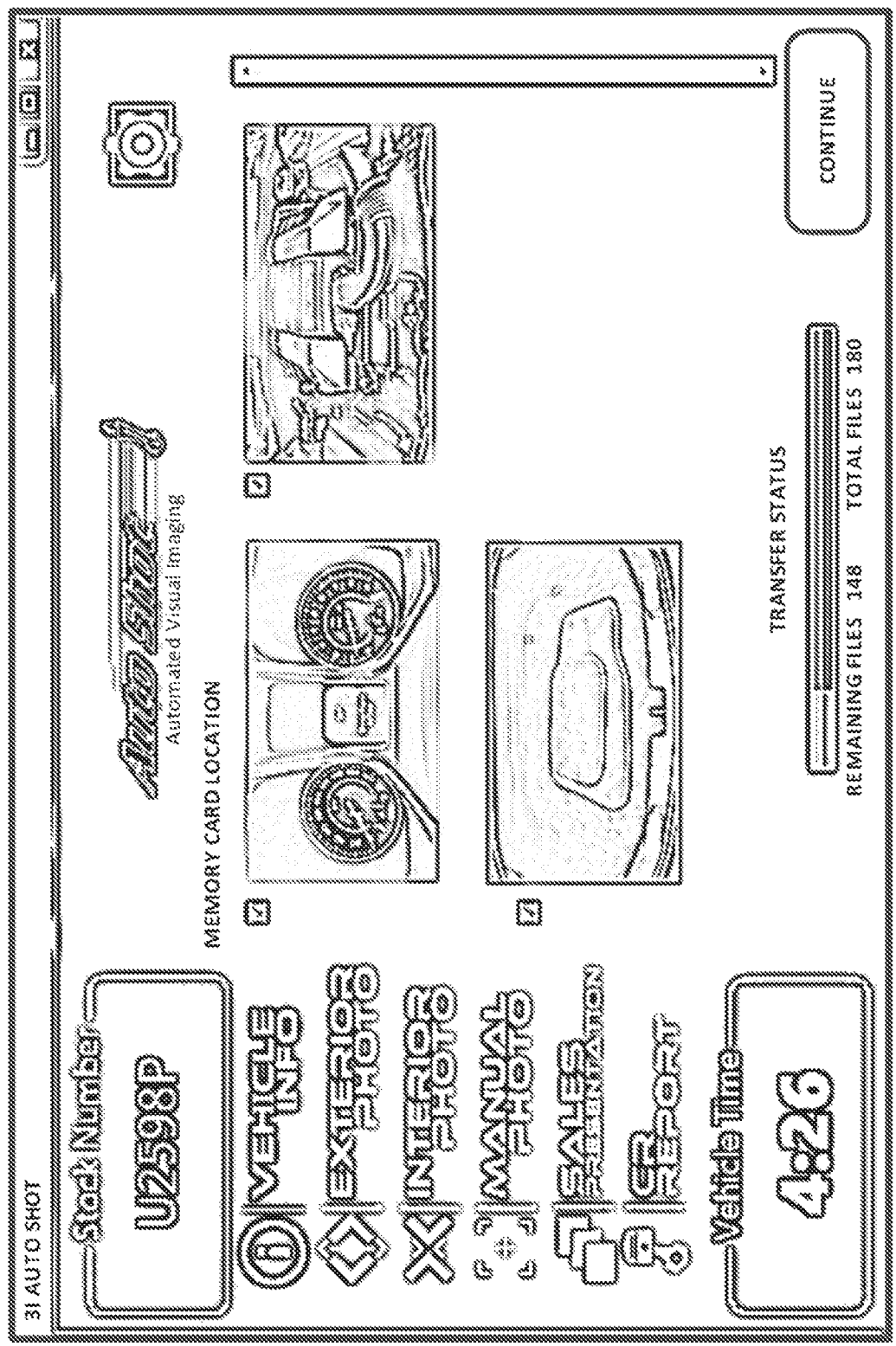
Figure 7E:
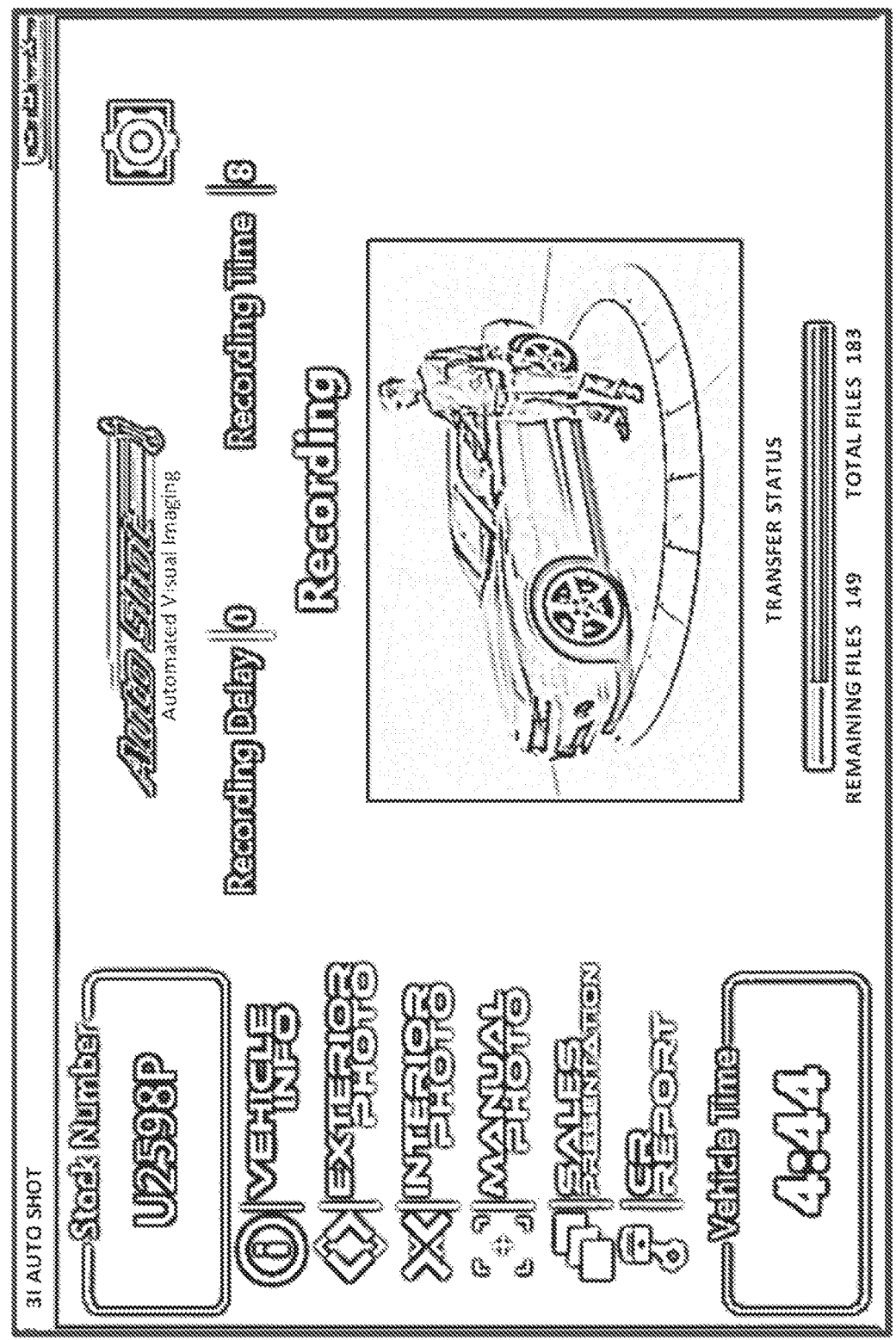
Figure 7F:
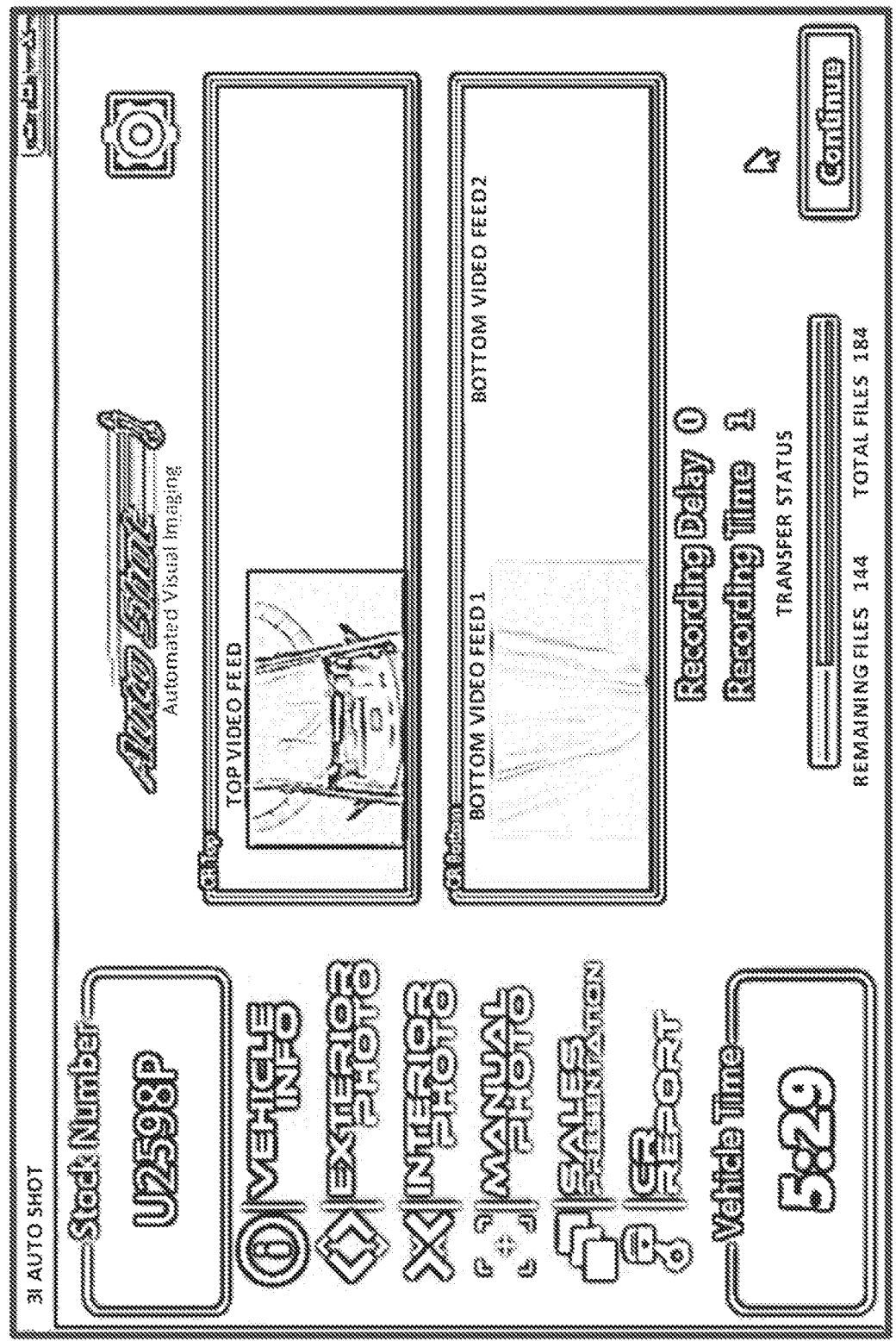

As shown in the embodiment depicted in FIG. 6E, the imaging studio can utilize a gantry structure with supports that function as camera towers 604 and a center beam that functions as camera boom 606. In one embodiment, vehicle transporter 602 is used to carry a vehicle through imaging studio 600. The vehicle transporter 602 is adapted for receiving a vehicle at a first location and moving it linearly past camera towers 604, camera boom 606, and cameras 608 to a second location. In the embodiment shown in FIG. 6A, vehicle transporter 602 receives a vehicle at location 610 and moves it past camera towers 604, camera boom 606, and cameras 608 to location 620.

In one embodiment, vehicle transporter 602 is a conveyer system that is seventy feet in length. Suitable conveyer systems include the DuraTrans® XD manufactured by Belanger, Inc. In the embodiment of FIG. 6B, vehicle transporter 602 utilizes sensors to control the speed of vehicle movement and to signal vehicle location with respect to camera towers 604, camera boom 606, and cameras 608. In this embodiment, vehicle transporter 602 receives a vehicle at location 610 and begins moving it toward camera towers 604, camera boom 606, and cameras 608. When vehicle transporter 602 moves the vehicle into position 612, a first sensor is tripped that initiates operation of cameras 608 that are used for a front 45-degree shot and a chassis shot, as further described below. When vehicle transporter 602 moves the vehicle into position 614, a second sensor is tripped that ends operation of cameras 608 that are used for a front 45-degree shot and a chassis shot and initiates operation of cameras 608 that are used for a side shot, as further described below. When vehicle transporter 602 moves the vehicle into position 616, a third sensor is tripped that ends operation of cameras 608 that are used for a side shot, as further described below. When vehicle transporter 602 moves the vehicle into position 618, a fourth sensor is tripped that initiates operation of cameras 608 that are used for a rear 45-degree shot, as further described below. When vehicle transporter 602 moves the vehicle into position 620, a fifth sensor is tripped that ends operation of cameras 608 that are used for a rear 45-degree shot, as further described below. FIG. 6E provides a perspective view of the above embodiment.

In another embodiment, imaging studio 600 does not include a vehicle transporter, and the vehicle travels freely from a first location and past camera towers 604, camera boom 606, and cameras 608 until it reaches a second location on the other side of imaging studio 600. Sensors in imaging studio 600 measure the speed and position of the vehicle relative to camera towers 604, camera boom 696, and cameras 608. When the vehicle moves to position 612, a first sensor is tripped that initiates operation of cameras 608 that are used for a front 45-degree shot and a chassis shot, as further described below. When the vehicle moves to position 614, a second sensor is tripped that ends operation of cameras 608 that are used for a front 45-degree shot and a chassis shot and initiates operation of cameras 608 that are used for a side shot, as further described below. When the vehicle moves to position 616, a third sensor is tripped that ends operation of cameras 608 that are used for a side shot, as further described below. When the vehicle moves to position 618, a fourth sensor is tripped that initiates operation of cameras 608 that are used for a rear 45-degree shot, as further described below. When the vehicle moves to position 620, a fifth sensor is tripped that ends operation of cameras 608 that are used for a rear 45-degree shot, as further described below.

In the embodiment of FIG. 6A, camera towers 604 are adapted for providing a vertical structure to support and position at least one of cameras 608. Preferably, camera towers 604 are ten feet in height, two feet wide, and are made of aluminum. In one embodiment, camera towers 604 are located twenty to thirty feet apart from each other, with vehicle transporter 602 located equidistant between them. In one embodiment, protection pipes surround camera towers 604 to help prevent camera towers 604 from being struck by a vehicle being imaged. FIG. 6C illustrates a front view of camera towers 604 as viewed from location 610 along vehicle transporter 602. FIG. 6D illustrates a side view of camera towers 604 as viewed from a point between location 614 and location 616 along vehicle transporter 602. FIG. 6E illustrates a perspective view of camera towers 604.

Referring to FIG. 6C, the camera boom 606 is adapted for providing a structure to support and position at least one of cameras 608 above vehicle transporter 602. Preferably, camera boom 606 is affixed to the top of one of camera towers 604 at a height of ten feet and extends from that camera tower to a point above vehicle transporter 602. In one embodiment, camera boom 606 is made of aluminum. FIG. 6C illustrates a front view of camera boom 606 as viewed from location 610 along vehicle transporter 602. An arch or applicator bar in an exterior rollover car wash system is suitable for adapting to support camera tower 604 and camera boom 606. FIG. 6E illustrates a perspective view of camera boom 606 functioning as the cross beam of a gantry structure.

Referring further to FIGS. 6A, 6C, and 6E, cameras 608 are adapted for acquiring images of the exterior of the vehicle. In one embodiment, camera 608A is located underneath the vehicle along the path of vehicle transporter 602 at a point before the vehicle reaches camera towers 604 and camera boom 606 and acquires images of the vehicle chassis or other portions of the vehicle that are visible from underneath. In one embodiment, camera 608A is adapted for acquiring images in response to a first sensor signal when the vehicle is between location 612 and location 614. Camera 608B is affixed to camera boom 606 and is located at a point substantially ten feet above vehicle transporter 602. In one embodiment, camera 608B is adapted for acquiring images of the top of the vehicle in response to a second sensor signal when the vehicle is between location 614 and location 616.

Cameras 608C, 608D, and 608E are affixed to camera towers 604. Cameras 608C are located eight to ten feet above vehicle transporter 602. In one embodiment, cameras 608C are adapted for acquiring images of the roof of the vehicle in response to a second sensor signal when the vehicle is between location 614 and location 616. Cameras 608D are located five feet above vehicle transporter 602. In one embodiment, cameras 608D are adapted for acquiring images of the sides of the vehicle in response to a second sensor signal when the vehicle is between location 614 and location 616. Cameras 608E are located two feet above vehicle transporter 602. In one embodiment, cameras 608E are adapted for acquiring images of the wheels of the vehicle in response to a second sensor signal when the vehicle is between location 614 and location 616.

Cameras 608F are located between 5 and 10 feet above vehicle transporter 602. In one embodiment, cameras 608F are adapted for acquiring images of the front of the vehicle at a 45-degree angle in response to a first sensor signal when the vehicle is between location 612 and location 614. In another embodiment, cameras 608F are adapted for acquiring images of the rear of the vehicle at a 45-degree angle in response to a fourth sensor signal when the vehicle is between location 618 and location 620. It is contemplated that the height of cameras 608A-F may be altered from those described above to accommodate a vehicle with larger or smaller dimensions.

In an embodiment, cameras 608 are adapted for simultaneously acquiring images of the exterior of a vehicle in both a "zoomed-out" perspective and a "zoomed-in" perspective. For example, cameras 608-F may be adapted for acquiring images in the zoomed-out perspective, while cameras 608-D may be adapted for acquiring images in the zoomed-in perspective.

The cameras 608 preferably include one or more programmable DSLR cameras that provide pan, tilt, and zoom capabilities. Suitable DSLR cameras are available from Nikon Corp. and Canon, Inc. Cameras 608 may also be one or more Internet protocol (IP) cameras adapted for connecting to a telecommunications network, for example one utilizing the Internet Protocol communications protocol, such as the Internet. Suitable IP cameras are available from GeoVision, Inc. Arecont Vision provides suitable IP video cameras and associated software. In one embodiment, cameras 608 include video cameras capable of recording at 4K, or 4K2K, resolution. It is also contemplated that cameras 608 are capable of directly coupling to a computing device via a relay or a communications channel employing serial and/or parallel communications methods. In addition, various filters, such as polarizing filters, may be employed on cameras 608 for improving image quality. In one embodiment, cameras 608 transmit acquired images to computer 103, server 104, and/or database 105, which can store, process, and/or mine the information for patterns, analogous values, and the like as described above.

Beneficially, one embodiment of imaging studio 600 provides the ability for one or two users to acquire images of forty to sixty vehicles in one hour. In one embodiment, imaging studio 600 provides the ability to acquire video and/or as many as sixty images of each vehicle including images of the chassis, wheels, roof, hood, and trunk, 45-degree images, side view images, 360-degree interior images. In one embodiment, imaging studio 600 is used in conjunction with imaging apparatus 500, described herein. In another embodiment, imaging studio 600 is used in conjunction with imaging apparatus 550, described herein. For example, imaging apparatus 500 and/or imaging apparatus 550 are configured to acquire images of the interior of a vehicle before or after transport through imaging studio 600. In another embodiment, imaging apparatus 600 is used in conjunction with one or more handheld cameras.

In another embodiment, cameras 608 utilize a processor to facilitate receiving and transmitting electronic control data and acquired image data. In an additional embodiment, cameras 608 may utilize computer 103, which displays on a GUI a systematic process for acquiring images of an object and acquired images (e.g., ceiling shots, undercarriage shots, etc.). FIGS. 7A-7F illustrate an exemplary GUI for acquiring images and/or information and receiving commands from a user. Computer 103 may also display on a GUI stock images in a grayscale format for images of the object from perspectives that have yet to be acquired. In another embodiment, cameras 608 utilize an integrated circuit containing one or more processing units, a memory, an arithmetic logic unit, and/or a control unit to facilitate receiving and transmitting electronic control data and acquired image data.

In one embodiment, a method for acquiring images for rendering a virtual vehicle showroom comprises connecting a vehicle to a vehicle transporter at a first predetermined location, transporting the vehicle along a path to a second predetermined location, and acquiring a plurality of images of the vehicle with a plurality of cameras while the vehicle is transported along the path. In another embodiment, the method further comprises transforming the acquired images into a stitched 360-degree panoramic image of the vehicle.

According to further aspects of the invention, images acquired by a third-party provider and transmitted or transferred to computer 103 serves as the front-end image acquisition component 102 of FIG. 1. For example, a third-party provider acquires images using apparatuses, methods, and/or studios described herein and then transmits them to computer 103, server 104, and/or database 105 using a communications network or transfers them to computer 103, server 104, and/or database 105 via an external storage medium.

Figure 8B:
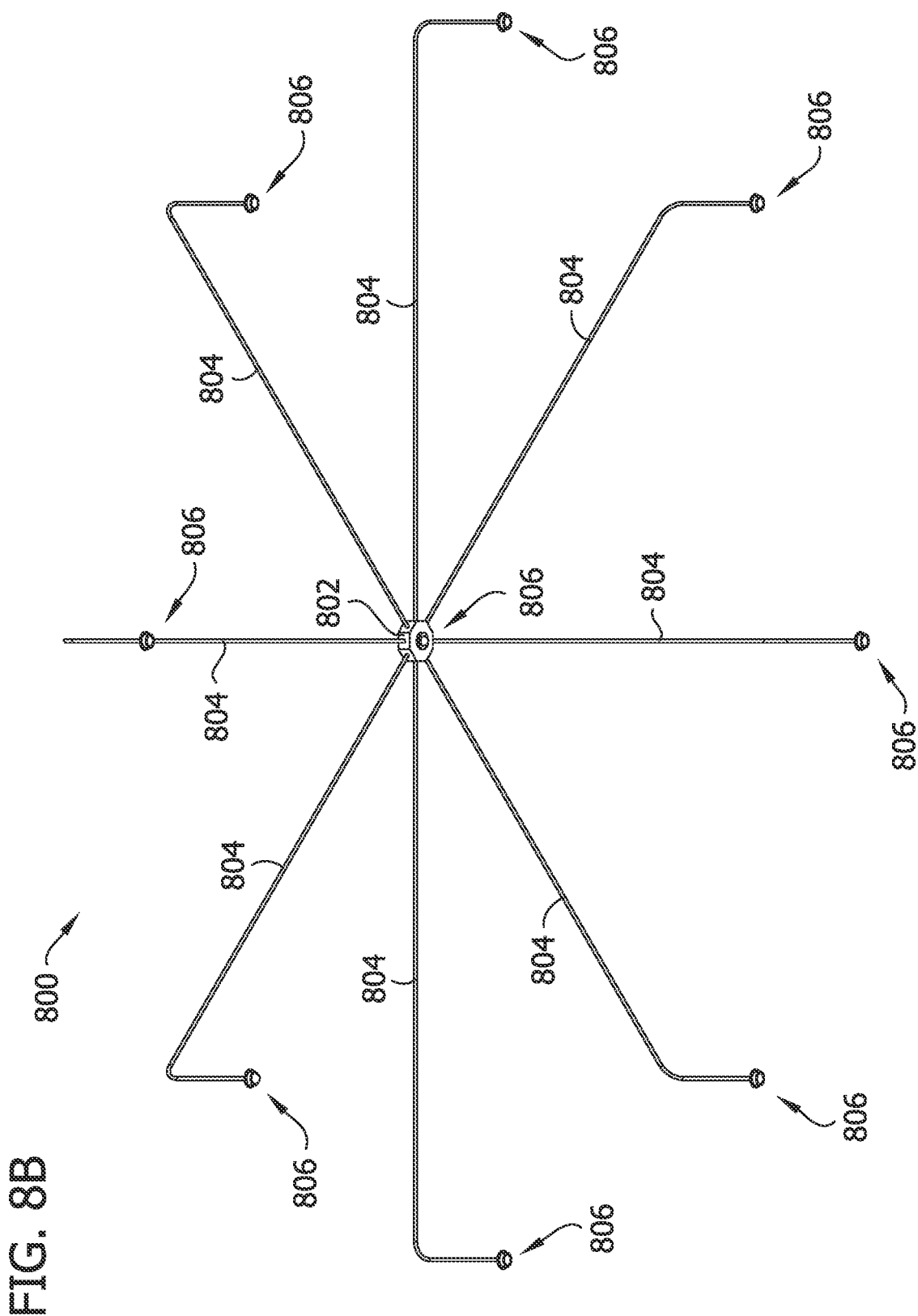

FIGS. 8A-B illustrate an exemplary imaging apparatus 800, which in one embodiment serves as the front-end image acquisition component 102 of FIG. 1. FIG. 8A provides a top perspective view, while FIG. 8B provides a bottom perspective view of the imaging apparatus 800. The imaging apparatus 800 includes a hub 802, arms 804, and cameras 806. In an embodiment, imaging apparatus 800 is capable of installation in a pre-existing structure. For example, imaging apparatus 800 may be installed in an automotive service bay. Advantageously, imaging apparatus 800 embodying aspects of the invention is capable of imaging a subject (e.g., a vehicle) in a period of about five seconds and creating an entry for the subject in an online inventory of subjects as further described herein. In the illustrated embodiment, a camera 806 is physically connected to each arm 804 and each arm 804 is physically connected to hub 802. A camera 806 is also physically connected to hub 802 in the illustrated embodiment. In another embodiment, imaging apparatus 800 is used in conjunction with imaging apparatus 500, described herein. In yet another embodiment, each camera 806 acquires images of the subject at a substantially simultaneous time. The acquired images may be stitched together by a processor executing processor-executable instructions to form a 360-degree image, as described herein.

The hub 802 is adapted to support arms 804. In an embodiment, hub 802 is an octagonal box comprised of a rigid material such as polyvinyl chloride (PVC), for example. The arms 804 are adapted to extend from hub 802 and support arm cameras 806 such that arm cameras 806 are positioned around the periphery of the subject being imaged. The embodiment illustrated in FIGS. 8A-B includes eight support arms 804 extending outwardly from octagonal hub 802 at increments of about forty-five degrees. In an embodiment, arms 804 comprise metallic conduit poles (e.g., electrical metallic tubing (EMT)) having a diameter of three-quarters of an inch (¾") and a length of ten feet (10').

The cameras 806 are adapted for acquiring images of the subject. The cameras 806 preferably include one or more Internet protocol (IP) cameras adapted for connecting to a telecommunications network, for example one utilizing the Internet Protocol communications protocol, such as the Internet. Suitable IP cameras are available from GeoVision, Inc. Arecont Vision provides suitable IP video cameras and associated software. The cameras 806 may also include one or more DSLR cameras that provide pan, tilt, and zoom capabilities. Suitable DSLR cameras are available from Nikon Corp. and Canon, Inc. In another embodiment, cameras 806 are communicatively connected to computer 103, receive electronic command signals from computer 103, and transmit acquired image data to computer 103. In another embodiment, cameras 806 are adapted for directly coupling to computer 103 via a relay or communications channel employing serial and/or parallel communications methods. In yet another embodiment, cameras 806 transmit acquired image data to server 104 and/or database 105. In addition, various filters, such as polarizing filters, may be employed on cameras 806 for improving image quality. In an embodiment, physical media (e.g., wires) that communicatively and/or electrically connect to cameras 806 are enclosed within an inner cavity of arms 804. One having skill in the art will understand that cameras 806 may also be communicatively and/or electrically connected to aspects of automated studio 100 via wireless channels.

FIG. 9A illustrates an exploded side view of aspects of imaging apparatus 800 and supports 818. In the illustrated embodiment, imaging apparatus 800 further includes a non-bent portion 804-A and a bent portion 804-B of arm 804, a connector sleeve 810, a box 812, a connector 814, a cover 816, and the supports 818. The supports 818 comprise carabiners 820, a turnbuckle 822, a coupler 824, and a clamp 826. In an embodiment, imaging apparatus 800 is utilized in conjunction with a subject alignment pattern 828 affixed to a support surface 830.

In the embodiment illustrated in FIG. 9A, a connector 814 is physically connected to hub 802 and an end of non-bent portion 804-A of arm 804. The connector 814 is preferably an EMT set screw connector having a diameter of three-quarters of an inch (¾"). At an opposite end, non-bent portion of arm 804-A is physically connected to one end of connector sleeve 810. An opposite end of connector sleeve 810 is physically connected to bent portion 804-B of arm 804. In this manner, connector sleeve 810 connects non-bent portion 804-A to bent portion 804-B. The connector sleeve 810 is preferably a conduit connector sleeve for accepting non-bent portion 804-A and bent portion 804-B each having a diameter of three-quarters of an inch (¾"). The connector sleeve 810 also preferably includes screws having a length of one-half of an inch (½"). In an embodiment, bent portion of arm 804-B includes an elbow of about ninety degrees and is cut to a desired length. At an end opposite the connection to connector sleeve 810, bent portion of arm 804-B is physically connected to another connector 814 which in turn is physically connected to box 812. The box 812 is preferably a round conduit box having five holes each having a diameter of three-quarters of an inch (¾"). Each box 812 also has a cover 816, which is preferably comprised of round non-metallic plastic. In an embodiment, cameras 806 physically connect to the cover 816 and/or the box 812.

Aspects of imaging apparatus 800 are connected to a support structure (e.g., a ceiling, a wall, etc.) via supports 818. In the embodiment of FIG. 9A, supports 818 comprise carabiners 820 having a first end and an opposite second end, a turnbuckle 820 having a first end and an opposite second end, and a coupler 824 having a first end and an opposite second end. Preferably, the first end of one of the carabiners 820 is physically connected to hub 802 and/or arm 804. The carabiner 820 may be connected to arm 804 via the clamp 826 (e.g., pipe clamp). The second end of that carabiner 820 is connected to the first end of turnbuckle 820. The second end of turnbuckle 820 is connected to the first end of coupler 824 and the second end of coupler 824 is connected to the first end of the second carabiner 820. The second end of the second carabiner 820 is adapted to connect to the support structure. Preferably, carabiners 820 include three-eighths inch (⅜") coated spring link carabiners and turnbuckles 822 include those having five-sixteenths inch (5/16") by nine and three-eighths inch (9⅜") eyes and/or eye 15. The coupler 824 in the embodiment illustrated in FIG. 9A is preferably a wire having a diameter of three-eighths inch (⅜"). It will be understood by one having ordinary skill in the art that coupler 824 may also comprise chains, as further described herein. The clamps 826 are preferably three-quarters inch (¾") steel conduit pipe clamps and pipe hangers.

The subject alignment pattern 828, is adapted for providing a means to consistently position subjects for imaging with respect to cameras 806. The embodiment illustrated by FIGS. 9A-D is preferably utilized to acquire images of a vehicle. In an embodiment, subject alignment pattern 828 comprises subject alignment patterns 430A-C as described herein.

Figure 9B:
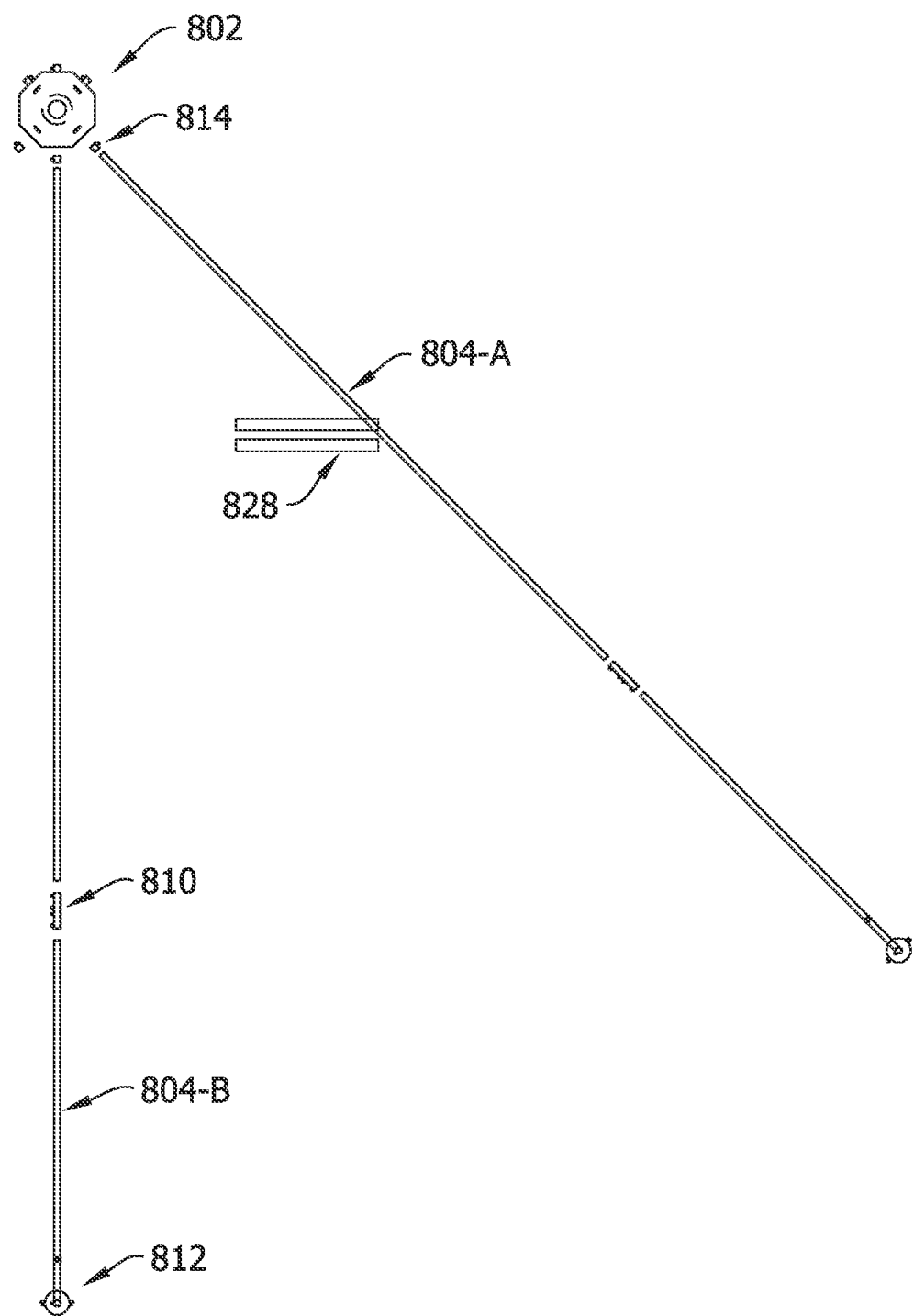
Figure 9D:
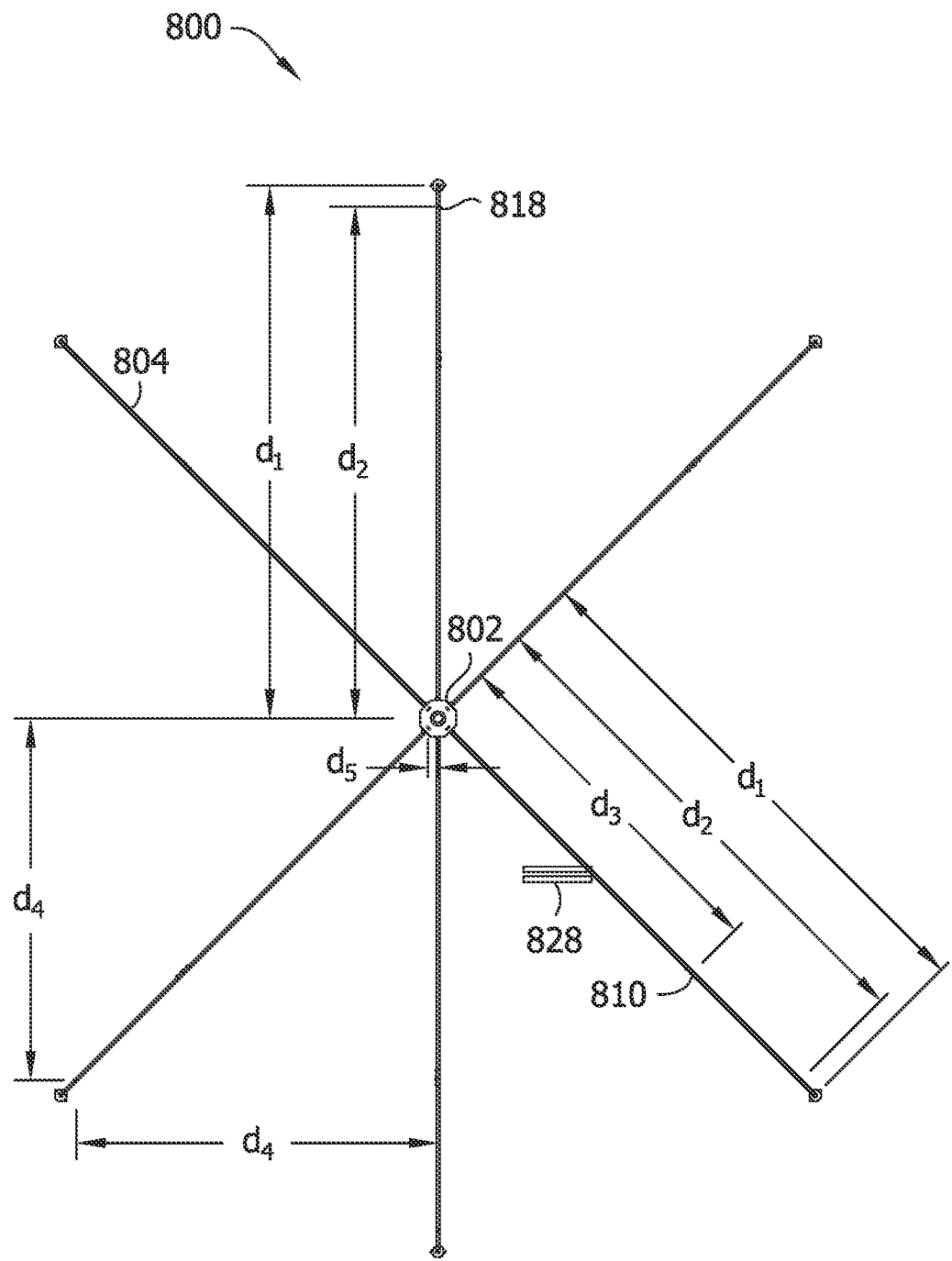

FIG. 9B illustrates an exploded top view of aspects of imaging apparatus 800. FIG. 9C illustrates a full side view of imaging apparatus 800. As illustrated, arms 804 extend towards support surface 830 for a length I and a camera 806 connected to hub 802 is a height h above support surface 830. In this embodiment, h is preferably ten feet (10') and l is preferably cut to a desired length. FIG. 9D illustrates a full top view of imaging apparatus 800. The arms 804 extend a distance $d_1$ from the center of hub 802, a support 818 is connected to arm 804 at a distance $d_2$ from the center of hub 802, and connector sleeve 810 connects to non-bent portion of arm 804-A to bent portion of arm 804-B at a distance $d_3$ from a near edge of hub 802. The support 818 is also located a distance $d_4$ from the extended centerline of hub 802 and from an adjacent arm 804. A vertex of octagonal hub 802 to an edge of arm 804 is a distance $d_6$. In the embodiment of imaging apparatus 800 illustrated by FIGS. 9A-D, $d_1$ is preferably fifteen feet, seven and one-quarter inches (15'-7¼"), $d_2$ is preferably fifteen feet (15'), $d_3$ is preferably ten feet (10'), $d_4$ is preferably ten feet, seven and one-quarter inches (10'-7¼"), and $d_6$ is preferably three and one-quarter inches (3¼ ").

Figure 10A:
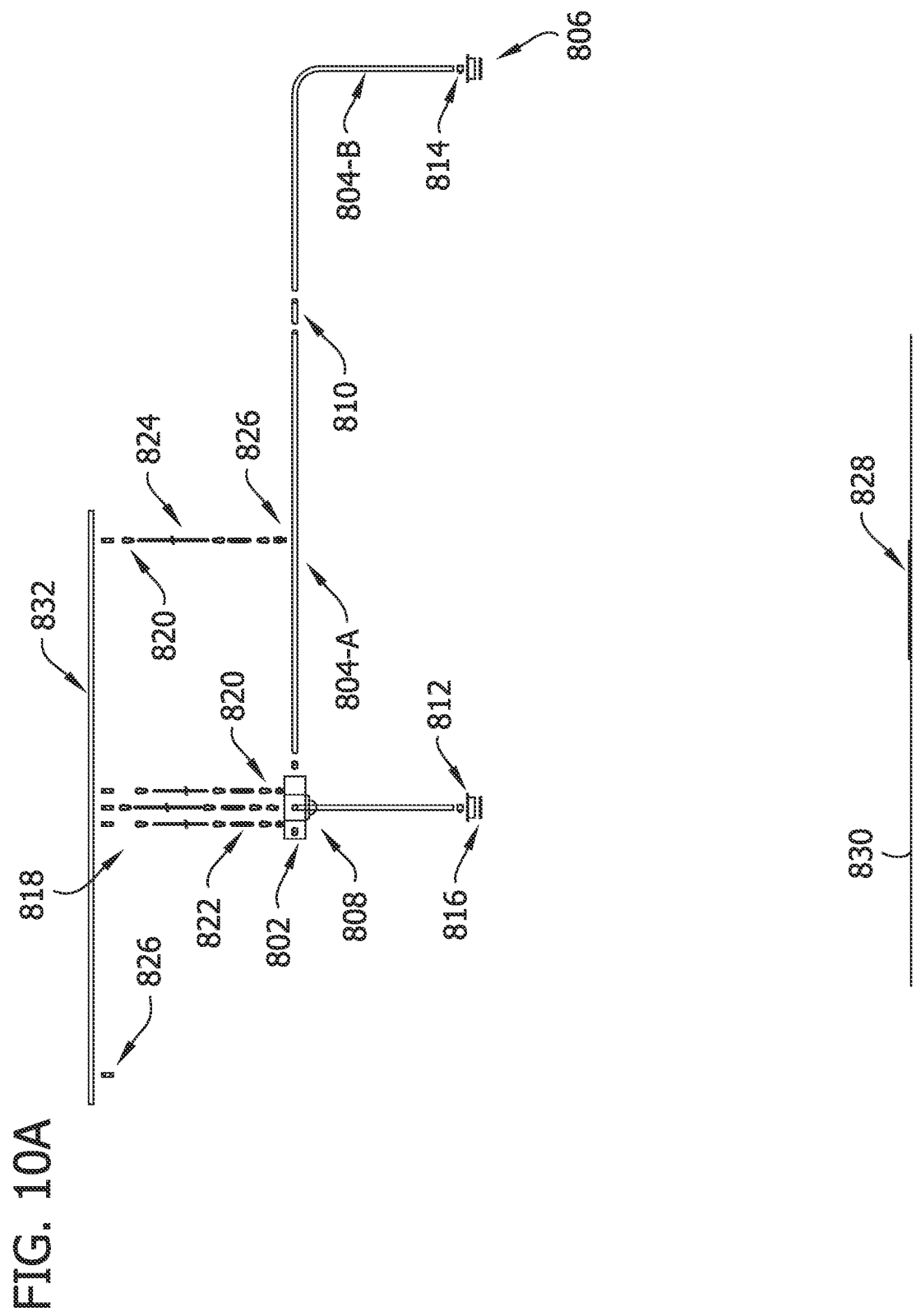
Figure 10B:
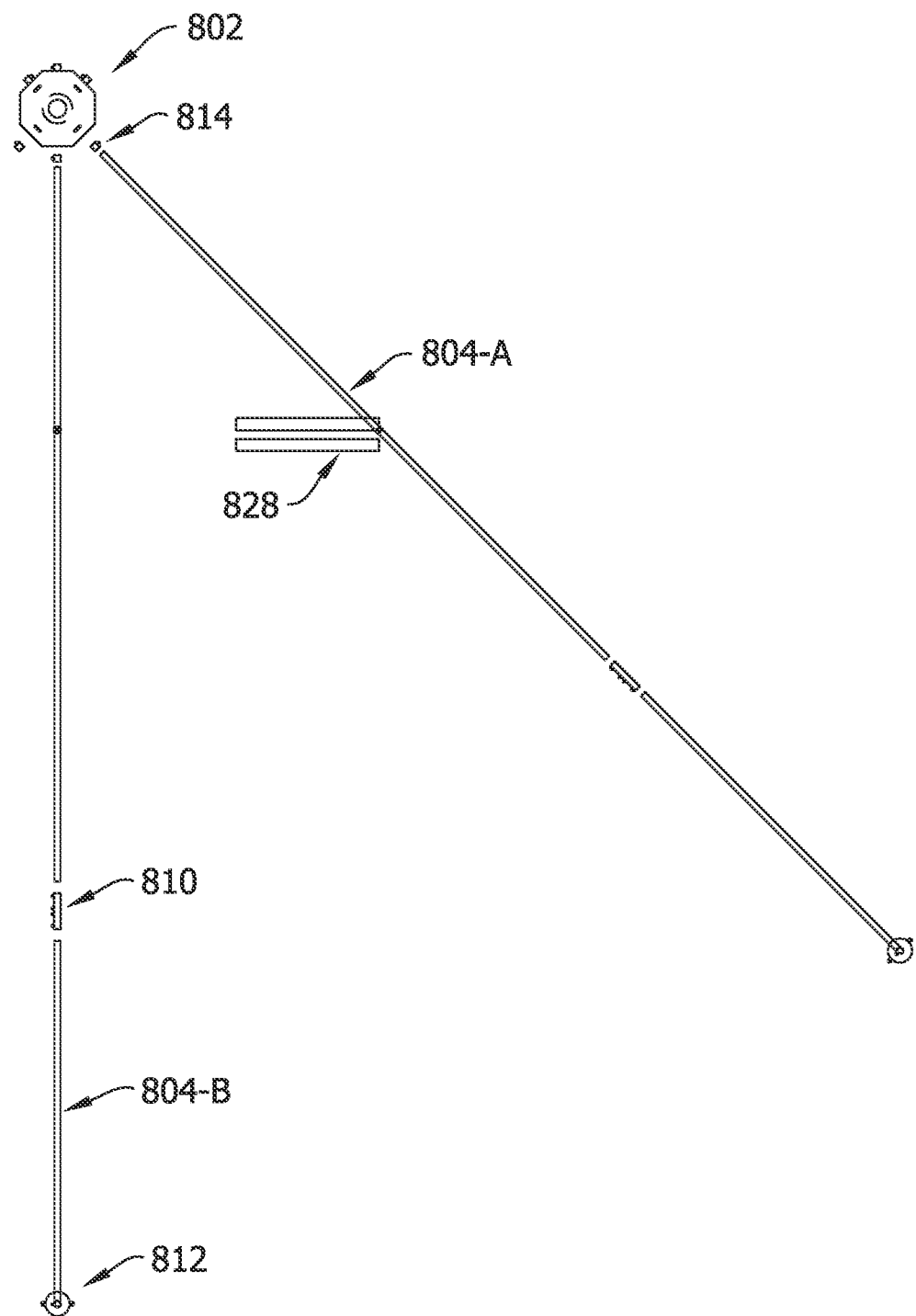

FIGS. 10A-D illustrate another embodiment of imaging apparatus 800. In this embodiment, aspects of imaging apparatus 800 are connected to a structure mount 832 via supports 818. In an embodiment, structure mount 832 is preferably an EMT conduit pole having a length of ten feet (10') and a diameter of three-quarters of an inch (⅜"). The structure mount 832 is physically attached at a fixed location to a structure (e.g., ceiling, wall, etc.) via bolts, screws, welding, or the like. In the illustrated embodiment, couplers 824 of supports 818 are preferably three-eighths inch (⅜") chains. As shown by FIG. 10C, bent portion of arms 804-B extends toward support surface 830 a length I, which is preferably two feet, eight inches (2'-8") in this embodiment. The height h is preferably ten feet (10') in this embodiment.

Figure 10D:
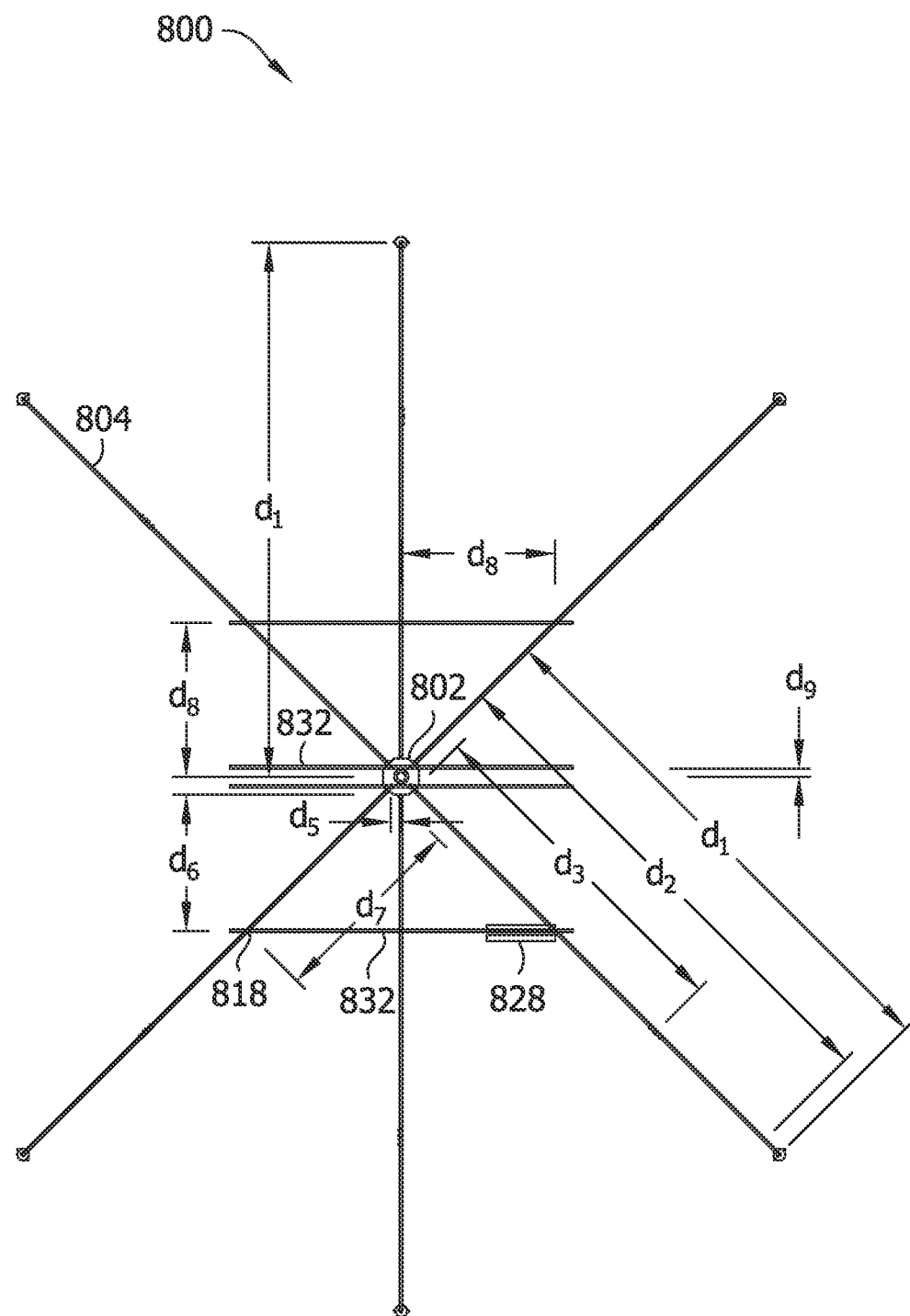

As illustrated in the top view of FIG. 10D, arms 804 extend the distance $d_1$ from the center of hub 802 and connector sleeve 810 connects non-bent portion of arm 804-A to bent portion of arm 804-B at the distance $d_3$ from a near edge of hub 802. A vertex of octagonal hub 802 to an edge of arm 804 is a distance $d_6$. A structure mount 832 is a distance $d_6$ from a near edge of octagonal hub 802. A support 818 is a distance $d_7$ from a near edge of octagonal hub 802 and a distance $d_8$ from the extended centerline of hub 802. The distance $d_8$ is also the distance between adjacent arms 804 in this embodiment. Another structure mount 832 is a distance $d_9$ from the center of hub 802. In the embodiment of imaging apparatus 800 illustrated by FIGS. 10A-D, $d_1$ is preferably fifteen feet, seven and one-quarter inches (15'-7¼"), $d_2$ is preferably fifteen feet (15'), $d_3$ is preferably ten feet (10'), $d_6$ is preferably three and one-quarter inches (3¼"), $d_6$ is preferably three feet, eleven and three-quarters inches (3'-11¾"), $d_7$ is preferably five feet, ten inches (5'-10"), $d_8$ is preferably four feet, six inches (4'-6"), and $d_9$ is preferably two and three-quarters inches (2¾").

Figure 11A:
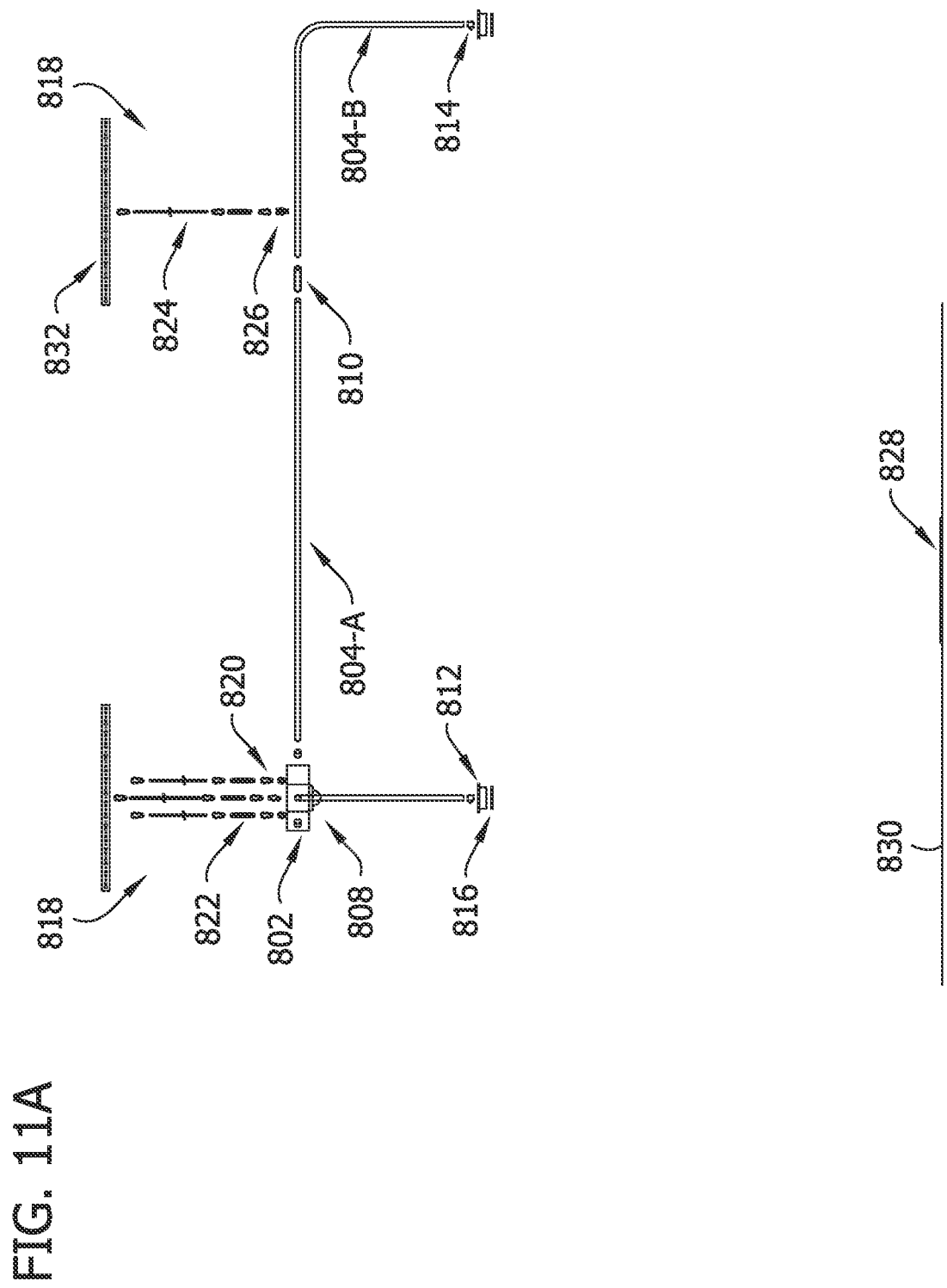
Figure 11B:
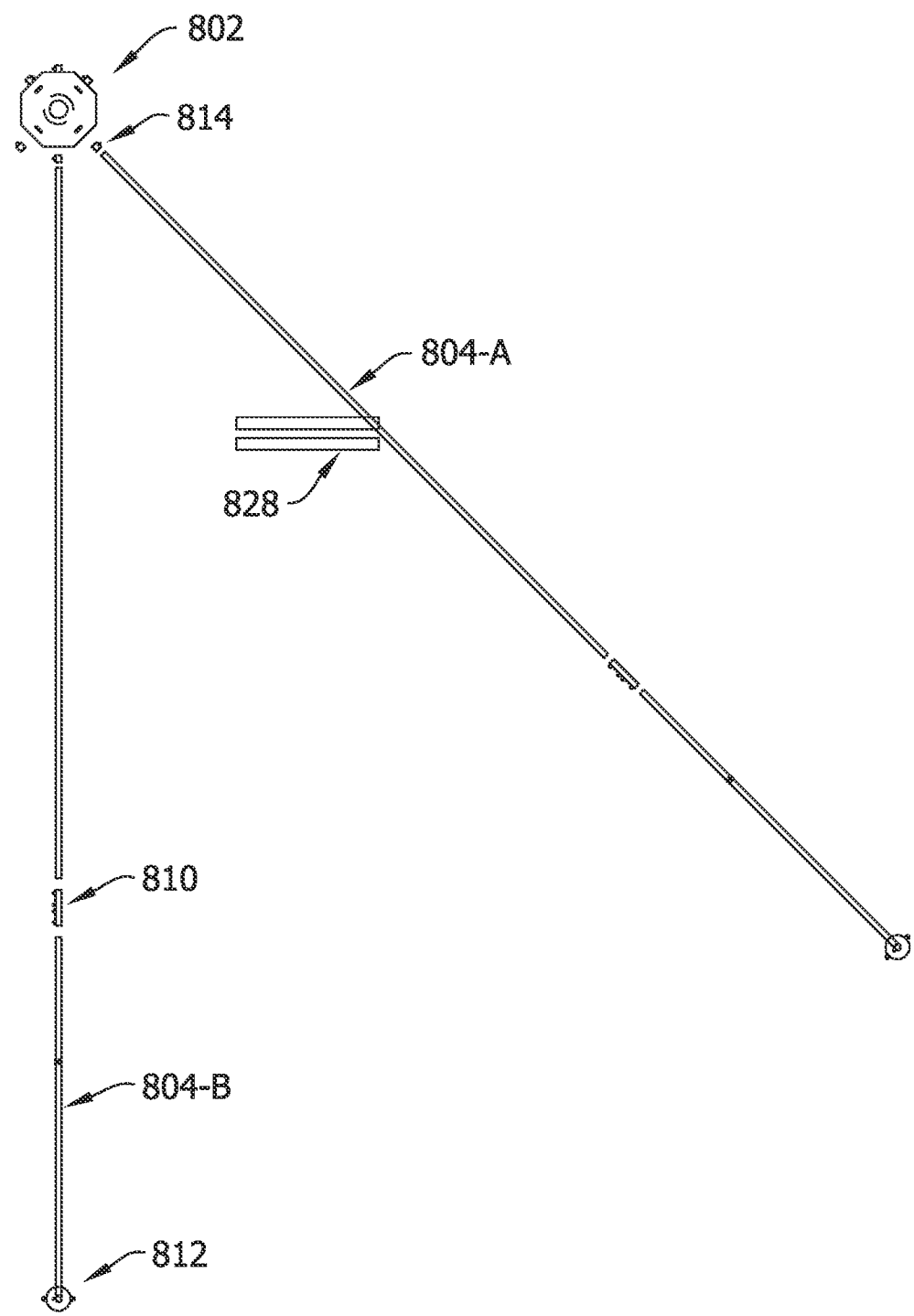

FIGS. 11A-D illustrate yet another embodiment of imaging apparatus 800. In this embodiment, aspects of imaging apparatus 800 are connected via supports 818 to structure mounts 832 that are preferably zinc-plated slotted angle irons having a dimension of one and one-half inches (1½") by sixty inches (60"). The structure mounts 832 are physically attached at fixed locations to a structure (e.g., ceiling, wall, etc.) via bolts, screws, welding, or the like. In the illustrated embodiment, couplers 824 of supports 818 are preferably three-eighths inch (⅜") chains. As shown by FIG. 11C, bent portion of arms 804-B extends toward support surface 830 a length I, which is preferably two feet, eight inches (2'-8") in this embodiment. The height h is preferably ten feet (10') in this embodiment.

Figure 11D:
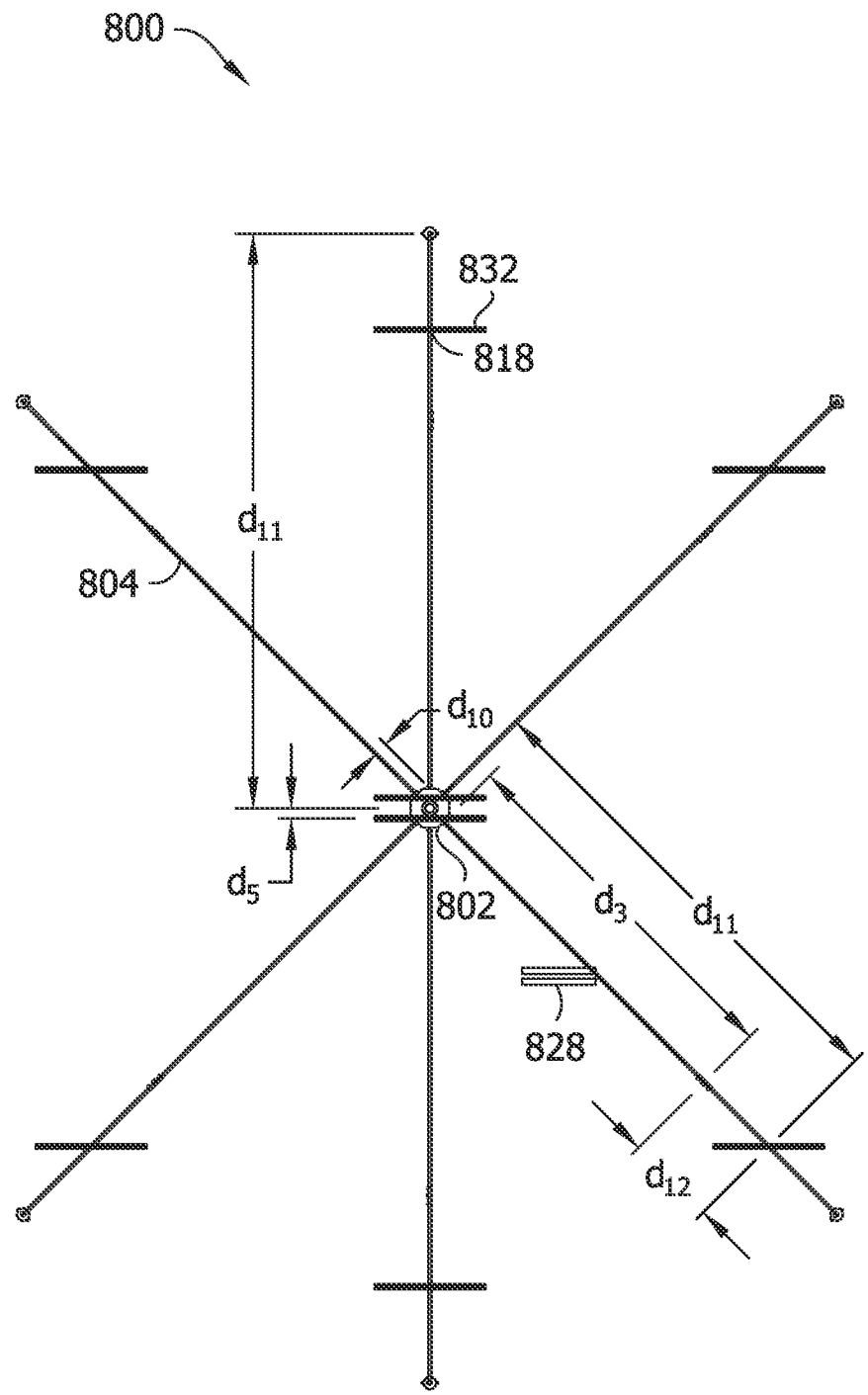

As illustrated in the top view of FIG. 11D, support 818 is a distance $d_{11}$ from the center of hub 802 and connector sleeve 810 connects non-bent portion of arm 804-A to bent portion of arm 804-B at a distance $d_3$ from a near edge of hub 802. The supports 818 are a distance $d_{12}$ from connector sleeves 810. The center of hub 802 is also a distance $d_5$ from the center of structure mounts 832 above hub 802. The centers of holes in octagonal hub 802 to which arms 804 are connected are a distance $d_{10}$ apart from each other. In the embodiment of imaging apparatus 800 illustrated by FIGS. 11A-D, $d_3$ is preferably ten feet (10'), $d_6$ is preferably three and one-quarter inches (3¼"), $d_{10}$ is preferably four and three-quarter inches (4¾"), $d_{11}$ is preferably thirteen feet (13'), and $d_{12}$ is preferably two feet, five and three-quarters inches (2'-5¾").

In an embodiment, imaging apparatus 800 is installed in a photo bay having a ceiling and a floor. The installation process begins by determining the center of the photo bay and marking the ceiling at the center. The process continues by making four marks on the ceiling, each forty-five degrees from the bay centerline and four and three-quarters inches (4¾") from the center mark. Six marks are then made on the ceiling, four of which are forty-five degrees from the bay centerline and two of which are along the bay centerline. All six of the marks are each thirteen feet (13') from the center mark. The process continues by installing eight ceiling mounts 832 (e.g., slotted angle irons) below each of the ten marks on the ceiling. Two of the ceiling mounts 832 will connect to four supports 818 connected to hub 802. A carabiner 820 is attached to each of the ten ceiling mounts 832 and then a coupler 824 is attached to each of the ten carabiners 820. In an embodiment, couplers 824 are chains that are cut to result in a lower end of the coupler being a distance above the floor. Preferably, a lower end of the coupler is ten feet, six inches (10'-6") from the floor. A carabiner 820 is then attached to the lower end of each chain, a turnbuckle 822 is attached at an upper end to each carabiner 820 and then another carabiner 820 is attached to a lower end of each turnbuckle 822. The hub 802 is attached to four carabiners 820 at the center of the bay with the front of the hub facing toward the front of the bay. The turnbuckles 822 and the lengths of couplers 824 are adjusted until a lower surface of the hub 802 is a distance above the floor. Preferably, this distance is ten feet (10') above the floor. A non-bent portion of arm 804-A is connected to a first end of bent portion of arm 804-B via a connector sleeve 810. A clamp 826 is attached to a bent portion of arm 804-B at a distance from the center of connector sleeve 810. Preferably this distance is two feet, five and three-quarters inches (2'-5¾"). This step is repeated to make additional arms 804. For example, the step is repeated five times to result in six arms 804. All arms 804 are installed into connectors 814 to physically connect to hub 802. The arms 804 are suspended by attaching the clamps 826 to the remaining carabiners 820. The turnbuckles 822 and couplers 824 are adjusted until arms 804 are substantially horizontal (e.g., parallel to the floor). A connector 814, a box 812, and a cover 816 are then installed on a lower end of each bent portion of arm 804-B (i.e., an end not connected to connector sleeve 810). In an embodiment, the arms 804 are conduit poles through which wire is pulled from hub 802 to the lower end of each arm. The wiring is attached to cameras 806 which are then physically connected to box 812 and/or cover 816 of each arm 804.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

The invention claimed is:

1. A method of acquiring images of an exterior of a vehicle while the vehicle is moving, comprising:
   while the vehicle is moving, acquiring first image data of a first side of the vehicle with a plurality of first side view cameras, the plurality of first side view cameras including at least four first side view cameras being generally vertically aligned and vertically spaced from each other such that the at least four first side view cameras are arranged at various heights relative to the vehicle;
   while the vehicle is moving, acquiring second image data of a second side of the vehicle with a plurality of second side view cameras, the plurality of second side view cameras including at least four second side view cameras being generally vertically aligned and vertically spaced from each other such that the at least four second side view cameras are arranged at various heights relative to the vehicle;
   panning or tilting (i) at least one of the plurality of first side view cameras and (ii) at least one of the plurality of second side view cameras;
   while the vehicle is moving, acquiring third image data of a top of the vehicle with at least one top-view camera, the at least one top-view camera being suspended over the vehicle and taking images of the vehicle therebelow;
   while the vehicle is moving, acquiring fourth image data of underside surfaces of the vehicle with at least one bottom-view camera, the at least one bottom-view camera being positioned below the vehicle and taking images of the vehicle thereabove; and based on at least one of the first image data, the second image data, the third image data, and the fourth image data, identifying a damage feature or a defect feature of the exterior of the vehicle.

2. The method of claim 1, wherein the at least four first side view cameras and the at least four second side view cameras are directly opposing each other.

3. The method of claim 1, wherein the at least four first side view cameras, the at least four second side view cameras, and the at least one top-view camera are mounted to a gantry, the at least four first side view cameras being mounted on a first leg of the gantry, the at least four second side view cameras being mounted on a second leg of the gantry, and the at least one top-view camera being mounted to a cross beam of the gantry.

4. The method of claim 1, wherein the identifying is based on computer-executable instructions that are executed by an image processor that receives the first image data, the second image data, the third image data, and the fourth image data.

5. The method of claim 4, wherein the computer-executable instructions comprise one or more machine learning algorithms, the one or more machine learning algorithms using previously acquired images for identifying the defect feature or the damage feature.

6. The method of claim 5, wherein the defect feature or the damage feature relates to a scratch.

7. The method of claim 6, wherein the defect feature or the damage feature includes the size of the scratch.

8. The method of claim 1, wherein the acquiring of the first image data includes acquiring, from one of the plurality of first side view cameras, first-side wheel image data, and the acquiring of the second image data includes acquiring, from one of the plurality of second side view cameras, second-side wheel image data.

9. The method of claim 1, wherein one of the plurality of first side view cameras is positioned to provide a front-angle image of the vehicle.

10. The method of claim 9, wherein the front-angle image of the vehicle is a 45-degree front-angle image of the vehicle.

11. A method of acquiring images of an exterior of a vehicle while the vehicle is moving, comprising:
while the vehicle is moving, acquiring first image data of a first side of the vehicle with a plurality of first side view cameras, the plurality of first side view cameras including at least four first side view cameras being generally vertically aligned and vertically spaced from each other such that the at least four first side view cameras are arranged at various heights relative to the vehicle, wherein at least one of the four first side view cameras is positioned to provide a front-angle image of the vehicle;
while the vehicle is moving, acquiring second image data of a second side of the vehicle with a plurality of second side view cameras, the plurality of second side view cameras including at least four second side view cameras being generally vertically aligned and vertically spaced from each other such that the at least four second side view cameras are arranged at various heights relative to the vehicle;
while the vehicle is moving, acquiring third image data of a top of the vehicle with at least one top-view camera, the at least one top-view camera being suspended over the vehicle and taking images of the vehicle therebelow;
while the vehicle is moving, acquiring fourth image data of underside surfaces of the vehicle with at least one bottom-view camera, the at least one bottom-view camera being positioned below the vehicle and taking images of the vehicle thereabove;
using one of the at least four first side view cameras to obtain first-side wheel image data for at least two first side wheels on the first side of the vehicle; and
using one of the at least four second side view cameras to obtain second-side wheel image data for at least two second side wheels on the second side of the vehicle.

12. The method of claim 11, wherein the front-angle image of the vehicle is a 45-degree front-angle image of the vehicle.

13. The method of claim 11, wherein the at least four first side view cameras and the at least four second side view cameras are directly opposing each other.

14. The method of claim 11, further including identifying a defect feature or a damage feature on the vehicle by using the first image data, the second image data, the third image data, the fourth image data, or a combination thereof.

15. The method of claim 14, wherein the identifying includes using one or more machine learning algorithms that assist with identifying the defect feature or the damage feature by using previously acquired images.

16. The method of claim 14, wherein the fourth image data is used for displaying undercarriage images of the vehicle.

17. A method of acquiring images of an exterior of a vehicle while the vehicle is moving, comprising:
while the vehicle is moving, acquiring first image data of a first side of the vehicle with a plurality of first side view cameras, the plurality of first side view cameras including at least four first side view cameras being generally vertically aligned and vertically spaced from each other such that the at least four first side view cameras are arranged at various heights relative to the vehicle;
while the vehicle is moving, acquiring second image data of a second side of the vehicle with a plurality of second side view cameras, the plurality of second side view cameras including at least four second side view cameras being generally vertically aligned and vertically spaced from each other such that the at least four second side view cameras are arranged at various heights relative to the vehicle;
while the vehicle is moving, acquiring third image data of a top of the vehicle with at least one top-view camera, the at least one top-view camera being suspended over the vehicle and taking images of the vehicle therebelow;
while the vehicle is moving, acquiring fourth image data of underside surfaces of the vehicle with at least one bottom-view camera, the at least one bottom-view camera being positioned below the vehicle and taking images of the vehicle thereabove; and
analyzing, with one or more machine learning algorithms, the first image data, the second image data, the third image data, and the fourth image data to determine a feature on the exterior of the vehicle.

18. The method of claim 17, wherein the feature is a damage feature or a defect feature.

19. The method of claim 17, further including panning or tilting (i) at least one of the plurality of first side view cameras and (ii) at least one of the plurality of second side view cameras.

20. The method of claim 17, wherein at least one of the four first side view cameras is positioned to provide a front-angle image of the vehicle.

21. A method of acquiring images of an exterior of a vehicle while the vehicle is moving, comprising:

while the vehicle is moving, acquiring first image data of a first side of the vehicle with a plurality of first side view cameras, the plurality of first side view cameras including at least four first side view cameras being generally vertically aligned and vertically spaced from each other such that the at least four first side view cameras are arranged at various heights relative to the vehicle, wherein one of the plurality of first side view cameras is positioned to provide a front-angle image of the vehicle;

while the vehicle is moving, acquiring second image data of a second side of the vehicle with a plurality of second side view cameras, the plurality of second side view cameras including at least four second side view cameras being generally vertically aligned and vertically spaced from each other such that the at least four second side view cameras are arranged at various heights relative to the vehicle;

while the vehicle is moving, acquiring third image data of a top of the vehicle with at least one top-view camera, the at least one top-view camera being suspended over the vehicle and taking images of the vehicle therebelow;

while the vehicle is moving, acquiring fourth image data of underside surfaces of the vehicle with at least one bottom-view camera, the at least one bottom-view camera being positioned below the vehicle and taking images of the vehicle thereabove; and based on at least one of the first image data, the second image data, the third image data, and the fourth image data, identifying a damage feature or a defect feature of the exterior of the vehicle.

\* \* \* \* \*